United States Patent
Oh et al.

(10) Patent No.: US 12,165,368 B2
(45) Date of Patent: Dec. 10, 2024

(54) POINT CLOUD DATA TRANSMISSION DEVICE, POINT CLOUD DATA TRANSMISSION METHOD, POINT CLOUD DATA RECEPTION DEVICE AND POINT CLOUD DATA RECEPTION METHOD

(71) Applicant: LG Electronics Inc., Seoul (KR)

(72) Inventors: Hyunmook Oh, Seoul (KR); Sejin Oh, Seoul (KR)

(73) Assignee: LG Electronics Inc., Seoul (KR)

( * ) Notice: Subject to any disclaimer, the term of this patent is extended or adjusted under 35 U.S.C. 154(b) by 394 days.

(21) Appl. No.: 17/623,114

(22) PCT Filed: May 28, 2020

(86) PCT No.: PCT/KR2020/006914
§ 371 (c)(1),
(2) Date: Dec. 27, 2021

(87) PCT Pub. No.: WO2020/262824
PCT Pub. Date: Dec. 30, 2020

(65) Prior Publication Data
US 2022/0327742 A1 Oct. 13, 2022

(30) Foreign Application Priority Data
Jun. 26, 2019 (KR) .................. 10-2019-0076258

(51) Int. Cl.
*G06T 9/00* (2006.01)
*G06T 9/40* (2006.01)
(52) U.S. Cl.
CPC ................ *G06T 9/001* (2013.01); *G06T 9/40* (2013.01)

(58) Field of Classification Search
CPC ................................ G06T 9/001; G06T 9/40
See application file for complete search history.

(56) References Cited

U.S. PATENT DOCUMENTS

| | | | |
|---|---|---|---|
| 2017/0347122 A1 | 11/2017 | Chou et al. | |
| 2019/0080483 A1* | 3/2019 | Mammou | G06T 3/4007 |
| 2019/0180409 A1 | 6/2019 | Moloney et al. | |
| 2020/0021844 A1* | 1/2020 | Yea | H04N 19/124 |
| 2020/0105025 A1* | 4/2020 | Yea | G06T 15/08 |
| 2020/0107048 A1* | 4/2020 | Yea | H04N 19/169 |
| 2021/0004991 A1* | 1/2021 | Zhang | H04N 19/597 |
| 2021/0049790 A1* | 2/2021 | Gao | G06T 9/00 |
| 2021/0084333 A1* | 3/2021 | Zhang | H04N 19/96 |
| 2021/0166436 A1* | 6/2021 | Zhang | G06T 9/001 |
| 2021/0168386 A1* | 6/2021 | Zhang | H04N 19/20 |

FOREIGN PATENT DOCUMENTS

| | | |
|---|---|---|
| EP | 3429207 | 1/2019 |
| EP | 3496388 | 6/2019 |
| WO | WO-2020/123469 | * 12/2019 |

OTHER PUBLICATIONS

International Search Report and Written Opinion in International Appln. No. PCT/KR2020/006914, dated Sep. 9, 2020, 18 pages (with English translation).

* cited by examiner

*Primary Examiner* — Zaihan Jiang
(74) *Attorney, Agent, or Firm* — Fish & Richardson P.C.

(57) ABSTRACT

A point cloud data transmission method according to embodiments can comprise the steps of: acquiring the point cloud data; encoding geometry information included in the point cloud data; encoding attribute information included in the point cloud data; and transmitting the encoded geometry information and the encoded attribute information.

8 Claims, 37 Drawing Sheets

FIG. 6
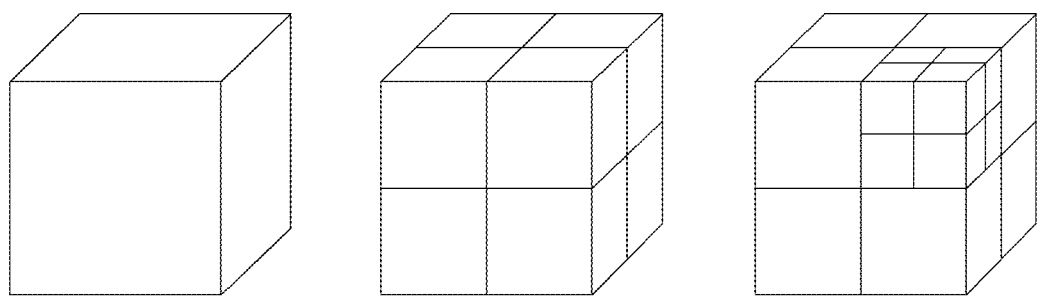
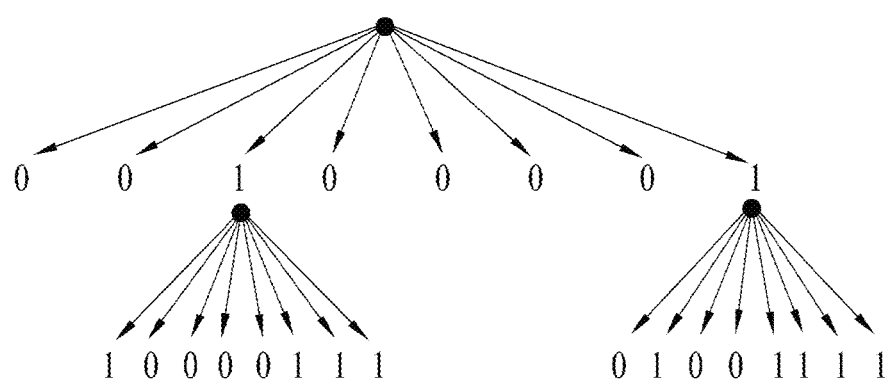

FIG. 7
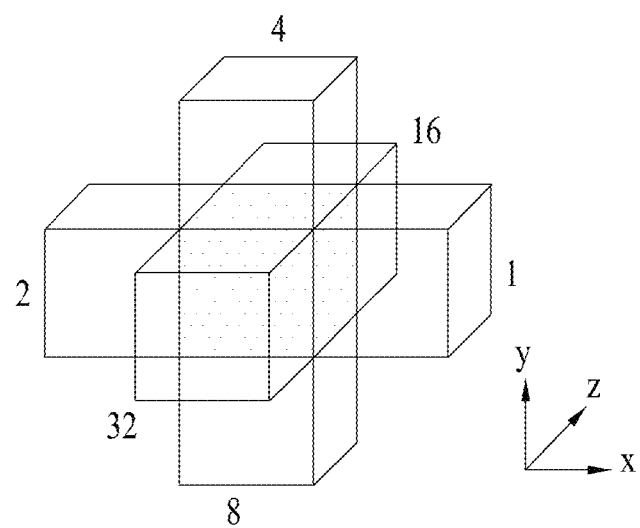
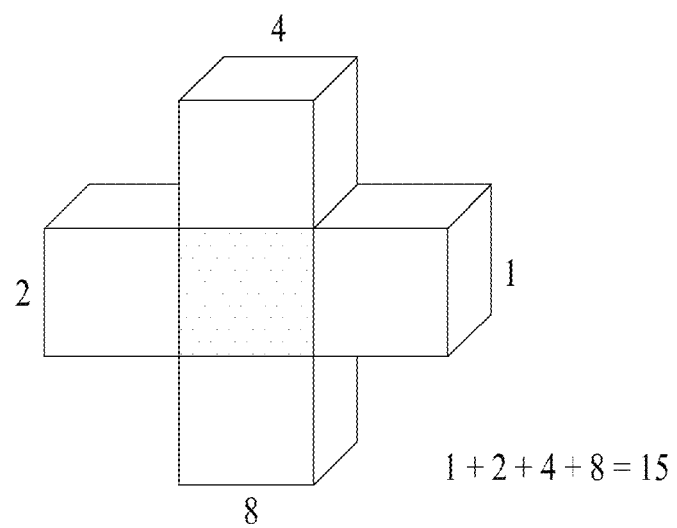
$1 + 2 + 4 + 8 = 15$

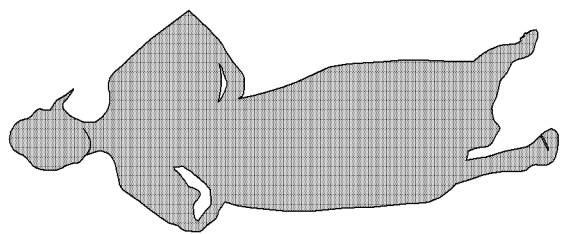
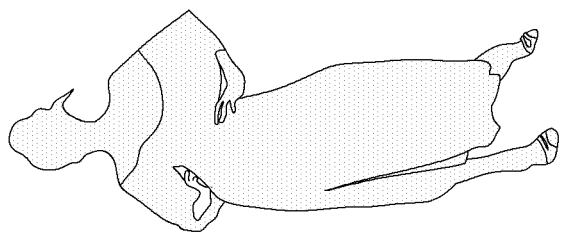
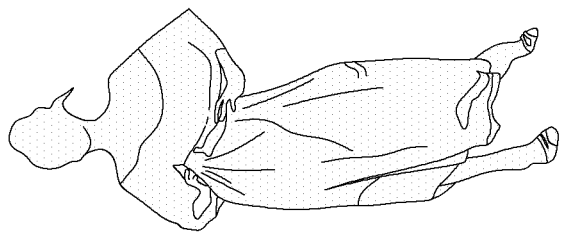
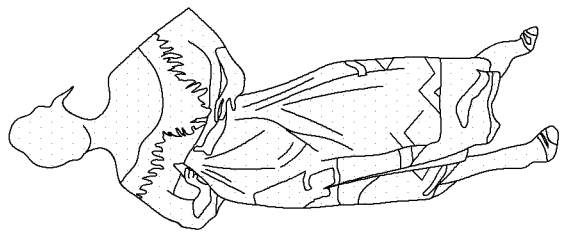
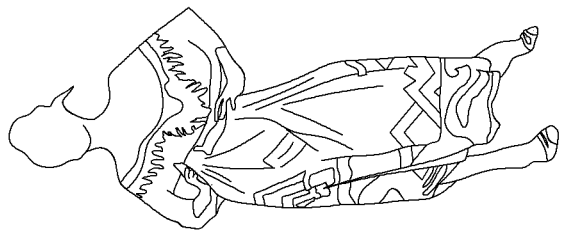
FIG. 34

FIG. 36

| attribute_parameter_set( ) { | Descriptor |
|---|---|
|    aps_attr_parameter_set_id | ue(v) |
|    aps_seq_parameter_set_id | ue(v) |
|    octree_based_layering_flag | u(1) |
|    if (octree_based_layering_flag==1) { | |
|       num_layers      // ex) LoD num | u(8) |
|       num_index | u(8) |
|       for (i =0; i < num_index; i++) { | |
|          octree_level_start[i] | u(8) |
|          num_octree_level[i] | u(8) |
|          if ( num_octree_level[i] == 1) { | |
|             multiple_layers_present_flag[i] | u(1) |
|             if(multiple_layers_present_flag[i] ==1) { | |
|                num_sub_layers[i] | u(8) |
|                for(j=0;j<num_sub_layers[i];j++) { | |
|                   division_type[i][j] | u(8) |
|                   num_points[i][j] | u(8) |
|                } | |
|             } | |
|          } | |
|          else { | |
|             num_point[i] | u(8) |
|          } | |
|        } | |
|       } | |
|       ... | |
| } | |

FIG. 37
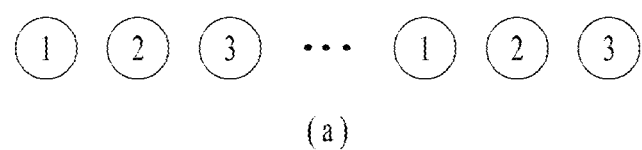
(a)
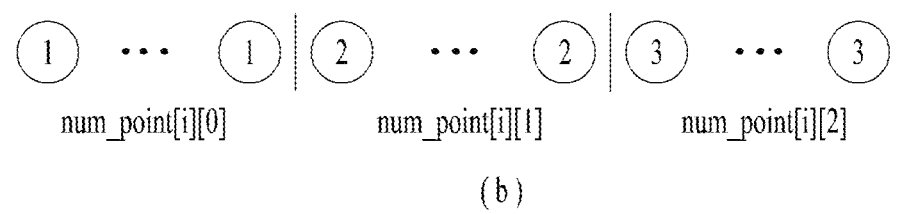
(b)

POINT CLOUD DATA TRANSMISSION DEVICE, POINT CLOUD DATA TRANSMISSION METHOD, POINT CLOUD DATA RECEPTION DEVICE AND POINT CLOUD DATA RECEPTION METHOD

CROSS-REFERENCE TO RELATED APPLICATIONS

This application is a National Stage application under 35 U.S.C. § 371 of International Application No. PCT/KR2020/006914, filed on May 28, 2020, which claims the benefit of Korean Application No. 10-2019-0076258, filed on Jun. 26, 2019. The disclosures of the prior applications are incorporated by reference in their entirety.

TECHNICAL FIELD

Embodiments relate to a method and apparatus for processing point cloud content.

BACKGROUND ART

Point cloud content is content represented by a point cloud, which is a set of points belonging to a coordinate system representing a three-dimensional space. The point cloud content may express media configured in three dimensions, and is used to provide various services such as virtual reality (VR), augmented reality (AR), mixed reality (MR), XR (Extended Reality), and self-driving services. However, tens of thousands to hundreds of thousands of point data are required to represent point cloud content. Therefore, there is a need for a method for efficiently processing a large amount of point data.

That is, a throughput is required to transmit and receive point cloud data. Therefore, the operation of encoding for compression/decompression, which is performed in the process of transmitting and receiving the point cloud data, is complicated and time-consuming due to the large volume of the point cloud data.

DISCLOSURE

Technical Problem

An object according to the embodiments devised to solve the above-described problems is to provide a point cloud data transmission device, a point cloud data transmission method, a point cloud data reception device, and a point cloud data reception method for efficiently transmitting and receiving a point cloud.

Another object according to the embodiments is to provide a point cloud data transmission device, a point cloud data transmission method, a point cloud data reception device, and a point cloud data reception method for addressing latency and encoding/decoding complexity.

Another object according to the embodiments is to provide a point cloud data transmission device, a point cloud data transmission method, a point cloud data reception device, and a point cloud data reception method that may improve the point cloud compression performance by improving encoding of attributes of geometry-point cloud compression (G-PCC).

Another object according to the embodiments is to provide a point cloud data transmission device, a point cloud data transmission method, a point cloud data reception device, and a point cloud data reception method for latency and complexity of attribute encoding/decoding by layering attribute information of point cloud data based on an octree structure and encoding and decoding the attribute information based on the layering.

Objects of the present disclosure are not limited to the aforementioned objects, and other objects of the present disclosure which are not mentioned above will become apparent to those having ordinary skill in the art upon examination of the following description.

Technical Solution

To achieve these objects and other advantages and in accordance with embodiments, a method for transmitting point cloud data may include acquiring the point cloud data, encoding geometry information included in the point cloud data, encoding attribute information included in the point cloud data, and transmitting the encoded geometry information and the encoded attribute information.

In some embodiments, the encoding of the geometry information may include quantizing the geometry information, generating an octree structure having an octal tree structure based on the quantized geometry information, approximating the octree structure, reconstructing the geometry information based on the generated octree structure and the approximated octree structure, and entropy-encoding occupancy codes of the generated octree structure or the approximated octree structure and outputting a geometry bitstream.

In some embodiments, the encoding of the attribute information may include matching the attribute information and the geometry information of the point cloud data with nodes of the octree structure, generating retained sets by aggregating point cloud data based on the octree structure matched with the attribute information and the geometry information of the point cloud data, generating levels of detail (LODs) based on the retained sets, dividing the point cloud data according to the generated LODs, and compressing attribute information of the divided point cloud data.

In some embodiments, each of the retained sets may be a collection of point cloud data newly added compared to a previous LoD according to a predetermined criterion to configure each LoD.

In some embodiments, a single retained set may be generated from point cloud data of one or more levels.

In some embodiments, a plurality of retained sets may be generated by dividing point cloud data of one level.

In some embodiments, the matching of the attribute information and the geometry information of the point cloud data with the nodes of the octree structure may include determining at least one piece of the attribute information matched with occupied nodes in a leaf node level of the octree structure as predicted attribute information of one or more higher levels.

In another aspect of the present disclosure, an apparatus for transmitting point cloud data, the apparatus may include an acquirer configured to acquire the point cloud data, a geometry encoder configured to encode geometry information included in the point cloud data, an attribute encoder configured to encode attribute information included in the point cloud data, and a transmitter configured to transmit the encoded geometry information and the encoded attribute information.

In some embodiments, the geometry encoder may include a quantizer configured to quantize the geometry information, an octree analyzer configured to generate an octree structure having an octal tree structure based on the quantized geometry information, an approximation analyzer configured to approximate the octree structure, a geometry reconstructor configured to reconstruct the geometry information based on the generated octree structure and the approximated octree structure, and an arithmetic encoder configured to entropy-encode occupancy codes of the generated octree structure or the approximated octree structure and output a geometry bitstream.

In some embodiments, the attribute encoder may include an octree colorizer configured to match the attribute information and the geometry information of the point cloud data with nodes of the octree structure, an LOD generator configured to generate retained sets by aggregating point cloud data based on the octree structure matched with the attribute information and the geometry information of the point cloud data and to generate levels of detail (LODs) based on the retained sets, and an attribute compressor configured to divide the point cloud data according to the generated LODs and compress attribute information of the divided point cloud data.

In some embodiments, each of the retained sets may be a collection of point cloud data newly added compared to a previous LoD according to a predetermined criterion to configure each LoD.

In some embodiments, the LOD generator may generate a single retained set from point cloud data of one or more levels.

In some embodiments, the LOD generator may generate a plurality of retained sets by dividing point cloud data of one level.

In some embodiments, the octree colorizer may determine at least one piece of the attribute information matched with occupied nodes in a leaf node level of the octree structure as predicted attribute information of one or more higher levels.

In another aspect of the present disclosure, a method of receiving point cloud data, the method may include receiving the point cloud data and signaling information, decoding geometry information included in the point cloud data, decoding attribute information included in the point cloud data, and processing and rendering the decoded geometry information and the decoded attribute information.

In some embodiments, the decoding of the geometry information may include reconstructing the geometry information by regenerating an octree structure of a partial level or a full level based on occupancy codes included in the geometry information.

In some embodiments, the decoding of the attribute information may include generating levels of detail (LODs) based on the octree structure, decompressing the attribute information of a partial level or full level included in the point cloud data based on the generated LODs and the octree structure of the partial level or full level, and reconstructing the attribute information.

In another aspect of the present disclosure, an apparatus for receiving point cloud data, the apparatus may include a receiver configured to receive the point cloud data and signaling information, a geometry decoder configured to decode geometry information included in the point cloud data, an attribute decoder configured to decode attribute information included in the point cloud data, and a renderer configured to process and render the decoded geometry information and the decoded attribute information.

In some embodiments, the geometry decoder reconstructs the geometry information by regenerating an octree structure of a partial level or a full level based on occupancy codes included in the geometry information.

In some embodiments, the attribute decoder may be configured to generate levels of detail (LODs) based on the octree structure, decompress the attribute information of a partial level or full level included in the point cloud data based on the generated LODs and the octree structure of the partial level or full level, and reconstruct the attribute information.

Advantageous Effects

A point cloud data transmission method, a point cloud transmission device, a point cloud data reception method, and a point cloud reception device according to embodiments may provide a good-quality point cloud service.

The point cloud data transmission method, the transmission device, the point cloud data reception method, and the reception device according to the embodiments may achieve various video codec schemes. The point cloud data transmission method, the transmission device, the point cloud data reception method, and the reception device according to the embodiments may provide universal point cloud content such as a self-driving service.

The point cloud data transmission method, the transmission device, the point cloud data reception method, and the reception device according to the embodiments may match point cloud data based on the position information about an octree node of an octree structure and apply the same to LOD configuration, thereby enabling efficient attribute encoding and attribute decoding. In particular, by applying the LOD generated in this way to prediction and lifting attribute compression, compression of the attribute at the transmitting side and reconstruction of the compressed attribute at the receiving side may be implemented with a small amount of computation.

The point cloud data transmission method, the transmission device, the point cloud data reception method, and the reception device according to the embodiments use the similarity between structurally adjacent attributes on a geometry for attribute prediction to compress the attributes of the point cloud through the transmission device and decompress the attributes of the point cloud through the reception device, such that similarities between highly related attributes in the geometry structure for the predicted attributes are effectively removed. Accordingly, computational complexity and dependence on geometry decoding may be reduced, thereby increasing the decoding speed.

The point cloud data transmission method, the transmission device, the point cloud data reception method, and the reception device according to the embodiments may configure an LOD based on an octree structure. Thus, low-resolution or subsampled point cloud data may be transmitted using an octree node to which an attribute is assigned. Accordingly, the transmitting side may compress attribute information based on a smaller amount of computation, and the information is highly likely to be utilized in a transmission system requiring low-delay. In addition, compressing the attribute information for decoders of various capacities may support receivers of various capacities through one bitstream instead of generating or storing independent compressed information suitable for each decoder capacity, and therefore may have advantages in terms of storage space and bit efficiency at the transmitting side.

Further, when the point cloud data is received based on the present disclosure, the attribute information may be reconstructed at the receiving side while performing geometry decoding with a smaller amount of computation, and may therefore be usable for a transmission/reception system requiring low-delay. In addition, when the output level of the attribute information is selected, even a receiver having low computational power may output attribute information suitable for the capacity of the receiver without delay. For example, in the process of attribute decoding and reconstruction, different results may be output depending on the capacity of the receiver or system requirements. In this case, the decoded or reconstructed attribute of each level may be used as an attribute value matching the octree node of the level.

DESCRIPTION OF DRAWINGS

The accompanying drawings, which are included to provide a further understanding of the disclosure and are incorporated in and constitute a part of this application, illustrate embodiment(s) of the disclosure and together with the description serve to explain the principle of the disclosure.

FIG. 6 illustrates an example of octree and occupancy code according to embodiments.

FIG. 7 illustrates an example of a neighbor node pattern according to embodiments.

FIG. 34 illustrates an example of outputting different levels of geometry according to embodiments.

FIG. 36 shows an exemplary syntax structure of an attribute parameter set according to embodiments.

FIGS. 37(a) and 37(b) illustrate an example of dividing an octree depth level into a plurality of layers according to embodiments.

BEST MODE

Figure 1:
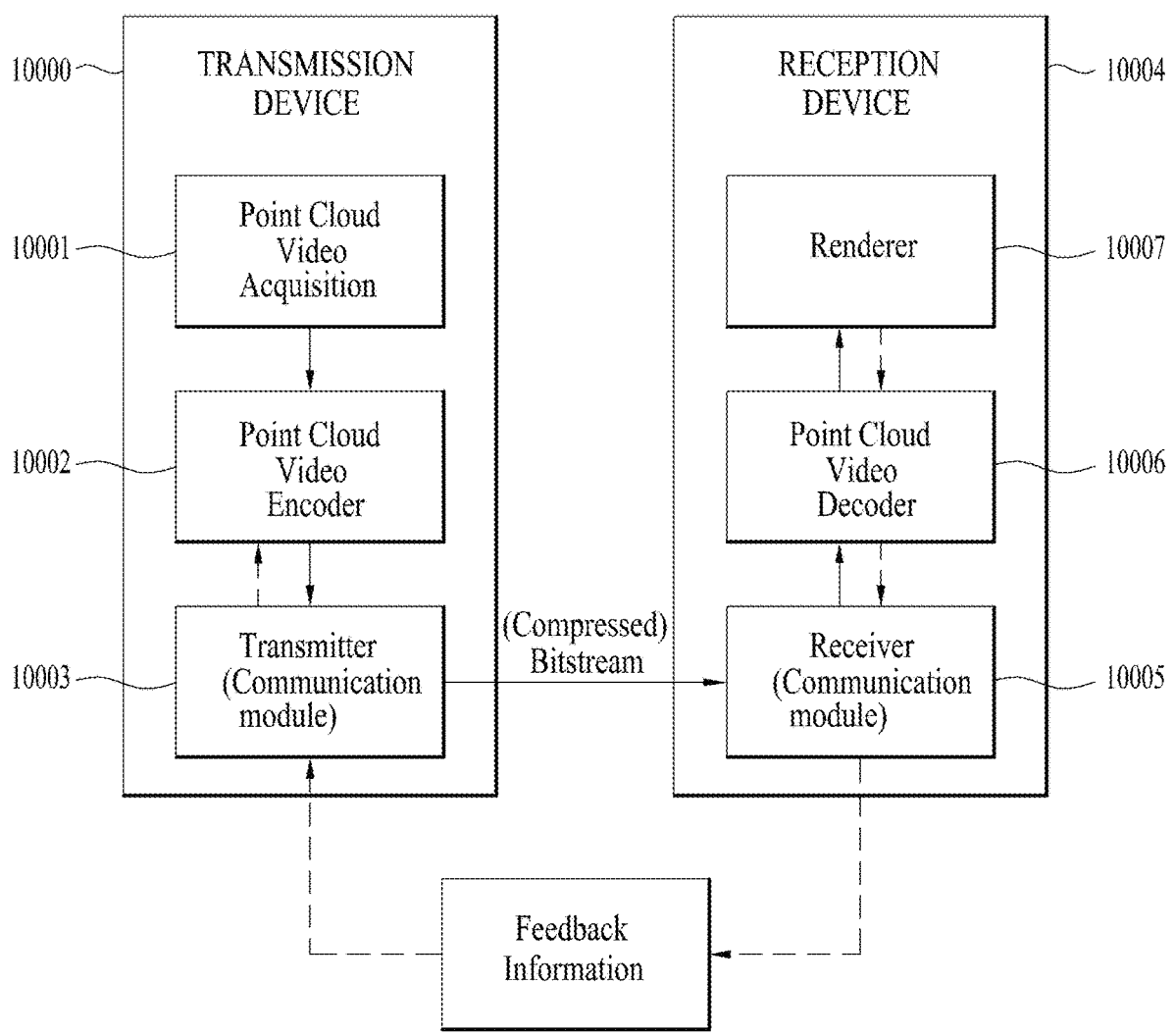
FIG. 1 illustrates an exemplary point cloud content providing system according to embodiments.

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. It should be noted that the following examples are only for embodying the present disclosure and do not limit the scope of the present disclosure. What can be easily inferred by an expert in the technical field to which the present invention belongs from the detailed description and examples of the present disclosure is to be interpreted as being within the scope of the present disclosure.

The detailed description in this present specification should be construed in all aspects as illustrative and not restrictive. The scope of the disclosure should be determined by the appended claims and their legal equivalents, and all changes coming within the meaning and equivalency range of the appended claims are intended to be embraced therein.

Reference will now be made in detail to the preferred embodiments of the present disclosure, examples of which are illustrated in the accompanying drawings. The detailed description, which will be given below with reference to the accompanying drawings, is intended to explain exemplary embodiments of the present disclosure, rather than to show the only embodiments that can be implemented according to the present disclosure. The following detailed description includes specific details in order to provide a thorough understanding of the present disclosure. However, it will be apparent to those skilled in the art that the present disclosure may be practiced without such specific details. Although most terms used in this specification have been selected from general ones widely used in the art, some terms have been arbitrarily selected by the applicant and their meanings are explained in detail in the following description as needed. Thus, the present disclosure should be understood based upon the intended meanings of the terms rather than their simple names or meanings. In addition, the following drawings and detailed description should not be construed as being limited to the specifically described embodiments, but should be construed as including equivalents or substitutes of the embodiments described in the drawings and detailed description.

FIG. 1 shows an exemplary point cloud content providing system according to embodiments.

The point cloud content providing system illustrated in FIG. 1 may include a transmission device 10000 and a reception device 10004. The transmission device 10000 and the reception device 10004 are capable of wired or wireless communication to transmit and receive point cloud data.

The point cloud data transmission device 10000 according to the embodiments may secure and process point cloud video (or point cloud content) and transmit the same. According to embodiments, the transmission device 10000 may include a fixed station, a base transceiver system (BTS), a network, an artificial intelligence (AI) device and/or system, a robot, an AR/VR/XR device and/or server. According to embodiments, the transmission device 10000 may include a device, a robot, a vehicle, an AR/VR/XR device, a portable device, a home appliance, an Internet of Thing (IoT) device, and an AI device/server which are configured to perform communication with a base station and/or other wireless devices using a radio access technology (e.g., 5G New RAT (NR), Long Term Evolution (LTE)).

The transmission device 10000 according to the embodiments includes a point cloud video acquisition unit 10001, a point cloud video encoder 10002, and/or a transmitter (or communication module) 10003.

The point cloud video acquisition unit 10001 according to the embodiments acquires a point cloud video through a processing process such as capture, synthesis, or generation. The point cloud video is point cloud content represented by a point cloud, which is a set of points positioned in a 3D space, and may be referred to as point cloud video data. The point cloud video according to the embodiments may include one or more frames. One frame represents a still image/picture. Therefore, the point cloud video may include a point cloud image/frame/picture, and may be referred to as a point cloud image, frame, or picture.

The point cloud video encoder 10002 according to the embodiments encodes the acquired point cloud video data. The point cloud video encoder 10002 may encode the point cloud video data based on point cloud compression coding. The point cloud compression coding according to the embodiments may include geometry-based point cloud compression (G-PCC) coding and/or video-based point cloud compression (V-PCC) coding or next-generation coding. The point cloud compression coding according to the embodiments is not limited to the above-described embodiment. The point cloud video encoder 10002 may output a bitstream containing the encoded point cloud video data. The bitstream may contain not only the encoded point cloud video data, but also signaling information related to encoding of the point cloud video data.

The transmitter 10003 according to the embodiments transmits the bitstream containing the encoded point cloud video data. The bitstream according to the embodiments is encapsulated in a file or segment (for example, a streaming segment), and is transmitted over various networks such as a broadcasting network and/or a broadband network. Although not shown in the figure, the transmission device 10000 may include an encapsulator (or an encapsulation module) configured to perform an encapsulation operation. According to embodiments, the encapsulator may be included in the transmitter 10003. According to embodiments, the file or segment may be transmitted to the reception device 10004 over a network, or stored in a digital storage medium (e.g., USB, SD, CD, DVD, Blu-ray, HDD, SSD, etc.). The transmitter 10003 according to the embodiments is capable of wired/wireless communication with the reception device 10004 (or the receiver 10005) over a network of 4G, 5G, 6G, etc. In addition, the transmitter may perform a necessary data processing operation according to the network system (e.g., a 4G, 5G or 6G communication network system). The transmission device 10000 may transmit the encapsulated data in an on-demand manner.

The reception device 10004 according to the embodiments includes a receiver 10005, a point cloud video decoder 10006, and/or a renderer 10007. According to embodiments, the reception device 10004 may include a device, a robot, a vehicle, an AR/VR/XR device, a portable device, a home appliance, an Internet of Things (IoT) device, and an AI device/server which are configured to perform communication with a base station and/or other wireless devices using a radio access technology (e.g., 5G New RAT (NR), Long Term Evolution (LTE)).

The receiver 10005 according to the embodiments receives the bitstream containing the point cloud video data or the file/segment in which the bitstream is encapsulated from the network or storage medium. The receiver 10005 may perform necessary data processing according to the network system (for example, a communication network system of 4G, 5G, 6G, etc.). The receiver 10005 according to the embodiments may decapsulate the received file/segment and output a bitstream. According to embodiments, the receiver 10005 may include a decapsulator (or a decapsulation module) configured to perform a decapsulation operation. The decapsulator may be implemented as an element (or component or module) separate from the receiver 10005.

The point cloud video decoder 10006 decodes the bitstream containing the point cloud video data. The point cloud video decoder 10006 may decode the point cloud video data according to the method by which the point cloud video data is encoded (for example, in a reverse process of the operation of the point cloud video encoder 10002). Accordingly, the point cloud video decoder 10006 may decode the point cloud video data by performing point cloud decompression coding, which is the inverse process of the point cloud compression. The point cloud decompression coding includes G-PCC coding.

The renderer 10007 renders the decoded point cloud video data. The renderer 10007 may output point cloud content by rendering not only the point cloud video data but also audio data. According to embodiments, the renderer 10007 may include a display configured to display the point cloud content. According to embodiments, the display may be implemented as a separate device or component rather than being included in the renderer 10007.

The arrows indicated by dotted lines in the drawing represent a transmission path of feedback information acquired by the reception device 10004. The feedback information is information for reflecting interactivity with a user who consumes the point cloud content, and includes information about the user (e.g., head orientation information, viewport information, and the like). In particular, when the point cloud content is content for a service (e.g., self-driving service, etc.) that requires interaction with the user, the feedback information may be provided to the content transmitting side (e.g., the transmission device 10000) and/or the service provider. According to embodiments, the feedback information may be used in the reception device 10004 as well as the transmission device 10000, or may not be provided.

The head orientation information according to embodiments is information about the user's head position, orientation, angle, motion, and the like. The reception device 10004 according to the embodiments may calculate the viewport information based on the head orientation information. The viewport information may be information about a region of a point cloud video that the user is viewing. A viewpoint is a point through which the user is viewing the point cloud video, and may refer to a center point of the viewport region. That is, the viewport is a region centered on the viewpoint, and the size and shape of the region may be determined by a field of view (FOV). Accordingly, the reception device 10004 may extract the viewport information based on a vertical or horizontal FOV supported by the device in addition to the head orientation information. Also, the reception device 10004 performs gaze analysis or the like to check the way the user consumes a point cloud, a region that the user gazes at in the point cloud video, a gaze time, and the like. According to embodiments, the reception device 10004 may transmit feedback information including the result of the gaze analysis to the transmission device 10000. The feedback information according to the embodiments may be acquired in the rendering and/or display process. The feedback information according to the embodiments may be secured by one or more sensors included in the reception device 10004. According to embodiments, the feedback information may be secured by the renderer 10007 or a separate external element (or device, component, or the like). The dotted lines in FIG. 1 represent a process of transmitting the feedback information secured by the renderer 10007. The point cloud content providing system may process (encode/decode) point cloud data based on the feedback information. Accordingly, the point cloud video decoder 10006 may perform a decoding operation based on the feedback information. The reception device 10004 may transmit the feedback information to the transmission device 10000. The transmission device 10000 (or the point cloud video encoder 10002) may perform an encoding operation based on the feedback information. Accordingly, the point cloud content providing system may efficiently process necessary data (e.g., point cloud data corresponding to the user's head position) based on the feedback information rather than processing (encoding/decoding) the entire point cloud data, and provide point cloud content to the user.

According to embodiments, the transmission device 10000 may be called an encoder, a transmitting device, a transmitter, a transmission system, or the like, and the reception device 10004 may be called a decoder, a receiving device, a receiver, a reception system, or the like.

The point cloud data processed in the point cloud content providing system of FIG. 1 according to embodiments (through a series of processes of acquisition/encoding/transmission/decoding/rendering) may be referred to as point cloud content data or point cloud video data. According to embodiments, the point cloud content data may be used as a concept covering metadata or signaling information related to the point cloud data.

The elements of the point cloud content providing system illustrated in FIG. 1 may be implemented by hardware, software, a processor, and/or a combination thereof.

Figure 2:
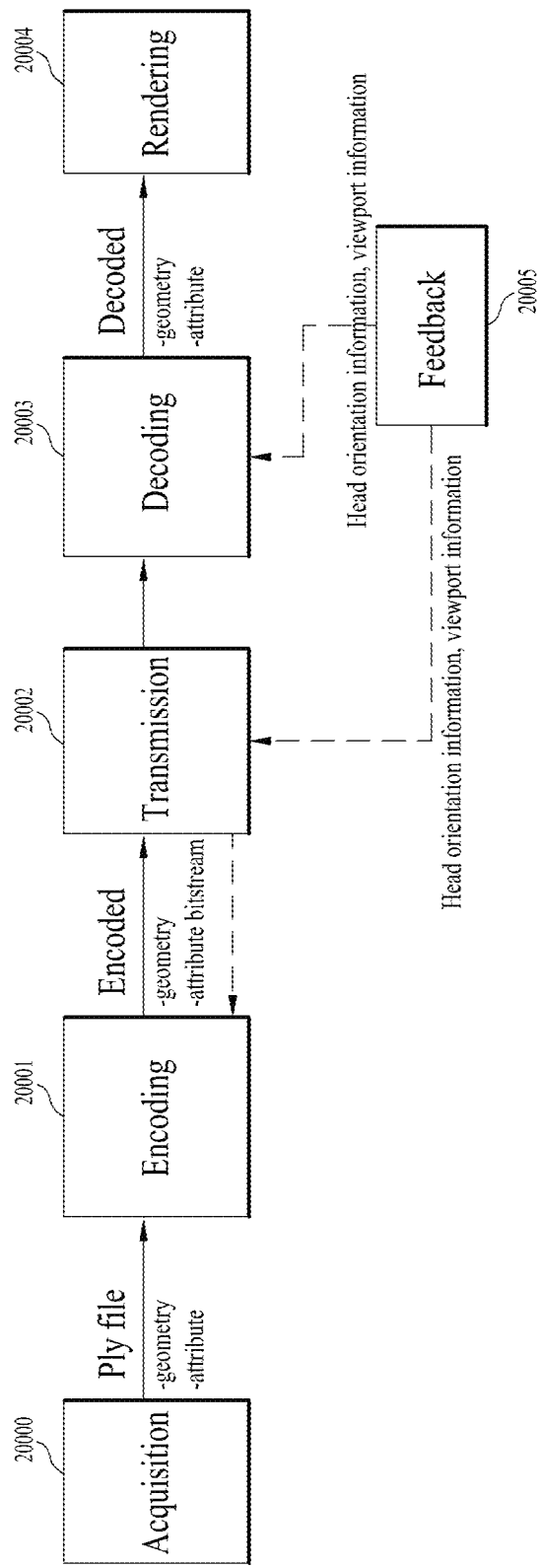
FIG. 2 is a block diagram illustrating a point cloud content providing operation according to embodiments.

FIG. 2 is a block diagram illustrating a point cloud content providing operation according to embodiments.

The block diagram of FIG. 2 shows the operation of the point cloud content providing system described in FIG. 1. As described above, the point cloud content providing system may process point cloud data based on point cloud compression coding (e.g., G-PCC).

The point cloud content providing system according to the embodiments (for example, the point cloud transmission device 10000 or the point cloud video acquisition unit 10001) may acquire a point cloud video (20000). The point cloud video is represented by a point cloud belonging to a coordinate system for expressing a 3D space. The point cloud video according to the embodiments may include a Ply (Polygon File format or the Stanford Triangle format) file. When the point cloud video has one or more frames, the acquired point cloud video may include one or more Ply files. The Ply files contain point cloud data, such as point geometry and/or attributes. The geometry includes positions of points. The position of each point may be represented by parameters (for example, values of the X, Y, and Z axes) representing a three-dimensional coordinate system (e.g., a coordinate system composed of X, Y and Z axes). The attributes include attributes of points (e.g., information about texture, color (in YCbCr or RGB), reflectance r, transparency, etc. of each point). A point has one or more attributes. For example, a point may have an attribute that is a color, or two attributes that are color and reflectance. According to embodiments, the geometry may be called positions, geometry information, geometry data, or the like, and the attribute may be called attributes, attribute information, attribute data, or the like. The point cloud content providing system (for example, the point cloud transmission device 10000 or the point cloud video acquisition unit 10001) may secure point cloud data from information (e.g., depth information, color information, etc.) related to the acquisition process of the point cloud video.

The point cloud content providing system (for example, the transmission device 10000 or the point cloud video encoder 10002) according to the embodiments may encode the point cloud data (20001). The point cloud content providing system may encode the point cloud data based on point cloud compression coding. As described above, the point cloud data may include the geometry and attributes of a point. Accordingly, the point cloud content providing system may perform geometry encoding of encoding the geometry and output a geometry bitstream. The point cloud content providing system may perform attribute encoding of encoding attributes and output an attribute bitstream. According to embodiments, the point cloud content providing system may perform the attribute encoding based on the geometry encoding. The geometry bitstream and the attribute bitstream according to the embodiments may be multiplexed and output as one bitstream. The bitstream according to the embodiments may further contain signaling information related to the geometry encoding and attribute encoding.

The point cloud content providing system (for example, the transmission device 10000 or the transmitter 10003) according to the embodiments may transmit the encoded point cloud data (20002). As illustrated in FIG. 1, the encoded point cloud data may be represented by a geometry bitstream and an attribute bitstream. In addition, the encoded point cloud data may be transmitted in the form of a bitstream together with signaling information related to encoding of the point cloud data (for example, signaling information related to the geometry encoding and the attribute encoding). The point cloud content providing system may encapsulate a bitstream that carries the encoded point cloud data and transmit the same in the form of a file or segment.

The point cloud content providing system (for example, the reception device 10004 or the receiver 10005) according to the embodiments may receive the bitstream containing the encoded point cloud data. In addition, the point cloud content providing system (for example, the reception device 10004 or the receiver 10005) may demultiplex the bitstream.

The point cloud content providing system (e.g., the reception device 10004 or the point cloud video decoder 10005) may decode the encoded point cloud data (e.g., the geometry bitstream, the attribute bitstream) transmitted in the bitstream. The point cloud content providing system (for example, the reception device 10004 or the point cloud video decoder 10005) may decode the point cloud video data based on the signaling information related to encoding of the point cloud video data contained in the bitstream. The point cloud content providing system (for example, the reception device 10004 or the point cloud video decoder 10005) may decode the geometry bitstream to reconstruct the positions (geometry) of points. The point cloud content providing system may reconstruct the attributes of the points by decoding the attribute bitstream based on the reconstructed geometry. The point cloud content providing system (for example, the reception device 10004 or the point cloud video decoder 10005) may reconstruct the point cloud video based on the positions according to the reconstructed geometry and the decoded attributes.

The point cloud content providing system according to the embodiments (for example, the reception device 10004 or the renderer 10007) may render the decoded point cloud data (20004). The point cloud content providing system (for example, the reception device 10004 or the renderer 10007) may render the geometry and attributes decoded through the decoding process, using various rendering methods. Points in the point cloud content may be rendered to a vertex having a certain thickness, a cube having a specific minimum size centered on the corresponding vertex position, or a circle centered on the corresponding vertex position. All or part of the rendered point cloud content is provided to the user through a display (e.g., a VR/AR display, a general display, etc.).

The point cloud content providing system (for example, the reception device 10004) according to the embodiments may secure feedback information (20005). The point cloud content providing system may encode and/or decode point cloud data based on the feedback information. The feedback information and the operation of the point cloud content providing system according to the embodiments are the same as the feedback information and the operation described with reference to FIG. 1, and thus detailed description thereof is omitted.

Figure 3:
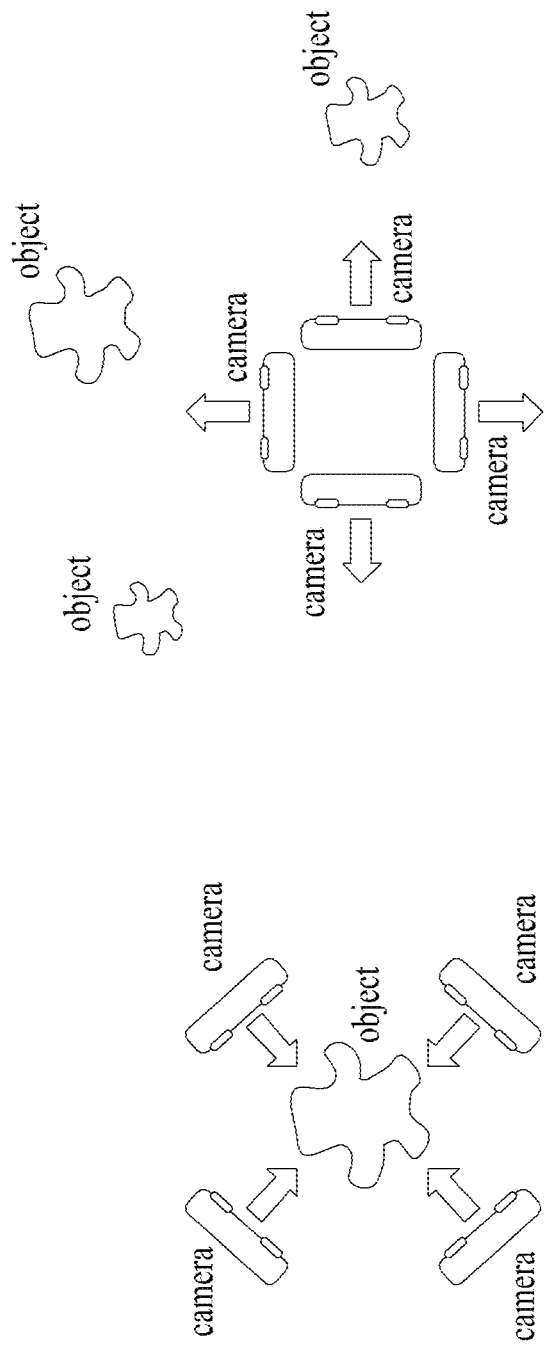
FIG. 3 illustrates an exemplary process of capturing a point cloud video according to embodiments.

FIG. 3 illustrates an exemplary process of capturing a point cloud video according to embodiments.

FIG. 3 illustrates an exemplary point cloud video capture process of the point cloud content providing system described with reference to FIGS. 1 to 2.

Point cloud content includes a point cloud video (images and/or videos) representing an object and/or environment located in various 3D spaces (e.g., a 3D space representing a real environment, a 3D space representing a virtual environment, etc.). Accordingly, the point cloud content providing system according to the embodiments may capture a point cloud video using one or more cameras (e.g., an infrared camera capable of securing depth information, an RGB camera capable of extracting color information corresponding to the depth information, etc.), a projector (e.g., an infrared pattern projector to secure depth information), a LiDAR, or the like. The point cloud content providing system according to the embodiments may extract the shape of geometry composed of points in a 3D space from the depth information and extract the attributes of each point from the color information to secure point cloud data. An image and/or video according to the embodiments may be captured based on at least one of the inward-facing technique and the outward-facing technique.

The left part of FIG. 3 illustrates the inward-facing technique. The inward-facing technique refers to a technique of capturing images a central object with one or more cameras (or camera sensors) positioned around the central object. The inward-facing technique may be used to generate point cloud content providing a 360-degree image of a key object to the user (e.g., VR/AR content providing a 360-degree image of an object (e.g., a key object such as a character, player, object, or actor) to the user).

The right part of FIG. 3 illustrates the outward-facing technique. The outward-facing technique refers to a technique of capturing images an environment of a central object rather than the central object with one or more cameras (or camera sensors) positioned around the central object. The outward-facing technique may be used to generate point cloud content for providing a surrounding environment that appears from the user's point of view (e.g., content representing an external environment that may be provided to a user of a self-driving vehicle).

As shown in FIG. 3, the point cloud content may be generated based on the capturing operation of one or more cameras. In this case, the coordinate system may differ among the cameras, and accordingly the point cloud content providing system may calibrate one or more cameras to set a global coordinate system before the capturing operation. In addition, the point cloud content providing system may generate point cloud content by synthesizing an arbitrary image and/or video with an image and/or video captured by the above-described capture technique. The point cloud content providing system may not perform the capturing operation described in FIG. 3 when it generates point cloud content representing a virtual space. The point cloud content providing system according to the embodiments may perform post-processing on the captured image and/or video. In other words, the point cloud content providing system may remove an unwanted area (for example, a background), recognize a space to which the captured images and/or videos are connected, and, when there is a spatial hole, perform an operation of filling the spatial hole.

The point cloud content providing system may generate one piece of point cloud content by performing coordinate transformation on points of the point cloud video secured from each camera. The point cloud content providing system may perform coordinate transformation on the points based on the coordinates of the position of each camera. Accordingly, the point cloud content providing system may generate content representing one wide range, or may generate point cloud content having a high density of points.

Figure 4:
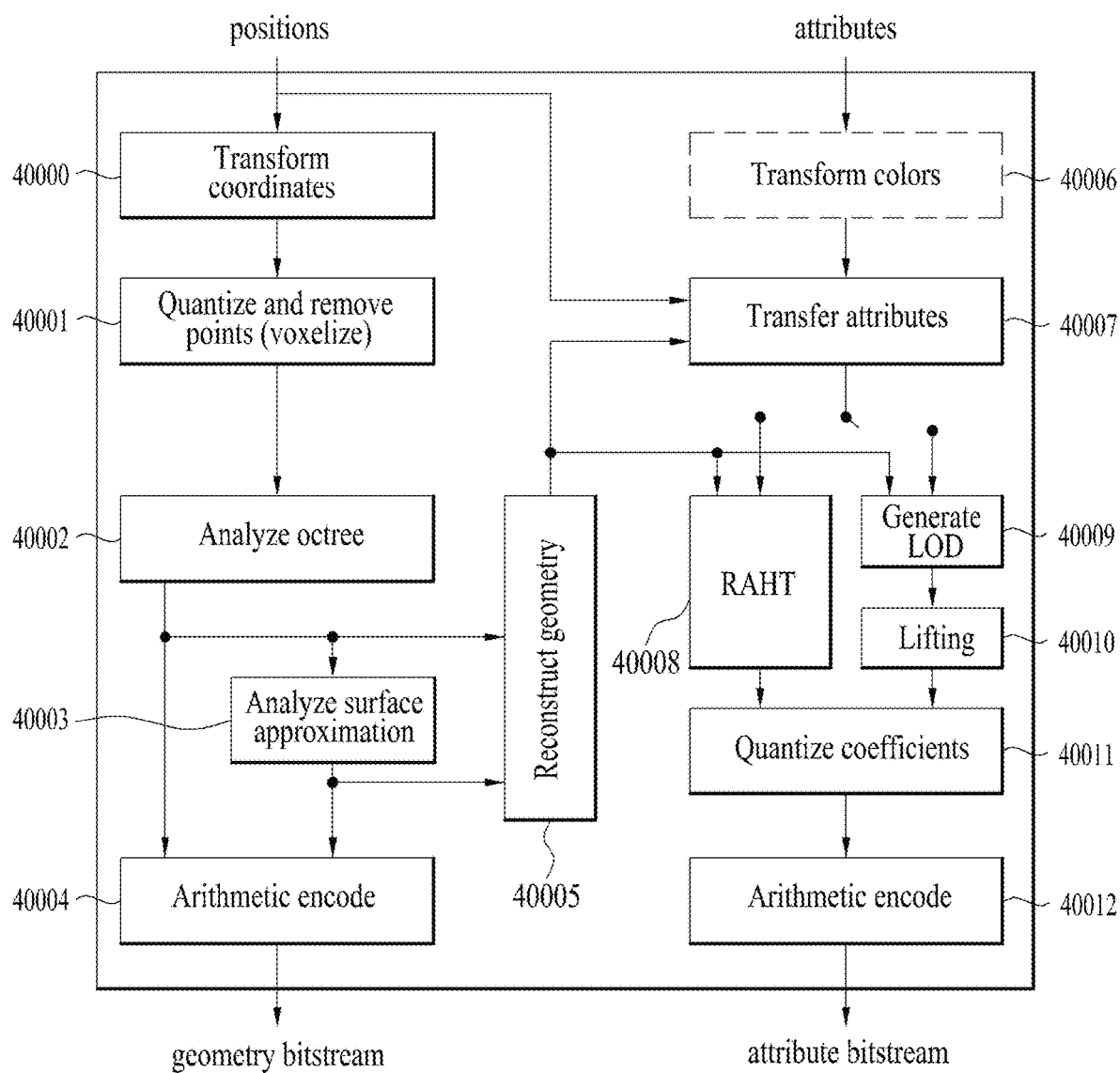
FIG. 4 is a block diagram illustrating an exemplary point cloud video encoder according to embodiments.

FIG. 4 illustrates an exemplary point cloud video encoder according to embodiments.

FIG. 4 shows an example of the point cloud video encoder 10002 of FIG. 1. The point cloud video encoder reconstructs and encodes point cloud data (e.g., positions and/or attributes of the points) to adjust the quality of the point cloud content (to, for example, lossless, lossy, or near-lossless) according to the network condition or applications. When the overall size of the point cloud content is large (e.g., point cloud content of 60 Gbps is given for 30 fps), the point cloud content providing system may fail to stream the content in real time. Accordingly, the point cloud content providing system may reconstruct the point cloud content based on the maximum target bitrate to provide the same in accordance with the network environment or the like.

As described with reference to FIGS. 1 to 2, the point cloud video encoder may perform geometry encoding and attribute encoding. The geometry encoding is performed before the attribute encoding.

The point cloud video encoder according to the embodiments includes a coordinate transformation unit 40000, a quantization unit 40001, an octree analysis unit 40002, and a surface approximation analysis unit 40003, an arithmetic encoder 40004, a geometry reconstruction unit 40005, a color transformation unit 40006, an attribute transformation unit 40007, a RAHT unit 40008, an LOD generation unit 40009, a lifting transformation unit 40010, a coefficient quantization unit 40011, and/or an arithmetic encoder 40012.

The coordinate transformation unit 40000, the quantization unit 40001, the octree analysis unit 40002, the surface approximation analysis unit 40003, the arithmetic encoder 40004, and the geometry reconstruction unit 40005 may perform geometry encoding. The geometry encoding according to the embodiments may include octree geometry coding, direct coding, trisoup geometry encoding, and entropy encoding. The direct coding and trisoup geometry encoding are applied selectively or in combination. The geometry encoding is not limited to the above-described example.

As shown in the figure, the coordinate transformation unit 40000 according to the embodiments receives positions and transforms the same into coordinates. For example, the positions may be transformed into position information in a three-dimensional space (for example, a three-dimensional space represented by an XYZ coordinate system). The position information in the three-dimensional space according to the embodiments may be referred to as geometry information.

The quantization unit 40001 according to the embodiments quantizes the geometry information. For example, the quantization unit 40001 may quantize the points based on a minimum position value of all points (for example, a minimum value on each of the X, Y, and Z axes). The quantization unit 40001 performs a quantization operation of multiplying the difference between the minimum position value and the position value of each point by a preset quantization scale value and then finding the nearest integer value by rounding the value obtained through the multiplication. Thus, one or more points may have the same quantized position (or position value). The quantization unit 40001 according to the embodiments performs voxelization based on the quantized positions to reconstruct quantized points. The voxelization means a minimum unit representing position information in 3D spacePoints of point cloud content (or 3D point cloud video) according to the embodiments may be included in one or more voxels. The term voxel, which is a compound of volume and pixel, refers to a 3D cubic space generated when a 3D space is divided into units (unit=1.0) based on the axes representing the 3D space (e.g., X-axis, Y-axis, and Z-axis). The quantization unit 40001 may match groups of points in the 3D space with voxels. According to embodiments, one voxel may include only one point. According to embodiments, one voxel may include one or more points. In order to express one voxel as one point, the position of the center point of a voxel may be set based on the positions of one or more points included in the voxel. In this case, attributes of all positions included in one voxel may be combined and assigned to the voxel.

The octree analysis unit 40002 according to the embodiments performs octree geometry coding (or octree coding) to present voxels in an octree structure. The octree structure represents points matched with voxels, based on the octal tree structure.

The surface approximation analysis unit 40003 according to the embodiments may analyze and approximate the octree. The octree analysis and approximation according to the embodiments is a process of analyzing a region containing a plurality of points to efficiently provide octree and voxelization.

The arithmetic encoder 40004 according to the embodiments performs entropy encoding on the octree and/or the approximated octree. For example, the encoding scheme includes arithmetic encoding. As a result of the encoding, a geometry bitstream is generated.

The color transformation unit 40006, the attribute transformation unit 40007, the RAHT unit 40008, the LOD generation unit 40009, the lifting transformation unit 40010, the coefficient quantization unit 40011, and/or the arithmetic encoder 40012 perform attribute encoding. As described above, one point may have one or more attributes. The attribute encoding according to the embodiments is equally applied to the attributes that one point has. However, when an attribute (e.g., color) includes one or more elements, attribute encoding is independently applied to each element. The attribute encoding according to the embodiments includes color transform coding, attribute transform coding, region adaptive hierarchical transform (RAHT) coding, interpolation-based hierarchical nearest-neighbor prediction (prediction transform) coding, and interpolation-based hierarchical nearest-neighbor prediction with an update/lifting step (lifting transform) coding. Depending on the point cloud content, the RAHT coding, the prediction transform coding and the lifting transform coding described above may be selectively used, or a combination of one or more of the coding schemes may be used. The attribute encoding according to the embodiments is not limited to the above-described example.

The color transformation unit 40006 according to the embodiments performs color transform coding of transforming color values (or textures) included in the attributes. For example, the color transformation unit 40006 may transform the format of color information (for example, from RGB to YCbCr). The operation of the color transformation unit 40006 according to embodiments may be optionally applied according to the color values included in the attributes.

The geometry reconstruction unit 40005 according to the embodiments reconstructs (decompresses) the octree and/or the approximated octree. The geometry reconstruction unit 40005 reconstructs the octree/voxels based on the result of analyzing the distribution of points. The reconstructed octree/voxels may be referred to as reconstructed geometry (restored geometry).

The attribute transformation unit 40007 according to the embodiments performs attribute transformation to transform the attributes based on the reconstructed geometry and/or the positions on which geometry encoding is not performed. As described above, since the attributes are dependent on the geometry, the attribute transformation unit 40007 may transform the attributes based on the reconstructed geometry information. For example, based on the position value of a point included in a voxel, the attribute transformation unit 40007 may transform the attribute of the point at the position. As described above, when the position of the center of a voxel is set based on the positions of one or more points included in the voxel, the attribute transformation unit 40007 transforms the attributes of the one or more points. When the trisoup geometry encoding is performed, the attribute transformation unit 40007 may transform the attributes based on the trisoup geometry encoding.

The attribute transformation unit 40007 may perform the attribute transformation by calculating the average of attributes or attribute values of neighboring points (e.g., color or reflectance of each point) within a specific position/radius from the position (or position value) of the center of each voxel. The attribute transformation unit 40007 may apply a weight according to the distance from the center to each point in calculating the average. Accordingly, each voxel has a position and a calculated attribute (or attribute value).

The attribute transformation unit 40007 may search for neighboring points existing within a specific position/radius from the position of the center of each voxel based on the K-D tree or the Morton code. The K-D tree is a binary search tree and supports a data structure capable of managing points based on the positions such that nearest neighbor search (NNS) can be performed quickly. The Morton code is generated by presenting coordinates (e.g., (x,y,z)) representing 3D positions of all points as bit values and mixing the bits. For example, when the coordinates representing the position of a point are (5, 9, 1), the bit values for the coordinates are (0101, 1001, 0001). Mixing the bit values according to the bit index in order of z, y, and x yields 010001000111. This value is expressed as a decimal number of 1095. That is, the Morton code value of the point having coordinates (5, 9, 1) is 1095. The attribute transformation unit 40007 may order the points based on the Morton code values and perform NNS through a depth-first traversal process. After the attribute transformation operation, the K-D tree or the Morton code is used when the NNS is needed in another transformation process for attribute coding.

As shown in the figure, the transformed attributes are input to the RAHT unit 40008 and/or the LOD generation unit 40009.

The RAHT unit 40008 according to the embodiments performs RAHT coding for predicting attribute information based on the reconstructed geometry information. For example, the RAHT unit 40008 may predict attribute information of a node at a higher level in the octree based on the attribute information associated with a node at a lower level in the octree.

The LOD generation unit 40009 according to the embodiments generates a level of detail (LOD). The LOD according to the embodiments is a degree of detail of point cloud content. As the LOD value decrease, it indicates that the detail of the point cloud content is degraded. As the LOD value increases, it indicates that the detail of the point cloud content is enhanced. Points may be classified by the LOD.

The lifting transformation unit 40010 according to the embodiments performs lifting transform coding of transforming the attributes a point cloud based on weights. As described above, lifting transform coding may be optionally applied.

The coefficient quantization unit 40011 according to the embodiments quantizes the attribute-coded attributes based on coefficients.

The arithmetic encoder 40012 according to the embodiments encodes the quantized attributes based on arithmetic coding.

Although not shown in the figure, the elements of the point cloud video encoder of FIG. 4 may be implemented by hardware including one or more processors or integrated circuits configured to communicate with one or more memories included in the point cloud content providing apparatus, software, firmware, or a combination thereof. The one or more processors may perform at least one of the operations and/or functions of the elements of the point cloud video encoder of FIG. 4 described above. Additionally, the one or more processors may operate or execute a set of software programs and/or instructions for performing the operations and/or functions of the elements of the point cloud video encoder of FIG. 4. The one or more memories according to the embodiments may include a high speed random access memory, or include a non-volatile memory (e.g., one or more magnetic disk storage devices, flash memory devices, or other non-volatile solid-state memory devices).

Figure 5:
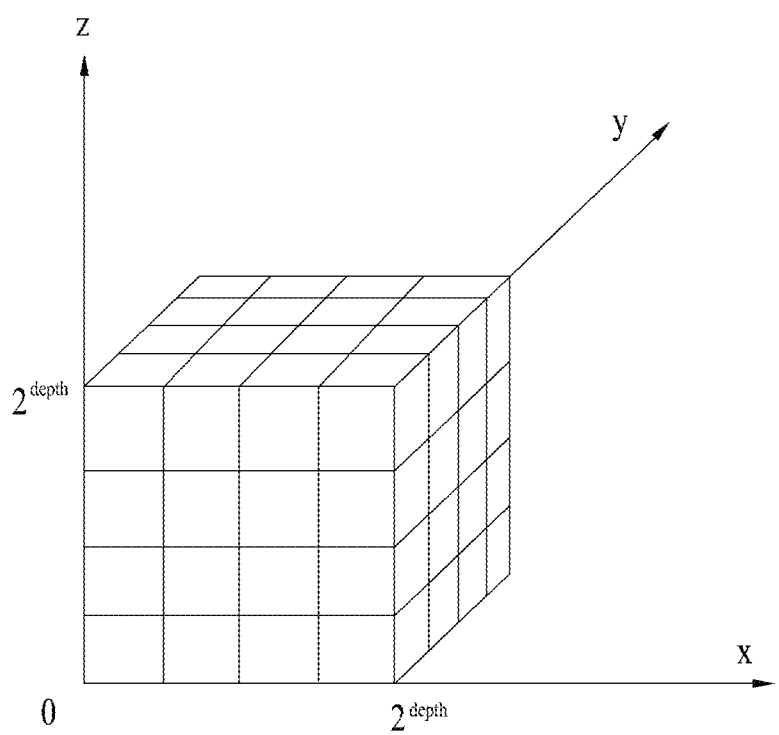
FIG. 5 illustrates an example of voxels in a 3D space according to embodiments.

FIG. 5 shows an example of voxels according to embodiments.

FIG. 5 shows voxels positioned in a 3D space represented by a coordinate system composed of three axes, which are the X-axis, the Y-axis, and the Z-axis. As described with reference to FIG. 4, the point cloud video encoder (e.g., the quantization unit 40001) may perform voxelization. Voxel refers to a 3D cubic space generated when a 3D space is divided into units (unit=1.0) based on the axes representing the 3D space (e.g., X-axis, Y-axis, and Z-axis). FIG. 5 shows an example of voxels generated through an octree structure in which a cubical axis-aligned bounding box defined by two poles (0, 0, 0) and ($2^d$, $2^d$, $2^d$) is recursively subdivided. One voxel includes at least one point. The spatial coordinates of a voxel may be estimated from the positional relationship with a voxel group. As described above, a voxel has an attribute (such as color or reflectance) like pixels of a 2D image/video. The details of the voxel are the same as those described with reference to FIG. 4, and therefore a description thereof is omitted.

FIG. 6 shows an example of an octree and occupancy code according to embodiments.

As described with reference to FIGS. 1 to 4, the point cloud content providing system (point cloud video encoder 10002) or the octree analysis unit 40002 of the point cloud video encoder performs octree geometry coding (or octree coding) based on an octree structure to efficiently manage the region and/or position of the voxel.

The upper part of FIG. 6 shows an octree structure. The 3D space of the point cloud content according to the embodiments is represented by axes (e.g., X-axis, Y-axis, and Z-axis) of the coordinate system. The octree structure is created by recursive subdividing of a cubical axis-aligned bounding box defined by two poles (0, 0, 0) and ($2^d$, $2^d$, $2^d$). Here, $2^d$ may be set to a value constituting the smallest bounding box surrounding all points of the point cloud content (or point cloud video). Here, d denotes the depth of the octree. The value of d is determined in Equation 1. In Equation 1, $(x^{int}_n, y^{int}_n, z^{int}_n)$ denotes the positions (or position values) of quantized points.

$$d = \text{Ceil}(\text{Log } 2(\text{Max}(x_n^{int}, y_n^{int}, z_n^{int}, n=1, \ldots, N)+1)) \quad \text{[Equation 1]}$$

As shown in the middle of the upper part of FIG. 6, the entire 3D space may be divided into eight spaces according to partition. Each divided space is represented by a cube with six faces. As shown in the upper right of FIG. 6, each of the eight spaces is divided again based on the axes of the coordinate system (e.g., X-axis, Y-axis, and Z-axis). Accordingly, each space is divided into eight smaller spaces. The divided smaller space is also represented by a cube with six faces. This partitioning scheme is applied until the leaf node of the octree becomes a voxel.

The lower part of FIG. 6 shows an octree occupancy code. The occupancy code of the octree is generated to indicate whether each of the eight divided spaces generated by dividing one space contains at least one point. Accordingly, a single occupancy code is represented by eight child nodes. Each child node represents the occupancy of a divided space, and the child node has a value in 1 bit. Accordingly, the occupancy code is represented as an 8-bit code. That is, when at least one point is contained in the space corresponding to a child node, the node is assigned a value of 1. When no point is contained in the space corresponding to the child node (the space is empty), the node is assigned a value of 0. Since the occupancy code shown in FIG. 6 is 00100001, it indicates that the spaces corresponding to the third child node and the eighth child node among the eight child nodes each contain at least one point. As shown in the figure, each of the third child node and the eighth child node has eight child nodes, and the child nodes are represented by an 8-bit occupancy code. The figure shows that the occupancy code of the third child node is 10000111, and the occupancy code of the eighth child node is 01001111. The point cloud video encoder (for example, the arithmetic encoder 40004) according to the embodiments may perform entropy encoding on the occupancy codes. In order to increase the compression efficiency, the point cloud video encoder may perform intra/inter-coding on the occupancy codes. The reception device (for example, the reception device 10004 or the point cloud video decoder 10006) according to the embodiments reconstructs the octree based on the occupancy codes.

The point cloud video encoder (for example, the octree analysis unit 40002) according to the embodiments may perform voxelization and octree coding to store the positions of points. However, points are not always evenly distributed in the 3D space, and accordingly there may be a specific region in which fewer points are present. Accordingly, it is inefficient to perform voxelization for the entire 3D space. For example, when a specific region contains few points, voxelization does not need to be performed in the specific region.

Accordingly, for the above-described specific region (or a node other than the leaf node of the octree), the point cloud video encoder according to the embodiments may skip voxelization and perform direct coding to directly code the positions of points included in the specific region. The coordinates of a direct coding point according to the embodiments are referred to as direct coding mode (DCM). The point cloud video encoder according to the embodiments may also perform trisoup geometry encoding, which is to reconstruct the positions of the points in the specific region (or node) based on voxels, based on a surface model.

The trisoup geometry encoding is geometry encoding that represents an object as a series of triangular meshes. Accordingly, the point cloud video decoder may generate a point cloud from the mesh surface. The direct coding and trisoup geometry encoding according to the embodiments may be selectively performed. In addition, the direct coding and trisoup geometry encoding according to the embodiments may be performed in combination with octree geometry coding (or octree coding).

To perform direct coding, the option to use the direct mode for applying direct coding should be activated. A node to which direct coding is to be applied is not a leaf node, and points less than a threshold should be present within a specific node. In addition, the total number of points to which direct coding is to be applied should not exceed a preset threshold. When the conditions above are satisfied, the point cloud video encoder (or the arithmetic encoder 40004) according to the embodiments may perform entropy coding on the positions (or position values) of the points.

The point cloud video encoder (for example, the surface approximation analysis unit 40003) according to the embodiments may determine a specific level of the octree (a level less than the depth d of the octree), and the surface model may be used staring with that level to perform trisoup geometry encoding to reconstruct the positions of points in the region of the node based on voxels (Trisoup mode). The point cloud video encoder according to the embodiments may specify a level at which trisoup geometry encoding is to be applied. For example, when the specific level is equal to the depth of the octree, the point cloud video encoder does not operate in the trisoup mode. In other words, the point cloud video encoder according to the embodiments may operate in the trisoup mode only when the specified level is less than the value of depth of the octree. The 3D cube region of the nodes at the specified level according to the embodiments is called a block. One block may include one or more voxels. The block or voxel may correspond to a brick. Geometry is represented as a surface within each block. The surface according to embodiments may intersect with each edge of a block at most once.

One block has 12 edges, and accordingly there are at least 12 intersections in one block. Each intersection is called a vertex (or apex). A vertex present along an edge is detected when there is at least one occupied voxel adjacent to the edge among all blocks sharing the edge. The occupied voxel according to the embodiments refers to a voxel containing a point. The position of the vertex detected along the edge is the average position along the edge of all voxels adjacent to the edge among all blocks sharing the edge.

Once the vertex is detected, the point cloud video encoder according to the embodiments may perform entropy encoding on the start point (x,y,z) of the edge, the direction vector ($\Delta x$, $\Delta y$, $\Delta z$) of the edge, and the vertex position value (relative position value within the edge). When the trisoup geometry encoding is applied, the point cloud video encoder according to the embodiments (for example, the geometry reconstruction unit 40005) may generate restored geometry (reconstructed geometry) by performing the triangle reconstruction, up-sampling, and voxelization processes.

The vertices positioned at the edge of the block determine a surface that passes through the block. The surface according to the embodiments is a non-planar polygon. In the triangle reconstruction process, a surface represented by a triangle is reconstructed based on the start point of the edge, the direction vector of the edge, and the position values of the vertices. The triangle reconstruction process is performed according to Equation 2 by: i) calculating the centroid value of each vertex, ii) subtracting the center value from each vertex value, and iii) estimating the sum of the squares of the values obtained by the subtraction.

[Equation 2]

$$\begin{bmatrix} \mu_x \\ \mu_y \\ \mu_z \end{bmatrix} = \frac{1}{n}\sum_{i=1}^{n}\begin{bmatrix} x_i \\ y_i \\ z_i \end{bmatrix} \quad 1$$

$$\begin{bmatrix} \bar{x}_i \\ \bar{y}_i \\ \bar{z}_i \end{bmatrix} = \begin{bmatrix} x_i \\ y_i \\ z_i \end{bmatrix} - \begin{bmatrix} \mu_x \\ \mu_y \\ \mu_z \end{bmatrix} \quad 2$$

$$\begin{bmatrix} \sigma_x^2 \\ \sigma_y^2 \\ \sigma_z^2 \end{bmatrix} = \sum_{i=1}^{n}\begin{bmatrix} \bar{x}_i^2 \\ \bar{y}_i^2 \\ \bar{z}_i^2 \end{bmatrix} \quad 3$$

Then, the minimum value of the sum is estimated, and the projection process is performed according to the axis with the minimum value. For example, when the element x is the minimum, each vertex is projected on the x-axis with respect to the center of the block, and projected on the (y, z) plane. When the values obtained through projection on the (y, z) plane are (ai, bi), the value of θ is estimated through atan 2(bi, ai), and the vertices are ordered based on the value of θ. Table 1 below shows a combination of vertices for creating a triangle according to the number of the vertices. The vertices are ordered from 1 to n. Table 1 below shows that for four vertices, two triangles may be constructed according to combinations of vertices. The first triangle may consist of vertices 1, 2, and 3 among the ordered vertices, and the second triangle may consist of vertices 3, 4, and 1 among the ordered vertices.

[Table 1] Triangles formed from vertices ordered 1, . . . , n encoder 10002 of FIG. 1, or the point cloud video encoder or arithmetic encoder 40004 of FIG. 4 may perform entropy coding on the occupancy code immediately. In addition, the point cloud content providing system or the point cloud video encoder may perform entropy encoding (intra encoding) based on the occupancy code of the current node and the occupancy of neighbor nodes, or perform entropy encoding (inter encoding) based on the occupancy code of the previous frame. A frame according to embodiments represents a set of point cloud videos generated at the same time. The compression efficiency of intra encoding/inter encoding according to the embodiments may depend on the number of neighbor nodes that are referenced. When the bits increase, the operation becomes complicated, but the encoding may be biased to one side, which may increase the compression efficiency. For example, when a 3-bit context is given, coding needs to be performed using $2^3=8$ methods. The part divided for coding affects the complexity of implementation. Accordingly, it is necessary to meet an appropriate level of compression efficiency and complexity.

FIG. 7 illustrates a process of obtaining an occupancy pattern based on the occupancy of neighbor nodes. The point cloud video encoder according to the embodiments determines occupancy of neighbor nodes of each node of the octree and obtains a value of a neighbor pattern. The neighbor node pattern is used to infer the occupancy pattern of the node. The up part of FIG. 7 shows a cube corresponding to a node (a cube positioned in the middle) and six cubes (neighbor nodes) sharing at least one face with the cube. The nodes shown in the figure are nodes of the same depth. The numbers shown in the figure represent weights (1, 2, 4, 8, 16, and 32) associated with the six nodes, respectively. The weights are assigned sequentially according to the positions of neighbor nodes.

TABLE 1

| n | Triangles |
|---|---|
| 3 | (1, 2, 3) |
| 4 | (1, 2, 3), (3, 4, 1) |
| 5 | (1, 2, 3), (3, 4, 5), (5, 1, 3) |
| 6 | (1, 2, 3), (3, 4, 5), (5, 6, 1), (1, 3, 5) |
| 7 | (1, 2, 3), (3, 4, 5), (5, 6, 7), (7, 1, 3), (3, 5, 7) |
| 8 | (1, 2, 3), (3, 4, 5), (5, 6, 7), (7, 8, 1), (1, 3, 5), (5, 7, 1) |
| 9 | (1, 2, 3), (3, 4, 5), (5, 6, 7), (7, 8, 9), (9, 1, 3), (3, 5, 7), (7, 9, 3) |
| 10 | (1, 2, 3), (3, 4, 5), (5, 6, 7), (7, 8, 9), (9, 10, 1), (1, 3, 5), (5, 7, 9), (9, 1, 5) |
| 11 | (1, 2, 3), (3, 4, 5), (5, 6, 7), (7, 8, 9), (9, 10, 11), (11, 1, 3), (3, 5, 7), (7, 9, 11), (11, 3, 7) |
| 12 | (1, 2, 3), (3, 4, 5), (5, 6, 7), (7, 8, 9), (9, 10, 11), (11, 12, 1), (1, 3, 5), (5, 7, 9), (9, 11, 1), (1, 5, 9) |

The upsampling process is performed to add points in the middle along the edge of the triangle and perform voxelization. The added points are generated based on the upsampling factor and the width of the block. The added points are called refined vertices. The point cloud video encoder according to the embodiments may voxelize the refined vertices. In addition, the point cloud video encoder may perform attribute encoding based on the voxelized positions (or position values).

FIG. 7 shows an example of a neighbor node pattern according to embodiments.

In order to increase the compression efficiency of the point cloud video, the point cloud video encoder according to the embodiments may perform entropy coding based on context adaptive arithmetic coding.

As described with reference to FIGS. 1 to 6, the point cloud content providing system or the point cloud video The down part of FIG. 7 shows neighbor node pattern values. A neighbor node pattern value is the sum of values multiplied by the weight of an occupied neighbor node (a neighbor node having a point). Accordingly, the neighbor node pattern values are 0 to 63. When the neighbor node pattern value is 0, it indicates that there is no node having a point (no occupied node) among the neighbor nodes of the node. When the neighbor node pattern value is 63, it indicates that all neighbor nodes are occupied nodes. As shown in the figure, since neighbor nodes to which weights 1, 2, 4, and 8 are assigned are occupied nodes, the neighbor node pattern value is 15, the sum of 1, 2, 4, and 8. The point cloud video encoder may perform coding according to the neighbor node pattern value (for example, when the neighbor node pattern value is 63, 64 kinds of coding may be performed). According to embodiments, the point cloud video encoder may reduce coding complexity by changing a neighbor node pattern value (for example, based on a table by which 64 is changed to 10 or 6).

Figure 8:
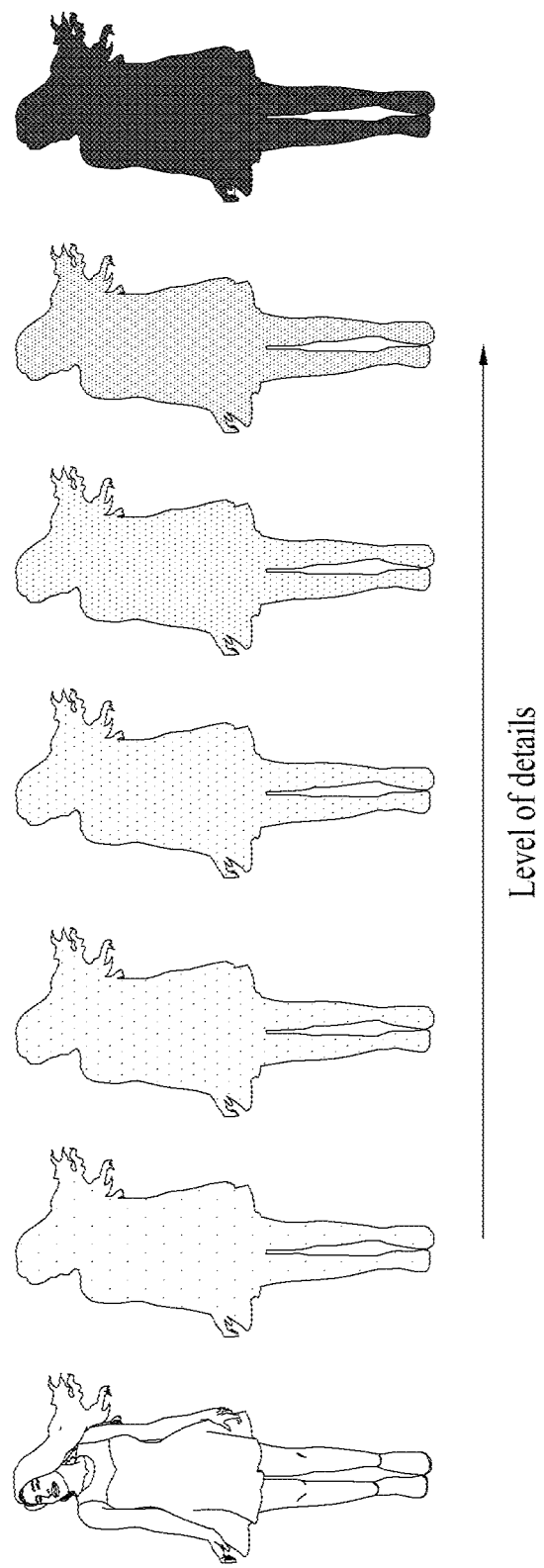
FIG. 8 illustrates an example of point configuration of a point cloud content for each LOD according to embodiments.

FIG. 8 illustrates an example of point configuration in each LOD according to embodiments.

As described with reference to FIGS. 1 to 7, encoded geometry is reconstructed (decompressed) before attribute encoding is performed. When direct coding is applied, the geometry reconstruction operation may include changing the placement of direct coded points (e.g., placing the direct coded points in front of the point cloud data). When trisoup geometry encoding is applied, the geometry reconstruction process is performed through triangle reconstruction, up-sampling, and voxelization. Since the attribute depends on the geometry, attribute encoding is performed based on the reconstructed geometry.

The point cloud video encoder (for example, the LOD generation unit 40009) may classify (reorganize or group) points by LOD. FIG. 8 shows the point cloud content corresponding to LODs. The leftmost picture in FIG. 8 represents original point cloud content. The second picture from the left of FIG. 8 represents distribution of the points in the lowest LOD, and the rightmost picture in FIG. 8 represents distribution of the points in the highest LOD. That is, the points in the lowest LOD are sparsely distributed, and the points in the highest LOD are densely distributed. That is, as the LOD rises in the direction pointed by the arrow indicated at the bottom of FIG. 8, the space (or distance) between points is narrowed.

Figure 9:
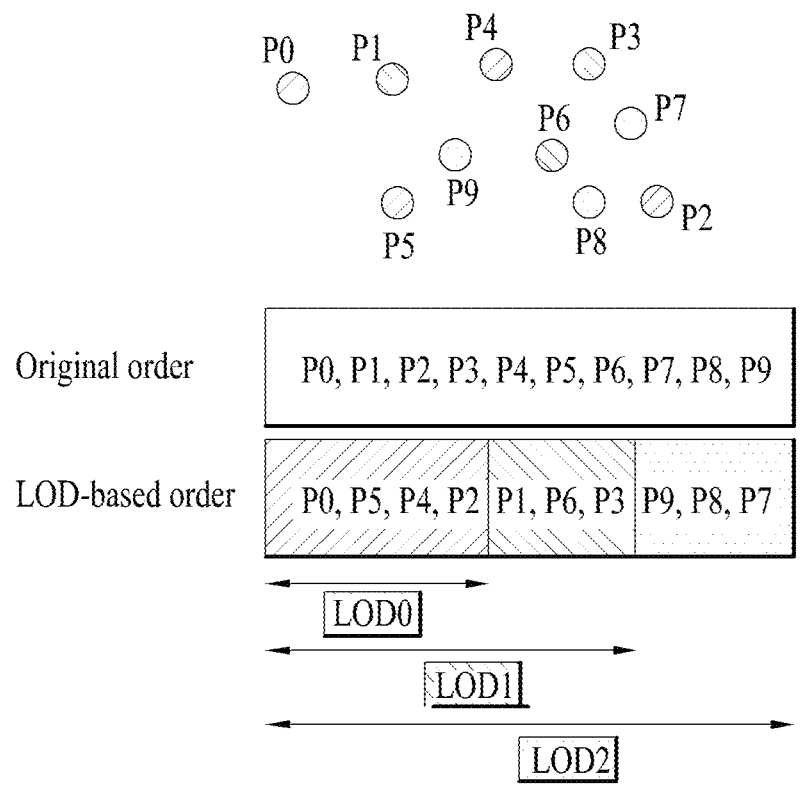
FIG. 9 illustrates an example of point configuration of a point cloud content for each LOD according to embodiments.

FIG. 9 illustrates an example of point configuration for each LOD according to embodiments.

As described with reference to FIGS. 1 to 8, the point cloud content providing system, or the point cloud video encoder (for example, the point cloud video encoder 10002 of FIG. 1, the point cloud video encoder of FIG. 4, or the LOD generation unit 40009) may generates an LOD. The LOD is generated by reorganizing the points into a set of refinement levels according to a set LOD distance value (or a set of Euclidean distances). The LOD generation process is performed not only by the point cloud video encoder, but also by the point cloud video decoder.

The upper part of FIG. 9 shows examples (P0 to P9) of points of the point cloud content distributed in a 3D space. In FIG. 9, the original order represents the order of points P0 to P9 before LOD generation. In FIG. 9, the LOD based order represents the order of points according to the LOD generation. Points are reorganized by LOD. Also, a high LOD contains the points belonging to lower LODs. As shown in FIG. 9, LOD0 contains P0, P5, P4 and P2. LOD1 contains the points of LOD0, P1, P6 and P3. LOD2 contains the points of LOD0, the points of LOD1, P9, P8 and P7.

As described with reference to FIG. 4, the point cloud video encoder according to the embodiments may perform prediction transform coding based on LOD, lifting transform coding based on LOD, and RAHT transform coding selectively or in combination.

The point cloud video encoder according to the embodiments may generate a predictor for points to perform prediction transform coding based on LOD for setting a predicted attribute (or predicted attribute value) of each point. That is, N predictors may be generated for N points. The predictor according to the embodiments may calculate a weight (=1/distance) based on the LOD value of each point, indexing information about neighboring points present within a set distance for each LOD, and a distance to the neighboring points.

The predicted attribute (or attribute value) according to the embodiments is set to the average of values obtained by multiplying the attributes (or attribute values) (e.g., color, reflectance, etc.) of neighbor points set in the predictor of each point by a weight (or weight value) calculated based on the distance to each neighbor point. The point cloud video encoder according to the embodiments (for example, the coefficient quantization unit 40011) may quantize and inversely quantize the residual of each point (which may be called residual attribute, residual attribute value, attribute prediction residual value or prediction error attribute value and so on) obtained by subtracting a predicted attribute (or attribute value) each point from the attribute (i.e., original attribute value) of each point. The quantization process performed for a residual attribute value in a transmission device is configured as shown in Table 2. The inverse quantization process performed for a residual attribute value in a reception device is configured as shown in Table 3.

TABLE 2

```
int PCCQuantization(int value, int quantStep) {
if( value >=0) {
return floor(value / quantStep + 1.0 / 3.0);
} else {
return -floor(-value / quantStep + 1.0 / 3.0);
}
}
```

TABLE 3

```
int PCCInverseQuantization(int value, int quantStep) {
if( quantStep ==0) {
return value;
} else {
return value * quantStep;
}
}
```

When the predictor of each point has neighbor points, the point cloud video encoder (e.g., the arithmetic encoder 40012) according to the embodiments may perform entropy coding on the quantized and inversely quantized residual attribute values as described above. When the predictor of each point has no neighbor point, the point cloud video encoder according to the embodiments (for example, the arithmetic encoder 40012) may perform entropy coding on the attributes of the corresponding point without performing the above-described operation.

The point cloud video encoder according to the embodiments (for example, the lifting transformation unit 40010) may generate a predictor of each point, set the calculated LOD and register neighbor points in the predictor, and set weights according to the distances to neighbor points to perform lifting transform coding. The lifting transform coding according to the embodiments is similar to the above-described prediction transform coding, but differs therefrom in that weights are cumulatively applied to attribute values. The process of cumulatively applying weights to the attribute values according to embodiments is configured as follows.

1) Create an array Quantization Weight (QW) for storing the weight value of each point. The initial value of all elements of QW is 1.0. Multiply the QW values of the predictor indexes of the neighbor nodes registered in the predictor by the weight of the predictor of the current point, and add the values obtained by the multiplication.

2) Lift prediction process: Subtract the value obtained by multiplying the attribute value of the point by the weight from the existing attribute value to calculate a predicted attribute value.

3) Create temporary arrays called updateweight and update and initialize the temporary arrays to zero.

4) Cumulatively add the weights calculated by multiplying the weights calculated for all predictors by a weight stored in the QW corresponding to a predictor index to the updateweight array as indexes of neighbor nodes. Cumulatively add, to the update array, a value obtained by multiplying the attribute value of the index of a neighbor node by the calculated weight.

5) Lift update process: Divide the attribute values of the update array for all predictors by the weight value of the updateweight array of the predictor index, and add the existing attribute value to the values obtained by the division.

6) Calculate predicted attributes by multiplying the attribute values updated through the lift update process by the weight updated through the lift prediction process (stored in the QW) for all predictors. The point cloud video encoder (e.g., coefficient quantization unit 40011) according to the embodiments quantizes the predicted attribute values. In addition, the point cloud video encoder (e.g., the arithmetic encoder 40012) performs entropy coding on the quantized attribute values.

The point cloud video encoder (for example, the RAHT unit 40008) according to the embodiments may perform RAHT transform coding in which attributes of nodes of a higher level are predicted using the attributes associated with nodes of a lower level in the octree. RAHT transform coding is an example of attribute intra coding through an octree backward scan. The point cloud video encoder according to the embodiments scans the entire region from the voxel and repeats the merging process of merging the voxels into a larger block at each step until the root node is reached. The merging process according to the embodiments is performed only on the occupied nodes. The merging process is not performed on the empty node. The merging process is performed on a higher mode immediately above the empty node.

Equation 3 below represents a RAHT transformation matrix. In Equation 3, $g_{l_{x,y,z}}$ denotes the average attribute value of voxels at level l. $g_{l_{x,y,z}}$ may be calculated based on $g_{l+1_{2x,y,x}}$ and $g_{l+1_{2x+1,y,z}}$. The weights for $g_{l_{2x,y,z}}$ and $g_{l_{2x+1,y,z}}$ are $w1=w_{l_{2x,y,z}}$ and $w2=w_{l_{2x+1,y,z}}$.

[Equation 3]

$$\begin{bmatrix} g_{l-1_{x,y,z}} \\ h_{l-1_{x,y,z}} \end{bmatrix} = T_{w1w2} \begin{bmatrix} g_{l_{2x,y,z}} \\ g_{l_{2x+1,y,z}} \end{bmatrix} \quad T_{w1w2} = \frac{1}{\sqrt{w1+w2}} \begin{bmatrix} \sqrt{w1} & \sqrt{w2} \\ -\sqrt{w2} & \sqrt{w1} \end{bmatrix}$$

Here, $g_{l-1_{x,y,x}}$ is a low-pass value and is used in the merging process at the next higher level. $h_{l-1_{x,y,z}}$ denotes high-pass coefficients. The high-pass coefficients at each step are quantized and subjected to entropy coding (for example, encoding by the arithmetic encoder 40012). The weights are calculated as $w_{l-1_{x,y,z}} = w_{l_{2x,y,z}} + w_{l_{2x+1,y,z}}$. The root node is created through the $g_{1_{0,0,0}}$ and $g_{1_{0,0,1}}$ as Equation 4.

[Equation 4]

$$\begin{bmatrix} gDC \\ h0_{0,0,0} \end{bmatrix} = T_{w1000\,w1001} \begin{bmatrix} g1_{0,0,0z} \\ g1_{0,0,1} \end{bmatrix}$$

The value of gDC is also quantized and subjected to entropy coding like the high-pass coefficients.

Figure 10:
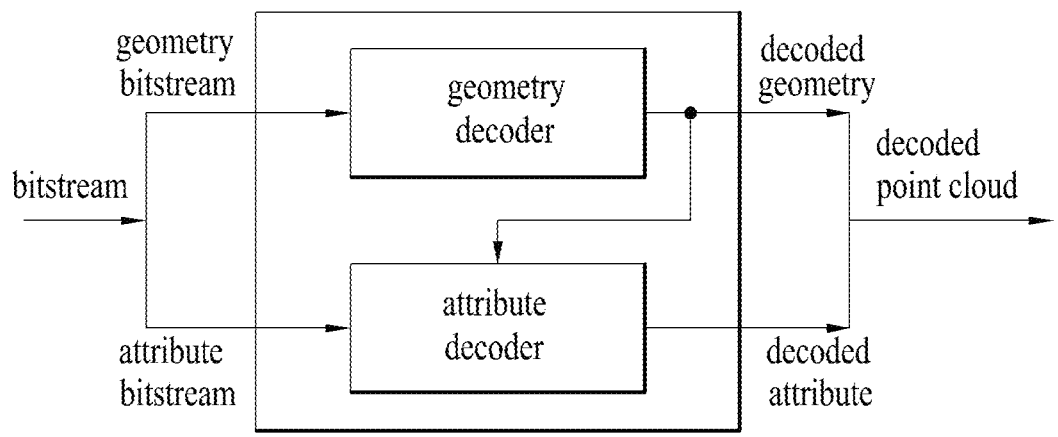
FIG. 10 illustrates an example of a block diagram of a point cloud video decoder according to embodiments.

FIG. 10 illustrates a point cloud video decoder according to embodiments.

The point cloud video decoder illustrated in FIG. 10 is an example of the point cloud video decoder 10006 described in FIG. 1, and may perform the same or similar operations as the operations of the point cloud video decoder 10006 illustrated in FIG. 1. As shown in the figure, the point cloud video decoder may receive a geometry bitstream and an attribute bitstream contained in one or more bitstreams. The point cloud video decoder includes a geometry decoder and an attribute decoder. The geometry decoder performs geometry decoding on the geometry bitstream and outputs decoded geometry. The attribute decoder performs attribute decoding on the attribute bitstream based on the decoded geometry, and outputs decoded attributes. The decoded geometry and decoded attributes are used to reconstruct point cloud content (a decoded point cloud).

Figure 11:
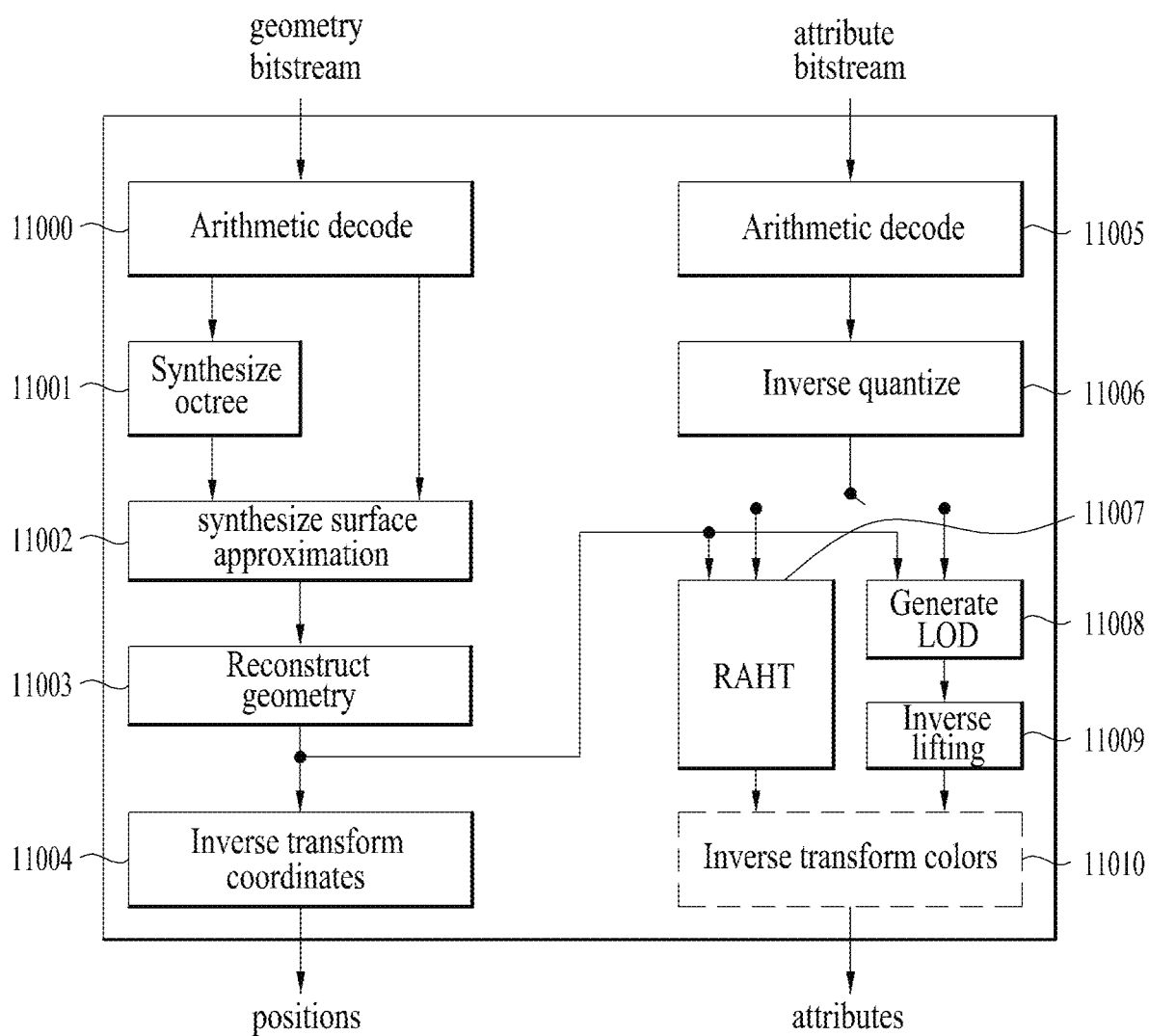
FIG. 11 illustrates an exemplary point cloud video decoder according to embodiments.

FIG. 11 illustrates a point cloud video decoder according to embodiments.

The point cloud video decoder illustrated in FIG. 11 is an example of the point cloud video decoder illustrated in FIG. 10, and may perform a decoding operation, which is an inverse process of the encoding operation of the point cloud video encoder illustrated in FIGS. 1 to 9.

As described with reference to FIGS. 1 and 10, the point cloud video decoder may perform geometry decoding and attribute decoding. The geometry decoding is performed before the attribute decoding.

The point cloud video decoder according to the embodiments includes an arithmetic decoder (Arithmetic decode) 11000, an octree synthesizer (Synthesize octree) 11001, a surface approximation synthesizer (Synthesize surface approximation) 11002, and a geometry reconstruction unit (Reconstruct geometry) 11003, a coordinate inverse transformer (Inverse transform coordinates) 11004, an arithmetic decoder (Arithmetic decode) 11005, an inverse quantization unit (Inverse quantize) 11006, a RAHT transformer 11007, an LOD generator (Generate LOD) 11008, an inverse lifter (inverse lifting) 11009, and/or an inverse color transformation unit (Inverse transform colors) 11010.

The arithmetic decoder 11000, the octree synthesizer 11001, the surface approximation synthesizer 11002, and the geometry reconstruction unit 11003, and the coordinate inverse transformer 11004 may perform geometry decoding. The geometry decoding according to the embodiments may include direct decoding and trisoup geometry decoding. The direct decoding and trisoup geometry decoding are selectively applied. The geometry decoding is not limited to the above-described example, and is performed as an inverse process of the geometry encoding described with reference to FIGS. 1 to 9.

The arithmetic decoder 11000 according to the embodiments decodes the received geometry bitstream based on the arithmetic coding. The operation of the arithmetic decoder 11000 corresponds to the inverse process of the arithmetic encoder 40004.

The octree synthesizer 11001 according to the embodiments may generate an octree by acquiring an occupancy code from the decoded geometry bitstream (or information on the geometry secured as a result of decoding). The occupancy code is configured as described in detail with reference to FIGS. 1 to 9.

When the trisoup geometry encoding is applied, the surface approximation synthesizer 11002 according to the embodiments may synthesize a surface based on the decoded geometry and/or the generated octree.

The geometry reconstruction unit 11003 according to the embodiments may regenerate geometry based on the surface and/or the decoded geometry. As described with reference to FIGS. 1 to 9, direct coding and trisoup geometry encoding are selectively applied. Accordingly, the geometry reconstruction unit 11003 directly imports and adds position information about the points to which direct coding is applied. When the trisoup geometry encoding is applied, the geometry reconstruction unit 11003 may reconstruct the geometry by performing the reconstruction operations of the geometry reconstruction unit 40005, for example, triangle reconstruction, up-sampling, and voxelization. Details are the same as those described with reference to FIG. 6, and thus description thereof is omitted. The reconstructed geometry may include a point cloud picture or frame that does not contain attributes.

The coordinate inverse transformer 11004 according to the embodiments may acquire positions of the points by transforming the coordinates based on the reconstructed geometry.

The arithmetic decoder 11005, the inverse quantization unit 11006, the RAHT transformer 11007, the LOD generation unit 11008, the inverse lifter 11009, and/or the inverse color transformation unit 11010 may perform the attribute decoding described with reference to FIG. 10. The attribute decoding according to the embodiments includes region adaptive hierarchical transform (RAHT) decoding, interpolation-based hierarchical nearest-neighbor prediction (prediction transform) decoding, and interpolation-based hierarchical nearest-neighbor prediction with an update/lifting step (lifting transform) decoding. The three decoding schemes described above may be used selectively, or a combination of one or more decoding schemes may be used. The attribute decoding according to the embodiments is not limited to the above-described example.

The arithmetic decoder 11005 according to the embodiments decodes the attribute bitstream by arithmetic coding.

The inverse quantization unit 11006 according to the embodiments inversely quantizes the information about the decoded attribute bitstream or attributes secured as a result of the decoding, and outputs the inversely quantized attributes (or attribute values). The inverse quantization may be selectively applied based on the attribute encoding of the point cloud video encoder.

According to embodiments, the RAHT transformer 11007, the LOD generation unit 11008, and/or the inverse lifter 11009 may process the reconstructed geometry and the inversely quantized attributes. As described above, the RAHT transformer 11007, the LOD generation unit 11008, and/or the inverse lifter 11009 may selectively perform a decoding operation corresponding to the encoding of the point cloud video encoder.

The inverse color transformation unit 11010 according to the embodiments performs inverse transform coding to inversely transform a color value (or texture) included in the decoded attributes. The operation of the inverse color transformation unit 11010 may be selectively performed based on the operation of the color transformation unit 40006 of the point cloud video encoder.

Although not shown in the figure, the elements of the point cloud video decoder of FIG. 11 may be implemented by hardware including one or more processors or integrated circuits configured to communicate with one or more memories included in the point cloud content providing apparatus, software, firmware, or a combination thereof. The one or more processors may perform at least one or more of the operations and/or functions of the elements of the point cloud video decoder of FIG. 11 described above. Additionally, the one or more processors may operate or execute a set of software programs and/or instructions for performing the operations and/or functions of the elements of the point cloud video decoder of FIG. 11.

Figure 12:
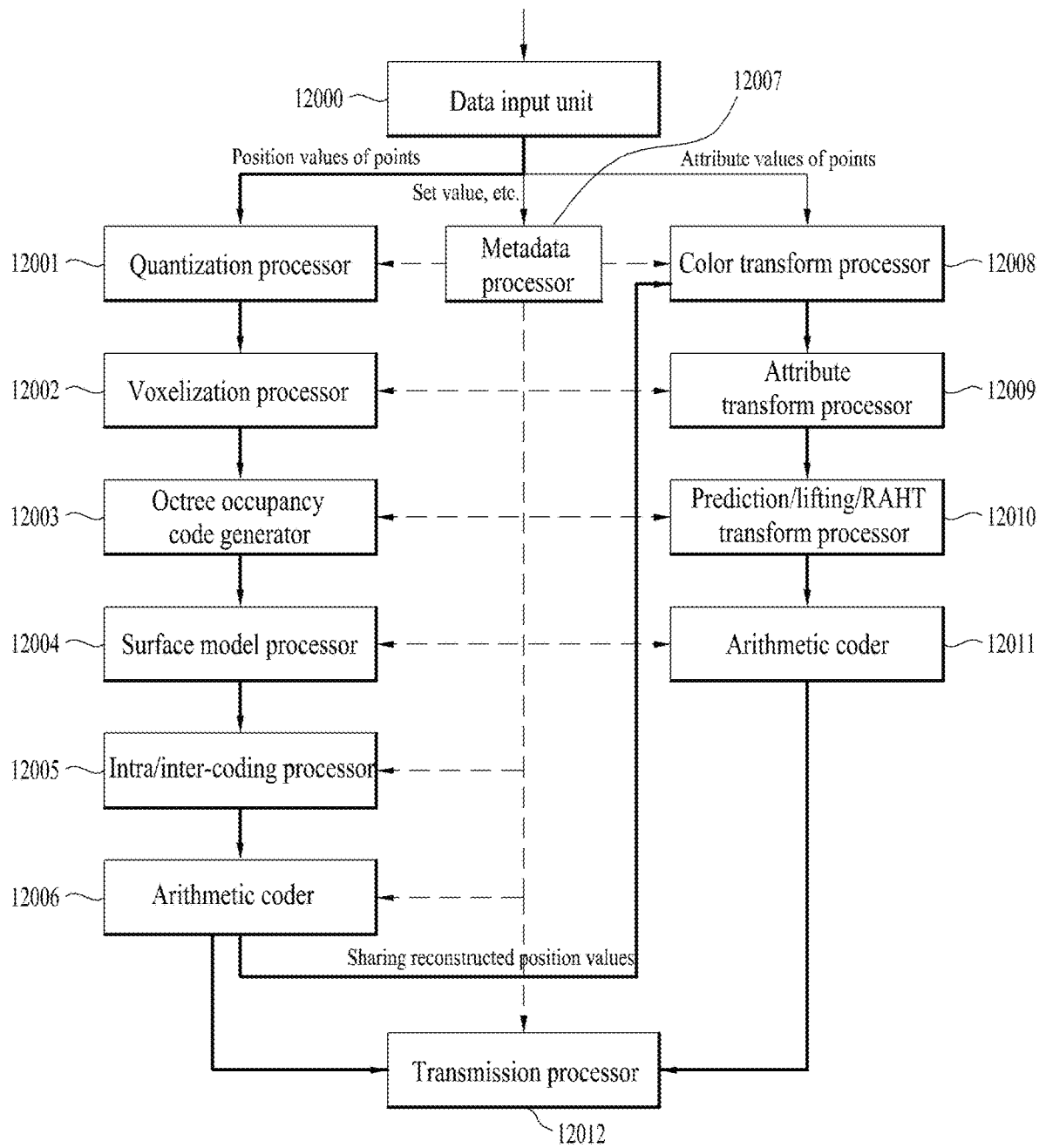
FIG. 12 illustrates a configuration for point cloud video encoding of a transmission device according to embodiments.

FIG. 12 illustrates a transmission device according to embodiments.

The transmission device shown in FIG. 12 is an example of the transmission device 10000 of FIG. 1 (or the point cloud video encoder of FIG. 4). The transmission device illustrated in FIG. 12 may perform one or more of the operations and methods the same as or similar to those of the point cloud video encoder described with reference to FIGS. 1 to 9. The transmission device according to the embodiments may include a data input unit 12000, a quantization processor 12001, a voxelization processor 12002, an octree occupancy code generator 12003, a surface model processor 12004, an intra/inter-coding processor 12005, an arithmetic coder 12006, a metadata processor 12007, a color transform processor 12008, an attribute transform processor 12009, a LOD/lifting/RAHT transform processor 12010, an arithmetic coder 12011 and/or a transmission processor 12012.

The data input unit 12000 according to the embodiments receives or acquires point cloud data. The data input unit 12000 may perform an operation and/or acquisition method the same as or similar to the operation and/or acquisition method of the point cloud video acquisition unit 10001 (or the acquisition process 20000 described with reference to FIG. 2).

The data input unit 12000, the quantization processor 12001, the voxelization processor 12002, the octree occupancy code generator 12003, the surface model processor 12004, the intra/inter-coding processor 12005, and the arithmetic coder 12006 perform geometry encoding. The geometry encoding according to the embodiments is the same as or similar to the geometry encoding described with reference to FIGS. 1 to 9, and thus a detailed description thereof is omitted.

The quantization processor 12001 according to the embodiments quantizes geometry (e.g., position values of points). The operation and/or quantization of the quantization processor 12001 is the same as or similar to the operation and/or quantization of the quantization unit 40001 described with reference to FIG. 4. Details are the same as those described with reference to FIGS. 1 to 9.

The voxelization processor 12002 according to the embodiments voxelizes the quantized position values of the points. The voxelization processor 12002 may perform an operation and/or process the same or similar to the operation and/or the voxelization process of the quantization unit 40001 described with reference to FIG. 4. Details are the same as those described with reference to FIGS. 1 to 9.

The octree occupancy code generator 12003 according to the embodiments performs octree coding on the voxelized positions of the points based on an octree structure. The octree occupancy code generator 12003 may generate an occupancy code. The octree occupancy code generator 12003 may perform an operation and/or method the same as or similar to the operation and/or method of the point cloud video encoder (or the octree analysis unit 40002) described with reference to FIGS. 4 and 6. Details are the same as those described with reference to FIGS. 1 to 9.

The surface model processor 12004 according to the embodiments may perform trisoup geometry encoding based on a surface model to reconstruct the positions of points in a specific region (or node) on a voxel basis. The surface model processor 12004 may perform an operation and/or method the same as or similar to the operation and/or method of the point cloud video encoder (for example, the surface approximation analysis unit 40003) described with reference to FIG. 4. Details are the same as those described with reference to FIGS. 1 to 9.

The intra/inter-coding processor 12005 according to the embodiments may perform intra/inter-coding on point cloud data. The intra/inter-coding processor 12005 may perform coding the same as or similar to the intra/inter-coding described with reference to FIG. 7. Details are the same as those described with reference to FIG. 7. According to embodiments, the intra/inter-coding processor 12005 may be included in the arithmetic coder 12006.

The arithmetic coder 12006 according to the embodiments performs entropy encoding on an octree of the point cloud data and/or an approximated octree. For example, the encoding scheme includes arithmetic encoding. The arithmetic coder 12006 performs an operation and/or method the same as or similar to the operation and/or method of the arithmetic encoder 40004.

The metadata processor 12007 according to the embodiments processes metadata about the point cloud data, for example, a set value, and provides the same to a necessary processing process such as geometry encoding and/or attribute encoding. Also, the metadata processor 12007 according to the embodiments may generate and/or process signaling information related to the geometry encoding and/or the attribute encoding. The signaling information according to the embodiments may be encoded separately from the geometry encoding and/or the attribute encoding. The signaling information according to the embodiments may be interleaved.

The color transform processor 12008, the attribute transform processor 12009, the LOD/lifting/RAHT transform processor 12010, and the arithmetic coder 12011 perform the attribute encoding. The attribute encoding according to the embodiments is the same as or similar to the attribute encoding described with reference to FIGS. 1 to 9, and thus a detailed description thereof is omitted.

The color transform processor 12008 according to the embodiments performs color transform coding to transform color values included in attributes. The color transform processor 12008 may perform color transform coding based on the reconstructed geometry. The reconstructed geometry is the same as described with reference to FIGS. 1 to 9. Also, it performs an operation and/or method the same as or similar to the operation and/or method of the color transformation unit 40006 described with reference to FIG. 4 is performed. The detailed description thereof is omitted.

The attribute transform processor 12009 according to the embodiments performs attribute transformation to transform the attributes based on the reconstructed geometry and/or the positions on which geometry encoding is not performed. The attribute transform processor 12009 performs an operation and/or method the same as or similar to the operation and/or method of the attribute transformation unit 40007 described with reference to FIG. 4. The detailed description thereof is omitted. The LOD/lifting/RAHT transform processor 12010 according to the embodiments may code the transformed attributes by any one or a combination of RAHT coding, prediction transform coding, and lifting transform coding. The LOD/lifting/RAHT transform processor 12010 performs at least one of the operations the same as or similar to the operations of the RAHT unit 40008, the LOD generation unit 40009, and the lifting transformation unit 40010 described with reference to FIG. 4. In addition, the prediction transform coding, the lifting transform coding, and the RAHT transform coding are the same as those described with reference to FIGS. 1 to 9, and thus a detailed description thereof is omitted.

The arithmetic coder 12011 according to the embodiments may encode the coded attributes based on the arithmetic coding. The arithmetic coder 12011 performs an operation and/or method the same as or similar to the operation and/or method of the arithmetic encoder 40012.

The transmission processor 12012 according to the embodiments may transmit each bitstream containing encoded geometry and/or encoded attributes and/or metadata (or metadata information), or transmit one bitstream configured with the encoded geometry and/or the encoded attributes and/or the metadata. When the encoded geometry and/or the encoded attributes and/or the metadata according to the embodiments are configured into one bitstream, the bitstream may include one or more sub-bitstreams. The bitstream according to the embodiments may contain signaling information including a sequence parameter set (SPS) for signaling of a sequence level, a geometry parameter set (GPS) for signaling of geometry information coding, an attribute parameter set (APS) for signaling of attribute information coding, and a tile parameter set (TPS or tile inventory) for signaling of a tile level, and slice data. The slice data may include information about one or more slices. One slice according to embodiments may include one geometry bitstream $Geom0^0$ and one or more attribute bitstreams $Attr0^0$ and $Attr1^0$. The TPS according to the embodiments may include information about each tile (for example, coordinate information and height/size information about a bounding box) for one or more tiles. The geometry bitstream may contain a header and a payload. The header of the geometry bitstream according to the embodiments may contain a parameter set identifier (geom_parameter_set_id), a tile identifier (geom_tile_id) and a slice identifier (geom_slice_id) included in the GPS, and information about the data contained in the payload. As described above, the metadata processor 12007 according to the embodiments may generate and/or process the signaling information and transmit the same to the transmission processor 12012. According to embodiments, the elements to perform geometry encoding and the elements to perform attribute encoding may share data/information with each other as indicated by dotted lines. The transmission processor 12012 according to the embodiments may perform an operation and/or transmission method the same as or similar to the operation and/or transmission method of the transmitter 10003. Details are the same as those described with reference to FIGS. 1 and 2, and thus a description thereof is omitted.

Figure 13:
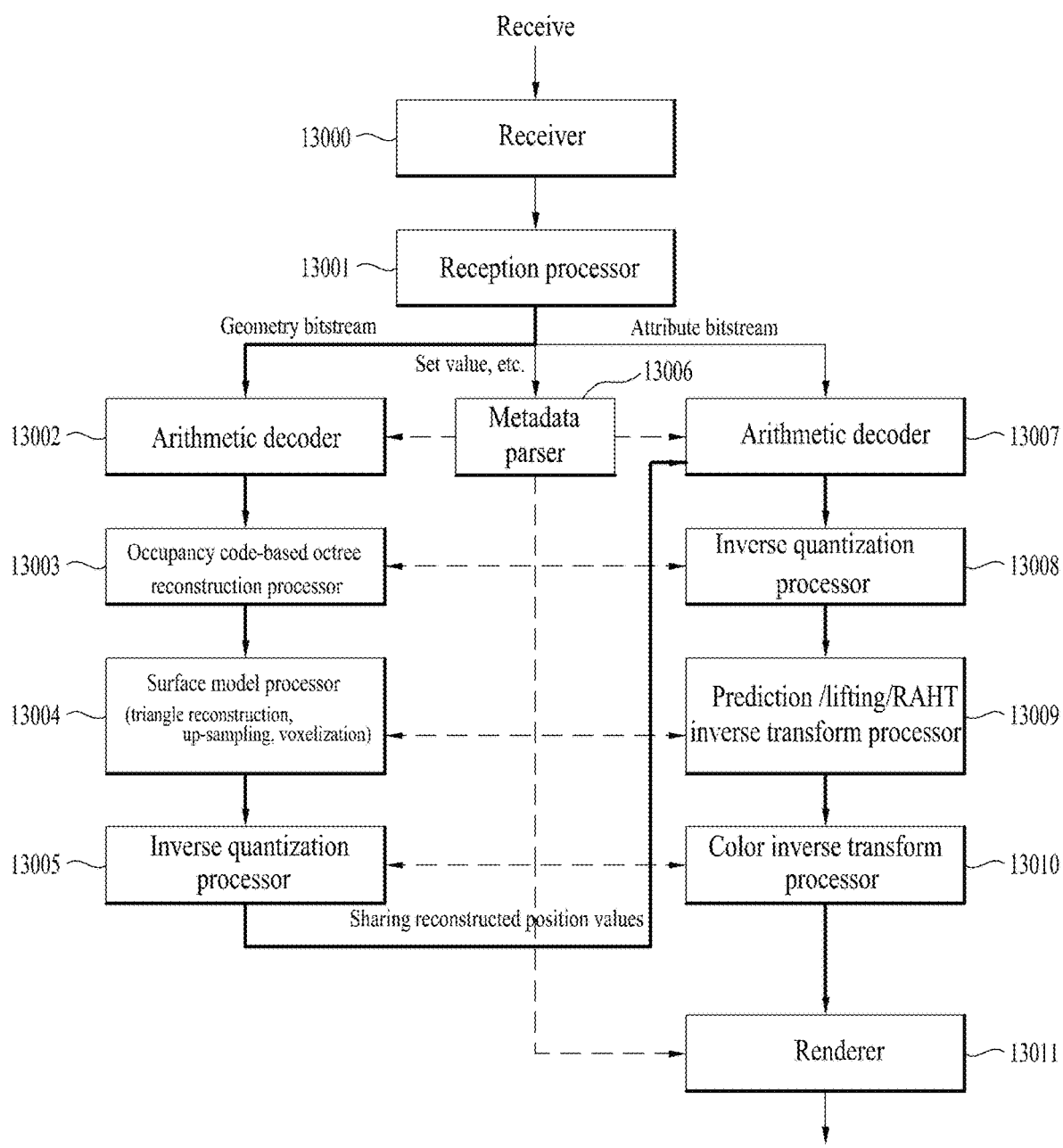
FIG. 13 illustrates a configuration for point cloud video decoding of a reception device according to embodiments.

FIG. 13 illustrates a reception device according to embodiments.

The reception device illustrated in FIG. 13 is an example of the reception device 10004 of FIG. 1 (or the point cloud video decoder of FIGS. 10 and 11). The reception device illustrated in FIG. 13 may perform one or more of the operations and methods the same as or similar to those of the point cloud video decoder described with reference to FIGS. 1 to 11.

The reception device according to the embodiment includes a receiver 13000, a reception processor 13001, an arithmetic decoder 13002, an occupancy code-based octree reconstruction processor 13003, a surface model processor (triangle reconstruction, up-sampling, voxelization) 13004, an inverse quantization processor 13005, a metadata parser 13006, an arithmetic decoder 13007, an inverse quantization processor 13008, a LOD/lifting/RAHT inverse transform processor 13009, a color inverse transform processor 13010, and/or a renderer 13011. Each element for decoding according to the embodiments may perform an inverse process of the operation of a corresponding element for encoding according to the embodiments.

The receiver 13000 according to the embodiments receives point cloud data. The receiver 13000 may perform an operation and/or reception method the same as or similar to the operation and/or reception method of the receiver 10005 of FIG. 1. The detailed description thereof is omitted.

The reception processor 13001 according to the embodiments may acquire a geometry bitstream and/or an attribute bitstream from the received data. The reception processor 13001 may be included in the receiver 13000.

The arithmetic decoder 13002, the occupancy code-based octree reconstruction processor 13003, the surface model processor 13004, and the inverse quantization processor 1305 may perform geometry decoding. The geometry decoding according to embodiments is the same as or similar to the geometry decoding described with reference to FIGS. 1 to 10, and thus a detailed description thereof is omitted.

The arithmetic decoder 13002 according to the embodiments may decode the geometry bitstream based on arithmetic coding. The arithmetic decoder 13002 performs an operation and/or coding the same as or similar to the operation and/or coding of the arithmetic decoder 11000.

The occupancy code-based octree reconstruction processor 13003 according to the embodiments may reconstruct an octree by acquiring an occupancy code from the decoded geometry bitstream (or information about the geometry secured as a result of decoding). The occupancy code-based octree reconstruction processor 13003 performs an operation and/or method the same as or similar to the operation and/or octree generation method of the octree synthesizer 11001. When the trisoup geometry encoding is applied, the surface model processor 13004 according to the embodiments may perform trisoup geometry decoding and related geometry reconstruction (for example, triangle reconstruction, up-sampling, voxelization) based on the surface model method. The surface model processor 13004 performs an operation the same as or similar to that of the surface approximation synthesizer 11002 and/or the geometry reconstruction unit 11003.

The inverse quantization processor 13005 according to the embodiments may inversely quantize the decoded geometry.

The metadata parser 13006 according to the embodiments may parse metadata contained in the received point cloud data, for example, a set value. The metadata parser 13006 may pass the metadata to geometry decoding and/or attribute decoding. The metadata is the same as that described with reference to FIG. 12, and thus a detailed description thereof is omitted.

The arithmetic decoder 13007, the inverse quantization processor 13008, the LOD/RAHT inverse transform processor 13009 and the color inverse transform processor 13010 perform attribute decoding. The attribute decoding is the same as or similar to the attribute decoding described with reference to FIGS. 1 to 10, and thus a detailed description thereof is omitted.

The arithmetic decoder 13007 according to the embodiments may decode the attribute bitstream by arithmetic coding. The arithmetic decoder 13007 may decode the attribute bitstream based on the reconstructed geometry. The arithmetic decoder 13007 performs an operation and/or coding the same as or similar to the operation and/or coding of the arithmetic decoder 11005.

The inverse quantization processor 13008 according to the embodiments may inversely quantize the decoded attribute bitstream. The inverse quantization processor 13008 performs an operation and/or method the same as or similar to the operation and/or inverse quantization method of the inverse quantization unit 11006.

The LOD/lifting/RAHT inverse transformer 13009 according to the embodiments may process the reconstructed geometry and the inversely quantized attributes. The prediction/lifting/RAHT inverse transform processor 1301 performs one or more of operations and/or decoding the same as or similar to the operations and/or decoding of the RAHT transformer 11007, the LOD generation unit 11008, and/or the inverse lifter 11009. The color inverse transform processor 13010 according to the embodiments performs inverse transform coding to inversely transform color values (or textures) included in the decoded attributes. The color inverse transform processor 13010 performs an operation and/or inverse transform coding the same as or similar to the operation and/or inverse transform coding of the inverse color transformation unit 11010. The renderer 13011 according to the embodiments may render the point cloud data.

Figure 14:
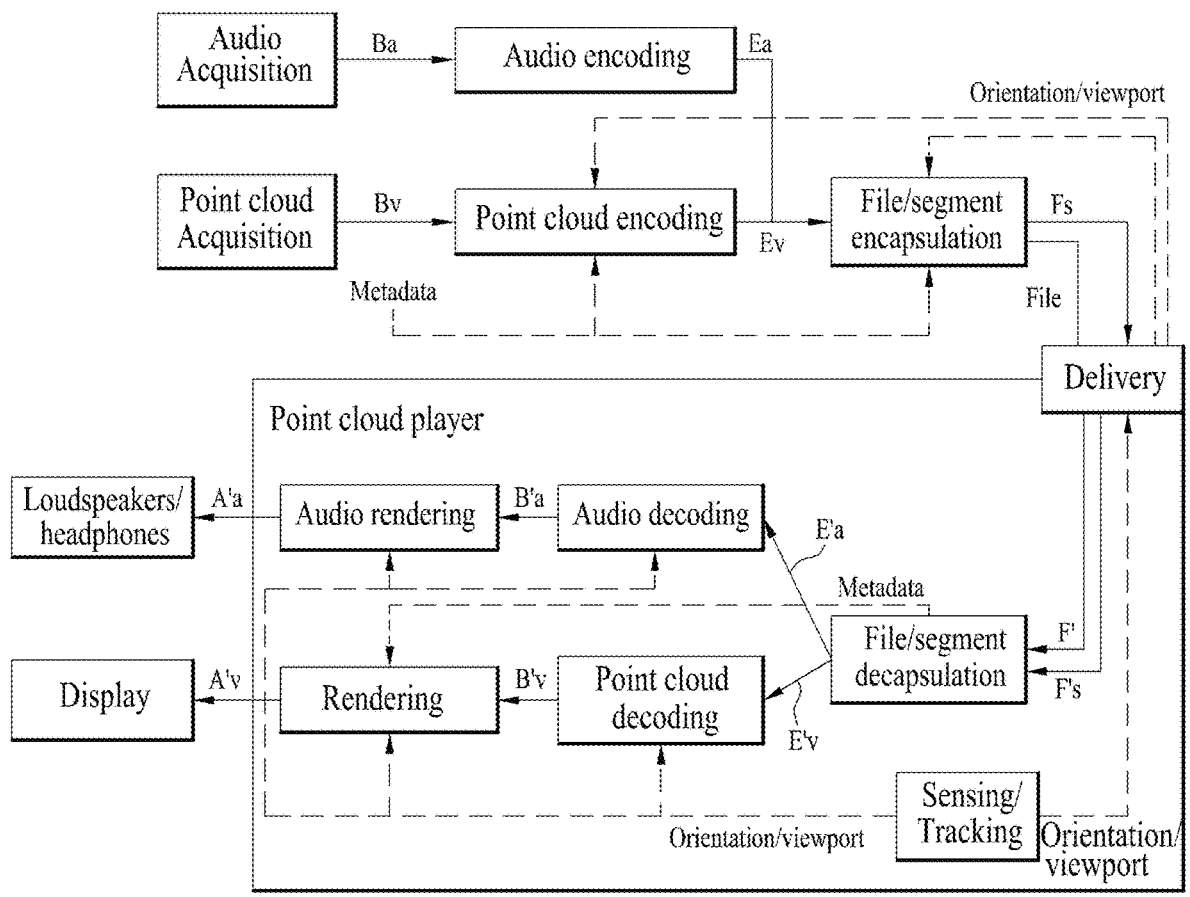
FIG. 14 illustrates an architecture for storing and streaming of G-PCC-based point cloud data according to embodiments.

FIG. 14 illustrates an architecture for G-PCC-based point cloud content streaming according to embodiments.

The upper part of FIG. 14 shows a process of processing and transmitting point cloud content by the transmission device described in FIGS. 1 to 13 (for example, the transmission device 10000, the transmission device of FIG. 12, etc.).

As described with reference to FIGS. 1 to 13, the transmission device may acquire audio Ba of the point cloud content (Audio Acquisition), encode the acquired audio (Audio Encoding), and output an audio bitstream Ea. In addition, the transmission device may acquire a point cloud (or point cloud video) By of the point cloud content (Point Acquisition), and perform point cloud video encoding on the acquired point cloud to output a point cloud video bitstream Ev. The point cloud video encoding of the transmission device is the same as or similar to the point cloud video encoding described with reference to FIGS. 1 to 13 (for example, the encoding of the point cloud video encoder of FIG. 4), and thus a detailed description thereof will be omitted.

The transmission device may encapsulate the generated audio bitstream and video bitstream into a file and/or a segment (File/segment encapsulation). The encapsulated file and/or segment Fs, File may include a file in a file format such as ISOBMFF or a dynamic adaptive streaming over HTTP (DASH) segment. Point cloud-related metadata according to embodiments may be contained in the encapsulated file format and/or segment. The metadata may be contained in boxes of various levels on the ISO International Standards Organization Base Media File Format (ISOBMFF) file format, or may be contained in a separate track within the file. According to an embodiment, the transmission device may encapsulate the metadata into a separate file. The transmission device according to the embodiments may deliver the encapsulated file format and/or segment over a network. The processing method for encapsulation and transmission by the transmission device is the same as that described with reference to FIGS. 1 to 13 (for example, the transmitter 10003, the transmission step 20002 of FIG. 2, etc.), and thus a detailed description thereof will be omitted.

The lower part of FIG. 14 shows a process of processing and outputting point cloud content by the reception device (for example, the reception device 10004, the reception device of FIG. 13, etc.) described with reference to FIGS. 1 to 13.

According to embodiments, the reception device may include devices configured to output final audio data and final video data (e.g., loudspeakers, headphones, a display), and a point cloud player configured to process point cloud content (a point cloud player). The final data output devices and the point cloud player may be configured as separate physical devices. The point cloud player according to the embodiments may perform geometry-based point cloud compression (G-PCC) coding, video-based point cloud compression (V-PCC) coding and/or next-generation coding.

The reception device according to the embodiments may secure a file and/or segment F', Fs' contained in the received data (for example, a broadcast signal, a signal transmitted over a network, etc.) and decapsulate the same (File/segment decapsulation). The reception and decapsulation methods of the reception device is the same as those described with reference to FIGS. 1 to 13 (for example, the receiver 10005, the reception unit 13000, the reception processing unit 13001, etc.), and thus a detailed description thereof will be omitted.

The reception device according to the embodiments secures an audio bitstream E'a and a video bitstream E'v contained in the file and/or segment. As shown in the figure, the reception device outputs decoded audio data B'a by performing audio decoding on the audio bitstream, and renders the decoded audio data (audio rendering) to output final audio data A'a through loudspeakers or headphones.

Also, the reception device performs point cloud video decoding on the video bitstream E'v and outputs decoded video data B'v. The point cloud video decoding according to the embodiments is the same as or similar to the point cloud video decoding described with reference to FIGS. 1 to 13 (for example, decoding of the point cloud video decoder of FIG. 11), and thus a detailed description thereof will be omitted. The reception device may render the decoded video data and output final video data through the display.

The reception device according to the embodiments may perform at least one of decapsulation, audio decoding, audio rendering, point cloud video decoding, and point cloud video rendering based on the transmitted metadata. The details of the metadata are the same as those described with reference to FIGS. 12 to 13, and thus a description thereof will be omitted.

As indicated by a dotted line shown in the figure, the reception device according to the embodiments (for example, a point cloud player or a sensing/tracking unit in the point cloud player) may generate feedback information (orientation, viewport). According to embodiments, the feedback information may be used in a decapsulation process, a point cloud video decoding process and/or a rendering process of the reception device, or may be delivered to the transmission device. Details of the feedback information are the same as those described with reference to FIGS. 1 to 13, and thus a description thereof will be omitted.

Figure 15:
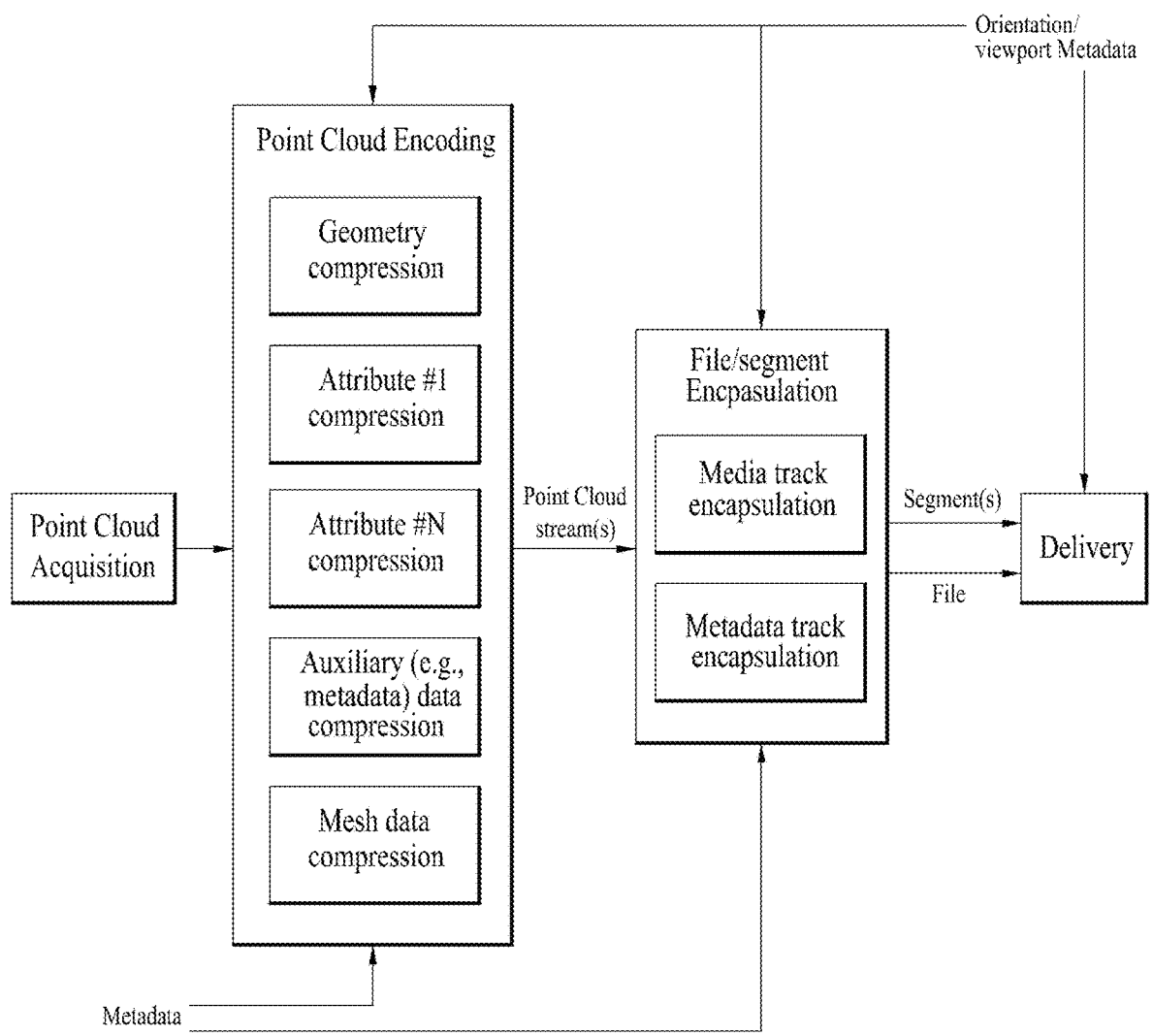
FIG. 15 illustrates an example of storage and transmission of point cloud data according to embodiments.

FIG. 15 shows an exemplary transmission device according to embodiments.

The transmission device of FIG. 15 is a device configured to transmit point cloud content, and corresponds to an example of the transmission device described with reference to FIGS. 1 to 14 (e.g., the transmission device 10000 of FIG. 1, the point cloud video encoder of FIG. 4, the transmission device of FIG. 12, the transmission device of FIG. 14). Accordingly, the transmission device of FIG. 15 performs an operation that is identical or similar to that of the transmission device described with reference to FIGS. 1 to 14.

The transmission device according to the embodiments may perform one or more of point cloud acquisition, point cloud video encoding, file/segment encapsulation and delivery.

Since the operation of point cloud acquisition and delivery illustrated in the figure is the same as the operation described with reference to FIGS. 1 to 14, a detailed description thereof will be omitted.

As described above with reference to FIGS. 1 to 14, the transmission device according to the embodiments may perform geometry encoding and attribute encoding. The geometry encoding may be referred to as geometry compression, and the attribute encoding may be referred to as attribute compression. As described above, one point may have one geometry and one or more attributes. Accordingly, the transmission device performs attribute encoding on each attribute. The figure illustrates that the transmission device performs one or more attribute compressions (attribute #1 compression, . . . , attribute #N compression). In addition, the transmission device according to the embodiments may perform auxiliary compression. The auxiliary compression is performed on the metadata. Details of the metadata are the same as those described with reference to FIGS. 1 to 14, and thus a description thereof will be omitted. The transmission device may also perform mesh data compression. The mesh data compression according to the embodiments may include the trisoup geometry encoding described with reference to FIGS. 1 to 14.

The transmission device according to the embodiments may encapsulate bitstreams (e.g., point cloud streams) output according to point cloud video encoding into a file and/or a segment. According to embodiments, the transmission device may perform media track encapsulation for carrying data (for example, media data) other than the metadata, and perform metadata track encapsulation for carrying metadata. According to embodiments, the metadata may be encapsulated into a media track.

As described with reference to FIGS. 1 to 14, the transmission device may receive feedback information (orientation/viewport metadata) from the reception device, and perform at least one of the point cloud video encoding, file/segment encapsulation, and delivery operations based on the received feedback information. Details are the same as those described with reference to FIGS. 1 to 14, and thus a description thereof will be omitted.

Figure 16:
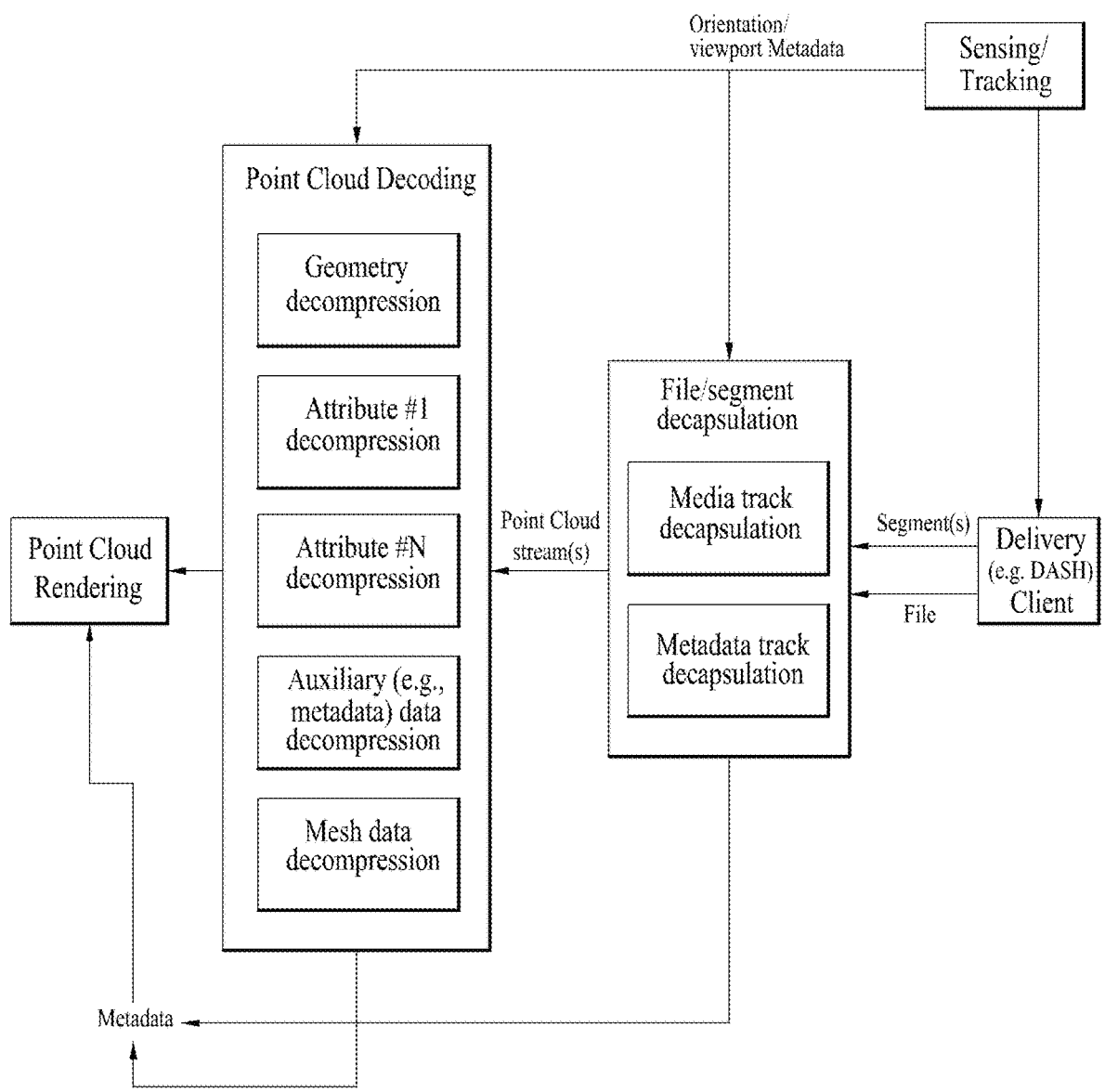
FIG. 16 illustrates an example of a reception device according to embodiments.

FIG. 16 shows an exemplary reception device according to embodiments.

The reception device of FIG. 16 is a device for receiving point cloud content, and corresponds to an example of the reception device described with reference to FIGS. 1 to 14 (for example, the reception device 10004 of FIG. 1, the point cloud video decoder of FIG. 11, and the reception device of FIG. 13, the reception device of FIG. 14). Accordingly, the reception device of FIG. 16 performs an operation that is identical or similar to that of the reception device described with reference to FIGS. 1 to 14. The reception device of FIG.

16 may receive a signal transmitted from the transmission device of FIG. 15, and perform a reverse process of the operation of the transmission device of FIG. 15.

The reception device according to the embodiments may perform at least one of delivery, file/segment decapsulation, point cloud video decoding, and point cloud rendering.

Since the point cloud reception and point cloud rendering operations illustrated in the figure are the same as those described with reference to FIGS. 1 to 14, a detailed description thereof will be omitted.

As described with reference to FIGS. 1 to 14, the reception device according to the embodiments decapsulate the file and/or segment acquired from a network or a storage device. According to embodiments, the reception device may perform media track decapsulation for carrying data (for example, media data) other than the metadata, and perform metadata track decapsulation for carrying metadata. According to embodiments, in the case where the metadata is encapsulated into a media track, the metadata track decapsulation is omitted.

As described with reference to FIGS. 1 to 14, the reception device may perform geometry decoding and attribute decoding on bitstreams (e.g., point cloud streams) secured through decapsulation. The geometry decoding may be referred to as geometry decompression, and the attribute decoding may be referred to as attribute decompression. As described above, one point may have one geometry and one or more attributes, each of which is encoded by the transmission device. Accordingly, the reception device performs attribute decoding on each attribute. The figure illustrates that the reception device performs one or more attribute decompressions (attribute #1 decompression, . . . , attribute #N decompression). The reception device according to the embodiments may also perform auxiliary decompression. The auxiliary decompression is performed on the metadata. Details of the metadata are the same as those described with reference to FIGS. 1 to 14, and thus a disruption thereof will be omitted. The reception device may also perform mesh data decompression. The mesh data decompression according to the embodiments may include the trisoup geometry decoding described with reference to FIGS. 1 to 14. The reception device according to the embodiments may render the point cloud data that is output according to the point cloud video decoding.

As described with reference to FIGS. 1 to 14, the reception device may secure orientation/viewport metadata using a separate sensing/tracking element, and transmit feedback information including the same to a transmission device (for example, the transmission device of FIG. 15). In addition, the reception device may perform at least one of a reception operation, file/segment decapsulation, and point cloud video decoding based on the feedback information. Details are the same as those described with reference to FIGS. 1 to 14, and thus a description thereof will be omitted.

Figure 17:
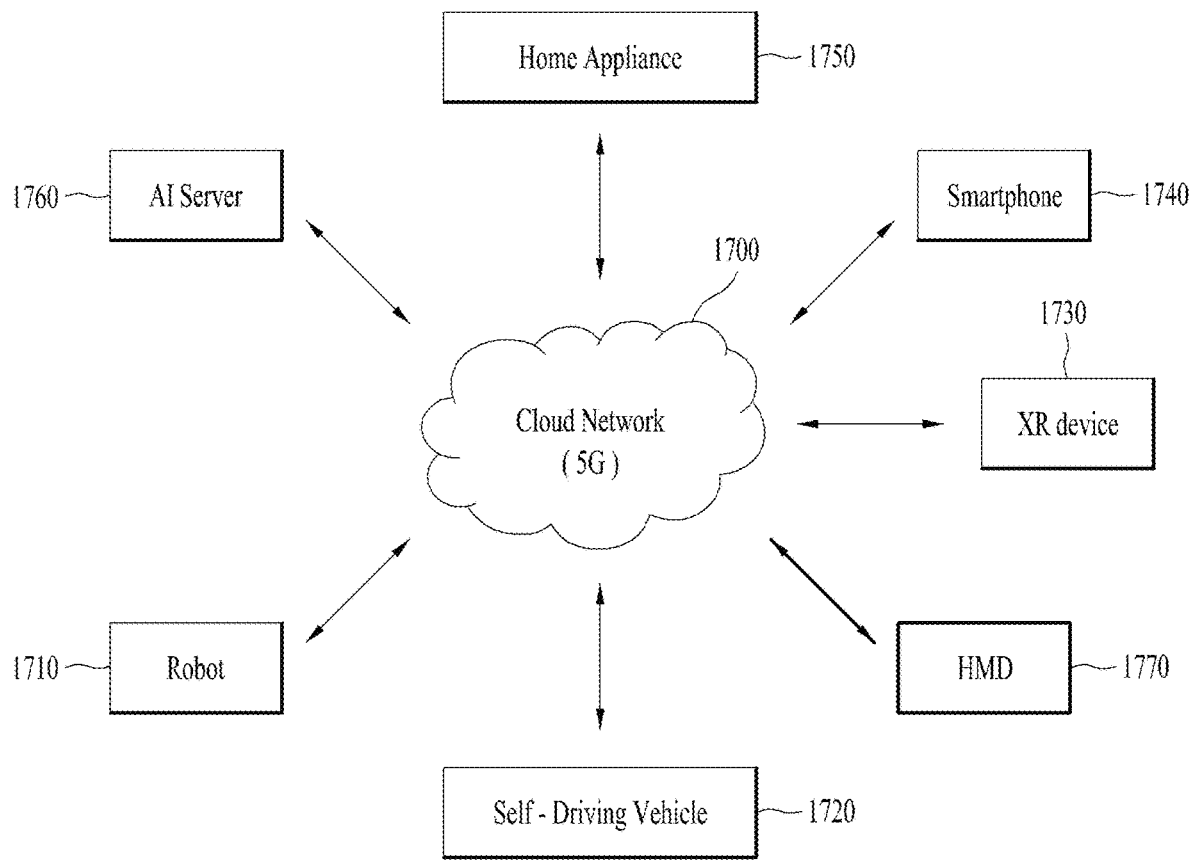
FIG. 17 illustrates an exemplary structure operatively connectable with a method/apparatus for transmitting and receiving point cloud data according to embodiments.

FIG. 17 shows an exemplary structure operatively connectable with a method/device for transmitting and receiving point cloud data according to embodiments.

The structure of FIG. 17 represents a configuration in which at least one of a server 1760, a robot 1710, a self-driving vehicle 1720, an XR device 1730, a smartphone 1740, a home appliance 1750, and/or a head-mount display (HMD) 1770 is connected to a cloud network 1710. The robot 1710, the self-driving vehicle 1720, the XR device 1730, the smartphone 1740, or the home appliance 1750 is referred to as a device. In addition, the XR device 1730 may correspond to a point cloud compressed data (PCC) device according to embodiments or may be operatively connected to the PCC device.

The cloud network 1700 may represent a network that constitutes part of the cloud computing infrastructure or is present in the cloud computing infrastructure. Here, the cloud network 1700 may be configured using a 3G network, 4G or Long Term Evolution (LTE) network, or a 5G network.

The server 1760 may be connected to at least one of the robot 1710, the self-driving vehicle 1720, the XR device 1730, the smartphone 1740, the home appliance 1750, and/or the HMD 1770 over the cloud network 1700 and may assist in at least a part of the processing of the connected devices 1710 to 1770.

The HMD 1770 represents one of the implementation types of the XR device and/or the PCC device according to the embodiments. The HMD type device according to the embodiments includes a communication unit, a control unit, a memory, an I/O unit, a sensor unit, and a power supply unit.

Hereinafter, various embodiments of the devices 1710 to 1750 to which the above-described technology is applied will be described. The devices 1710 to 1750 illustrated in FIG. 17 may be operatively connected/coupled to a point cloud data transmission device and reception according to the above-described embodiments.

<PCC+XR>

The XR/PCC device 1730 may employ PCC technology and/or XR (AR+VR) technology, and may be implemented as an HMD, a head-up display (HUD) provided in a vehicle, a television, a mobile phone, a smartphone, a computer, a wearable device, a home appliance, a digital signage, a vehicle, a stationary robot, or a mobile robot.

The XR/PCC device 1730 may analyze 3D point cloud data or image data acquired through various sensors or from an external device and generate position data and attribute data about 3D points. Thereby, the XR/PCC device 1730 may acquire information about the surrounding space or a real object, and render and output an XR object. For example, the XR/PCC device 1730 may match an XR object including auxiliary information about a recognized object with the recognized object and output the matched XR object.

<PCC+Self-Driving+XR>

The self-driving vehicle 1720 may be implemented as a mobile robot, a vehicle, an unmanned aerial vehicle, or the like by applying the PCC technology and the XR technology.

The self-driving vehicle 1720 to which the XR/PCC technology is applied may represent a self-driving vehicle provided with means for providing an XR image, or a self-driving vehicle that is a target of control/interaction in the XR image. In particular, the self-driving vehicle 1720 which is a target of control/interaction in the XR image may be distinguished from the XR device 1730 and may be operatively connected thereto.

The self-driving vehicle 1720 having means for providing an XR/PCC image may acquire sensor information from sensors including a camera, and output the generated XR/PCC image based on the acquired sensor information. For example, the self-driving vehicle 1720 may have an HUD and output an XR/PCC image thereto, thereby providing an occupant with an XR/PCC object corresponding to a real object or an object present on the screen.

When the XR/PCC object is output to the HUD, at least a part of the XR/PCC object may be output to overlap the real object to which the occupant's eyes are directed. On the other hand, when the XR/PCC object is output on a display provided inside the self-driving vehicle, at least a part of the XR/PCC object may be output to overlap an object on the screen. For example, the self-driving vehicle 1720 may output XR/PCC objects corresponding to objects such as a road, another vehicle, a traffic light, a traffic sign, a two-wheeled vehicle, a pedestrian, and a building.

The virtual reality (VR) technology, the augmented reality (AR) technology, the mixed reality (MR) technology and/or the point cloud compression (PCC) technology according to the embodiments are applicable to various devices.

In other words, the VR technology is a display technology that provides only CG images of real-world objects, backgrounds, and the like. On the other hand, the AR technology refers to a technology that shows a virtually created CG image on the image of a real object. The MR technology is similar to the AR technology described above in that virtual objects to be shown are mixed and combined with the real world. However, the MR technology differs from the AR technology in that the AR technology makes a clear distinction between a real object and a virtual object created as a CG image and uses virtual objects as complementary objects for real objects, whereas the MR technology treats virtual objects as objects having equivalent characteristics as real objects. More specifically, an example of MR technology applications is a hologram service.

Recently, the VR, AR, and MR technologies are sometimes referred to as extended reality (XR) technology rather than being clearly distinguished from each other. Accordingly, embodiments of the present disclosure are applicable to any of the VR, AR, MR, and XR technologies. The encoding/decoding based on PCC, V-PCC, and G-PCC techniques is applicable to such technologies.

The PCC method/device according to the embodiments may be applied to a vehicle that provides a self-driving service.

A vehicle that provides the self-driving service is connected to a PCC device for wired/wireless communication.

When the point cloud compression data (PCC) transmission/reception device according to the embodiments is connected to a vehicle for wired/wireless communication, the device may receive/process content data related to an AR/VR/PCC service, which may be provided together with the self-driving service, and transmit the same to the vehicle. In the case where the PCC transmission/reception device is mounted on a vehicle, the PCC transmission/reception device may receive/process content data related to the AR/VR/PCC service according to a user input signal input through a user interface device and provide the same to the user. The vehicle or the user interface device according to the embodiments may receive a user input signal. The user input signal according to the embodiments may include a signal indicating the self-driving service.

Meanwhile, it has been described above that in order for the transmission device to compress the attributes of the point cloud, the RAHT transform, predicting transform, or the lifting transform may be used, or a method according to a combination of the RAHT/prediction transform/Lifting may be used.

In the prediction transform and the lifting transform, points may be grouped by LODs. This operation is referred to as an LOD generation process, and a group having different LODs may be referred to as an $LOD_l$ set. Here, l denotes an LOD and is an integer starting from 0. $LOD_0$ is a set composed of points with the longest distance between points. As l increases, the distance between points in $LOD_l$ decreases.

That is, in the case of LOD-based predicting transform and lifting transform, LODs are generated according to the distance of the points and attributes are sequentially encoded. In this case, a process of finding neighboring points must be performed first. In the case of LOD-based predicting transform and lifting transform, a neighbor is defined as a set of nodes sampled with different reference distances from attribute information of an occupied leaf node. Referring to FIG. 9 as an example, LOD0 is a set of nodes having a longer inter-node distance than LOD1. That is, LOD0 is a set composed of points having the greatest distance between points. In predicting a specific node (e.g., P3) belonging to LOD1, neighbor nodes (e.g., P2, P4) among the nodes of LOD0 are used for prediction of node P3. Therefore, in order to predict each attribute, the process of estimating the LOD and the process of finding the neighbor nodes must be performed first. However, these processes have high complexity and take a long execution time. This may be a cause of a delay in a system requiring high-speed processing.

Therefore, the present disclose proposes devices and methods capable of improving attribute encoding performance and/or attribute decoding performance by configuring an attribute based on an octree structure used in geometry encoding and decoding, and generating, based on the attribute, an LOD to be used for attribute encoding and/or attribute decoding. More specifically, attribute coding may be efficiently performed by matching point cloud data based on the position information about an octree node and applying the matching to the LOD configuration. Thereby, low-resolution or subsampled point cloud data may be provided using the octree node to which the attribute is assigned.

One of the methods of matching point cloud data based on the position information about an octree node according to the embodiments is to match a point paired octree, that is, an attribute and a position with an octree node.

In order to generate an LOD using the octree structure according to the embodiments, a process of matching attributes and positions of point cloud data to octree nodes is first required.

In the present disclosure, the process of matching attributes and positions of point cloud data with nodes of an octree structure will be referred to as octree colorization. Octree colorization is a term used to provide understanding of the present disclosure. Since this term can be easily changed by those skilled in the art, this term may be replaced with other terms within the scope of equivalent meaning. Those terms are also within the scope of the present disclosure.

According to embodiments, in structuring point cloud data through octree colorization, the position of an octree node may be matched with point cloud data present at a similar position based on distance similarity. The colorized octree structure constructed in this way may be viewed as an octree to which point cloud data is matched. The point cloud data may be distinguished according to LODs generated based on such a structure, and may be used for prediction lift transform, which is one of attribute coding methods.

For the LODs according to the embodiments, points present in each LOD are distributed so as to be separated by a reference distance or more from each other. Here, the reference distance may be designed to decrease as the LoD increases. Accordingly, as the LoD increases, the distance between the points gradually increases, as shown in FIG. 8.

In configuring point cloud data based on the LoD according to the embodiments, point cloud data having different complexities, resolutions, or qualities may be pre-configured. Thereby, point cloud data subsets having different details according to application fields may be transmitted to the receiving side.

Figure 18:
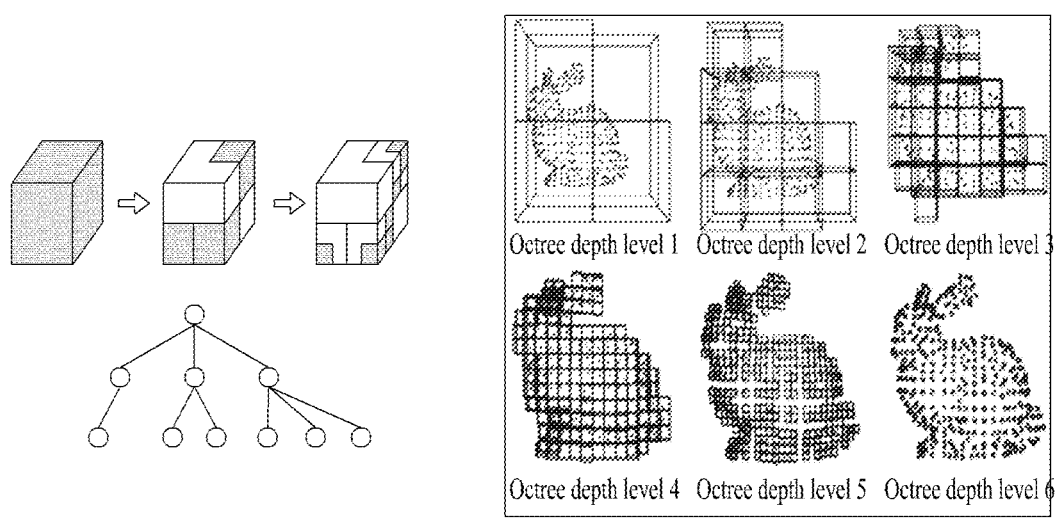
FIG. 18 is a diagram illustrating embodiments of a level of detail of point cloud data according to a depth level of an octree structure.

FIG. 18 is a diagram illustrating embodiments of a level of detail of point cloud data according to a depth level of an octree structure.

That is, the octree structure used in encoding of geometry information int the point cloud data searches for a unit cube containing valid information by dividing a bounding box into smaller and smaller units as the depth level increases (that is, in the direction from the root node to the leaf node), and divides the part with the valid information into smaller units in the next step to search for the position with the valid information in finer units. As a result, as the depth level of the octree structure increases, the detail representing the point cloud data gradually increases as shown in FIG. 18, and has a directionality similar to the LoD-based configuration of point cloud data described above.

As described above, on a basis that the detail increases as the depth level (or octree depth level) of the octree structure increases, scalable coding at the transmitting side and the representation at the receiving side may be performed according to the depth level and LoD level of the octree structure.

When the detail is increased based on the octree structure, two issues are raised compared to the LoD. One is that the position of an occupied node indicated at a specific depth level of the octree structure does not represent the position information of the point cloud data that is actually present, but represents an approximate or representative value of the positions of data present at similar positions. The other is that an attribute matching each node of the octree structure is not present.

Accordingly, in the present disclosure, to address the aforementioned two issues, an octree colorization method for matching point cloud data with an octree structure may be used.

Figure 19:
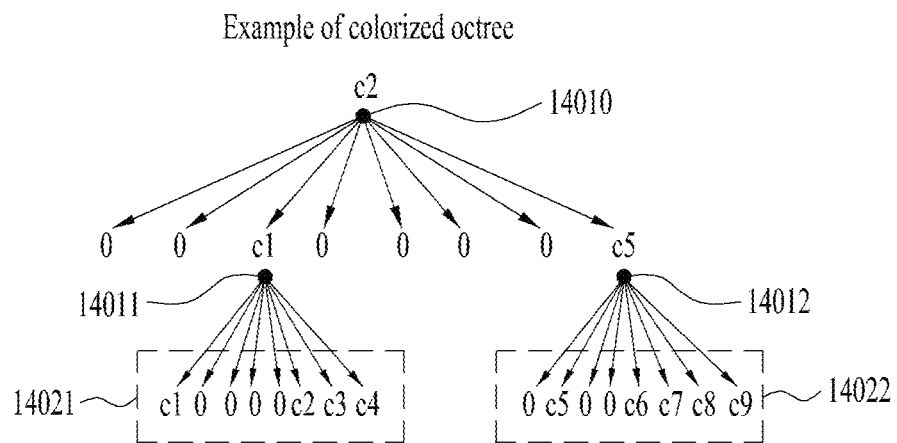
FIG. 19 is a diagram illustrating an exemplary colorized octree structure according to embodiments.

Thus, as shown in FIG. 19, attributes of actual point cloud data and corresponding position information may be matched with the octree structure.

FIG. 19 is a diagram illustrating an exemplary colorized octree structure according to embodiments. That is, in the octree structure, nodes belonging to the same layer have the same depth level, and child nodes have a depth level value increased by 1 from that of the parent node. And whenever the depth level of a child node is increased, 8 child nodes are created for a parent node. That is, the lower-level child nodes divided from the same parent node represent eight nodes adjacent to each other along each axis in the xyz space. Therefore, it may be assumed that 8 child nodes connected to a parent node have the highest attribute similarity.

FIG. 19 exemplarily shows that occupied nodes in the leaf node level of the octree are mapped to corresponding attribute information (c1, c2, c3, c4, c5, c6, c7, c8, c9). That is, in the example in the figure, the attribute information output from the attribute transformation unit 40007 is mapped to the position information about the occupied nodes in the leaf node level of the octree. Also, in the example, the upper depth level of the leaf node level, that is, the parent node 14011 of eight child nodes 14021 is mapped to one attribute (e.g., c1) in the attribute information (c1, c2, c3, c4) about the child nodes, and the parent node 14012 of eight child nodes 14022 is mapped to one attribute (e.g., c5) in the attribute information (c5, c6, c7, c8, c9). In addition, one attribute (e.g., c2) in the attribute information (c1, c2, c3, c4, c5, c6, c7, c8, c9) about the occupied nodes in the leaf node level is mapped to the root node level 14010, which is the highest level.

In this case, redundant information may be present between a point matched with the leaf node and a point matched with a higher depth level. Referring to FIG. 19 as an example, the attribute information (c1, c5) of the leaf node level is redundantly present at the higher depth level of the leaf node level, and the attribute information (c2) of the leaf node level is redundantly present at the root node level.

In the octree structure according to the embodiments, redundant attribute information may be removed at the leaf node level.

Figure 20:
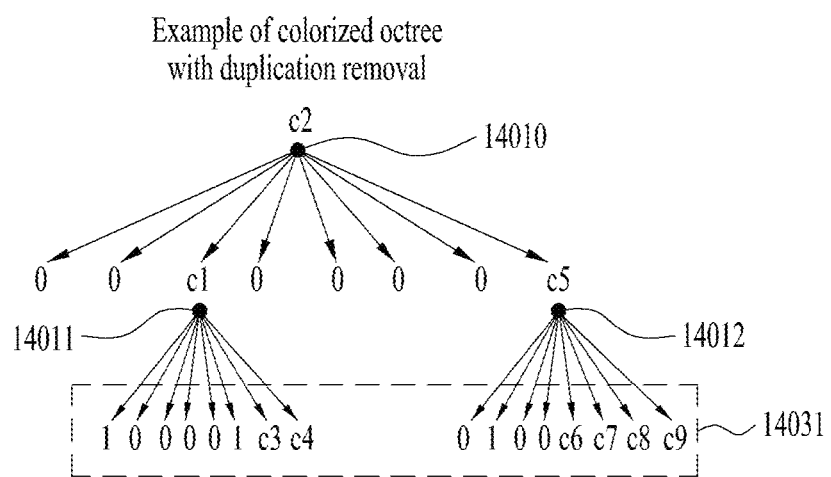
FIG. 20 is a diagram illustrating another exemplary colorized octree structure according to embodiments.

FIG. 20 is a diagram illustrating another exemplary colorized octree structure according to embodiments. In this example, redundant attribute information is removed at the leaf node level. Referring to FIG. 20 as an example, the attribute information (c1, c2, c5) in the leaf node level (14031) is removed from the nodes where the attribute information (c1, c2, c5) has been present, and the nodes are changed to occupied nodes having an occupied code equal to 1. Thereby, one-to-one matching may be achieved between the input point cloud data and the point cloud data structured according to the octree.

When the colorized octree generated through the above process is considered in terms of LoD generation, the following two features may be considered.

One feature is that the distance between nodes decreases as the depth level increases in the octree structure. This may be connected with a feature that the distance between points decreases as the LoD increases.

Figure 21:
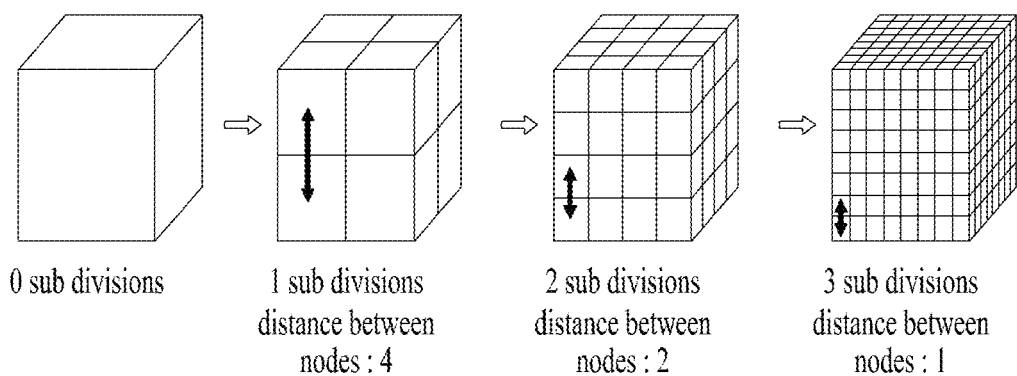
FIG. 21 is a diagram illustrating an example in which a distance between nodes decreases as a depth level increases in an octree structure according to embodiments.

FIG. 21 is a diagram illustrating an example in which a distance between nodes decreases as a depth level increases in an octree structure according to embodiments.

The other feature is that the number of points matching the actual positions/attributes increases as the depth level increases in the octree structure. This may be connected with a feature that the detail of the point cloud data increases as the depth level increases in the octree structure (from the root node to the leaf node).

In the octree structure according to the aforementioned features, an increase in LoD may match an increase in depth level.

Figure 22:
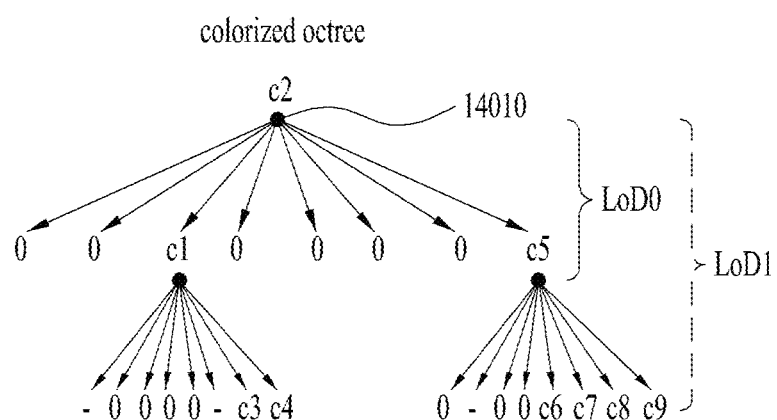
FIG. 22 shows an example of generating LODs in an octree structure from which redundant attribute information is removed according to embodiments.

FIG. 22 shows an example of generating (configuring) LODs in an octree structure from which redundant attribute information is removed, based on the aforementioned features according to embodiments.

The LODs according to the embodiments may be generated by applying the following method.

In an embodiment of the present disclosure, an LOD is generated using the octree structure. According to embodiments, the LoD generation process is carried out based on the structural characteristic of the octree in which the distance between nodes is kept constant according to the depth level of the octree structure, and the distance between nodes decreases as the depth level of the octree structure increases.

The LoD generation process according to the embodiments includes a retained set generation process, which is an operation of collecting point cloud data sampled according to a predetermined criterion for LoD generation, and a process of generating a LoD based on the retained set. In this case, the above-described octree colorization process (i.e., a process of matching attributes and positions of point cloud data with nodes of the octree structure) may be performed prior to the LoD generation.

In configuring LoD associated with the octree depth layer structure proposed in the present disclosure, the distance between points of the octree depth level may be used instead of the reference distance used for LoD generation. In the existing LoD configuration method, a criterion that the distance is inversely proportional to the LoD number is set, and the nearest (or first) point among the points outside a certain distance is sub-sampled and included in the new LoD. In this case, the distances between all points should be compared according to each distance criterion. Thus, various methods (sub-sampling according to Morton code order, etc.) may be used to reduce the time for the operation.

In configuring a LoD based on the octree as proposed in the present disclosure, it may be assumed that the points matched with each node are separated by a distance corresponding to at least the size of a node within the octree depth level, and points having a certain distance due to the octree structure may be considered as sampled. For example, in an octree structure in which the depth level of the root node is set to 0 and the depth level of the leaf node is set to N, the minimum value of the distance between nodes of the n (<N)-th depth level may be considered as $2^n$. In this case, points matching an occupied node at each octree depth level may be considered as points sampled for the corresponding octree depth level.

Figure 23:
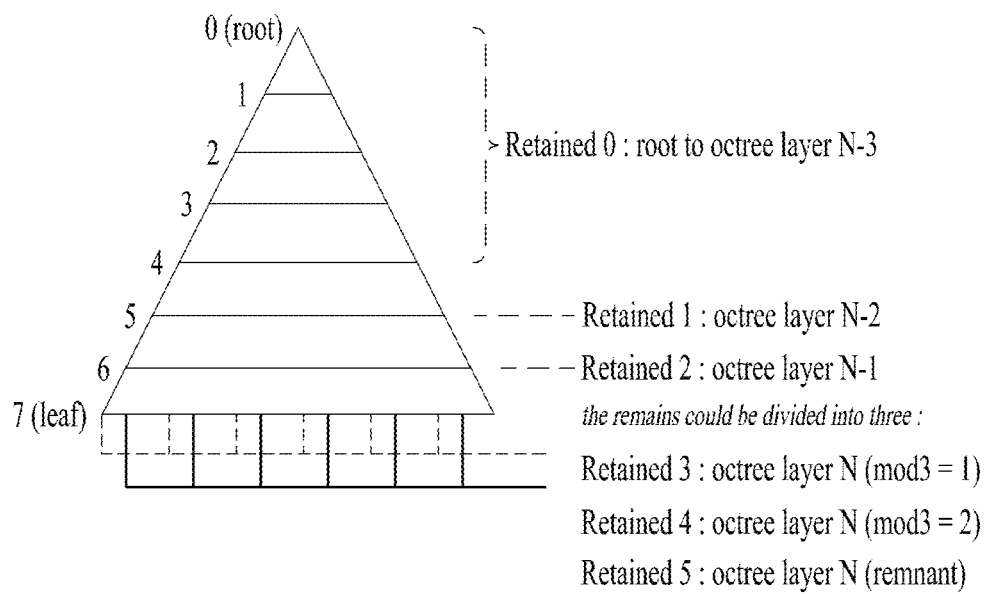
FIG. 23 is a diagram illustrating an example of generating a plurality of retained sets in an octree structure according to embodiments.

FIG. 23 is a diagram illustrating an example of generating retained sets during an octree-based LOD (or point cloud layer) generation process according to embodiments.

According to embodiments, the LoD is defined to include all points of a lower LoD in the upper LoD. In this case, a set of point cloud data newly added compared to the previous LoD to configure each LoD is defined as a retained set. It may be defined that, in generating a LoD based on the octree structure, the LoD increases in a direction in which the detail increases, that is, in a direction in which the octree depth level increases. Accordingly, the newly added octree depth level may be defined as a retained set. Here, the retained set may be defined in various ways as follows.

According to an embodiment, points sampled for one or more octree depth levels may be determined as data belonging to a retained set. That is, a set of points sampled for one or more octree depth levels (i.e., matched with an occupied node) may be defined as a retained set.

According to another embodiment, points sampled for one octree depth level may be divided into a plurality of retained sets according to a predetermined criterion. In this case, various criteria for dividing one octree depth level into a plurality of retained sets may be considered. For example, one octree depth level may be divided into M retained sets, such that the data in the retained set has consecutive Morton codes. Alternatively, points yielding the same remainder when the Morton code order index thereof is divided by M may be grouped together to configure M retained sets, or points at the same position when grouped by sibling nodes may be grouped together to configure M retained sets. The method of generating the retained sets may be separately signaled through signaling information such as metadata.

According to another embodiment, if necessary, some of the sampled points of multiple octree depth levels may be determined as a retained set.

According to the example of FIG. 23, in an octree structure in which the depth level of the root node is set to 0 and the depth level of the leaf node is set to N according to embodiments, levels from the root node level to octree depth level N−3 are classified into a set of Retained 0, octree depth level N is classified into a set of Retained 1, and octree depth level N−1 is classified into a set of Retained 2. Also, the leaf node level (i.e., N) is divided into three Retained sets, that is, Retained 3, Retained 4, and Retained 5. In FIG. 23, the octree layer may have the same meaning as the octree depth level.

Figure 24:
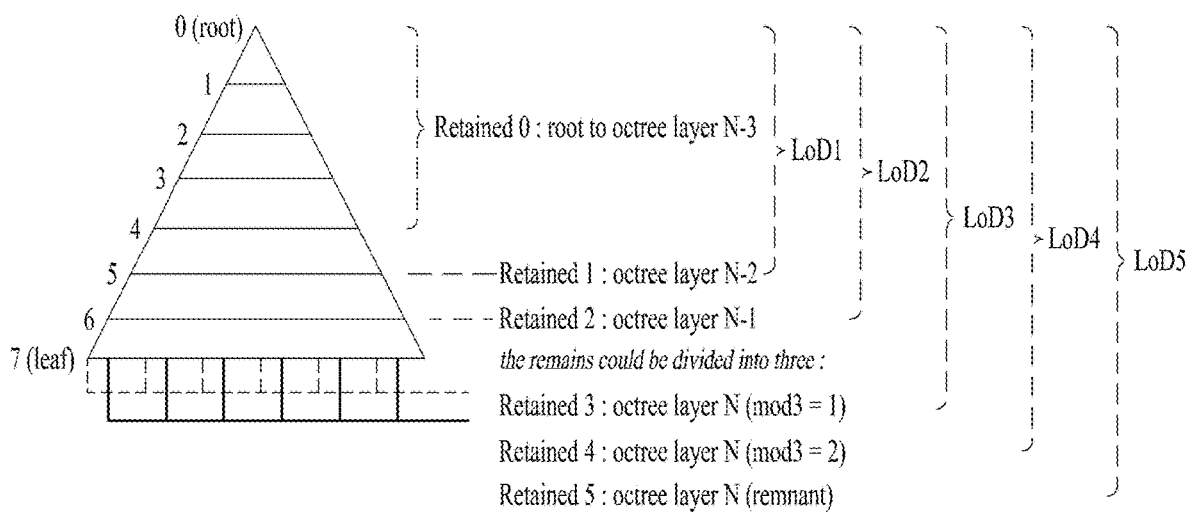
FIG. 24 is a diagram illustrating an example of generating LODs based on a plurality of retained sets in an octree structure according to embodiments.

FIG. 24 is a diagram illustrating an example of generating LODs based on the retained sets generated as illustrated in FIG. 23.

When the retained sets are configured based on the octree structure, a LoD may be configured to include lower LoDs as shown in Equation 5 below.

[Equation 5]

$$LoD(n) = \\ LoD(0) \cup \text{Retained }(1) \cup \text{Retained }(2) \cup ... \cup \text{Retained }(n) = \\ LoD\ (n-1) \cup \text{Retained }(n)$$

For example, referring to FIG. 24, in an octree structure having 7 depth levels except the root node level, LoD 0 may be configured to include levels from the root node level to the octree depth level 4 (i.e., octree layer N−3). Octree depth levels 5 and 6 may constitute Retained sets 1 and 2, respectively, such that LoD 1 includes levels from the root node level to octree depth level 5 (i.e., octree layer N−2), and LoD 2 includes levels from the root node level to octree depth level 6 (i.e., octree layer N−1). In the example illustrated in the figure, octree depth level 7 is divided into three Retained sets. The sets of Retained 3, 4 and 5 may be determined according to the remainders obtained when the point cloud data unselected in the previous LoD (LoD 2 in this example) are sorted by Morton code and divided by 3 may be determined. Accordingly, LoD 3 may be configured to contain LoD 2 and the set Retained 3, and LoD 4 may be configured to contain LoD2, the set Retained 3, and the set Retained 4. LoD 5 may be configured to contain all sets, namely, LoD2, Retained 3, Retained 4, and Retained 5.

A fast prediction strategy using the octree structure is disclosed below.

Figure 25:
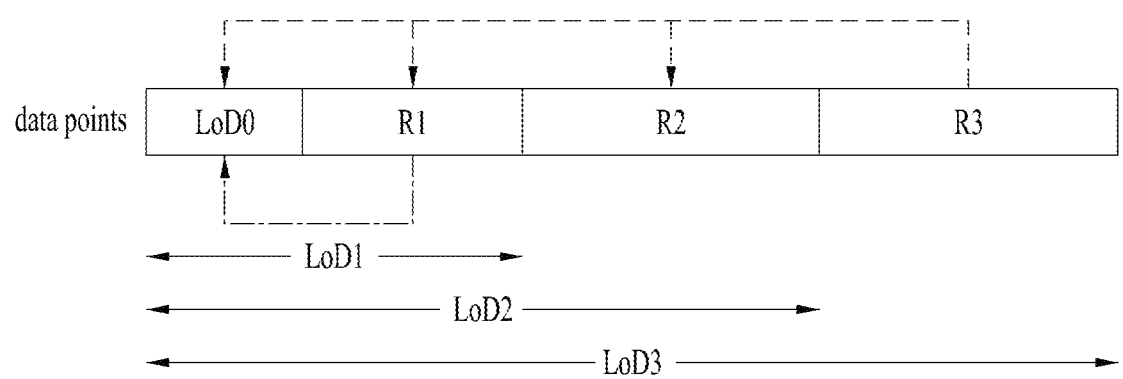
FIG. 25 is a diagram illustrating another example of generating LODs based on a plurality of retained sets in an octree structure according to embodiments.
Figure 26:
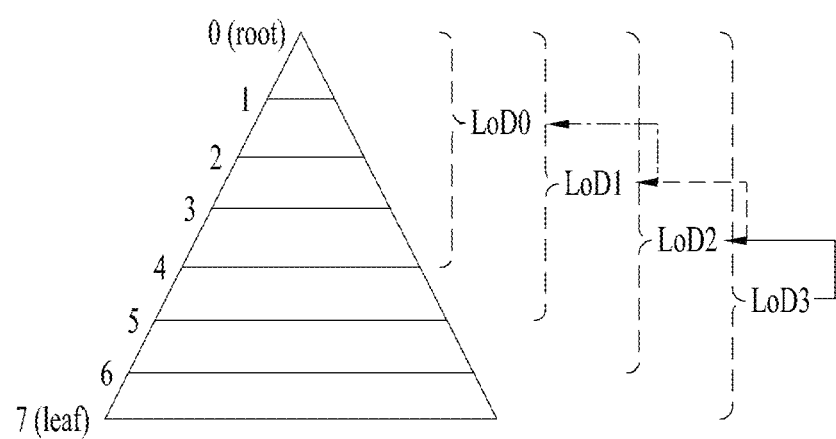
FIG. 26 is a diagram illustrating an example of performing attribute compression based on LODs generated according to embodiments.

FIG. 25 is a diagram illustrating another example of generating LODs based on a plurality of retained sets in an octree structure according to embodiments FIG. 26 is a diagram illustrating an example of performing attribute compression based on LODs generated according to embodiments.

That is, when Retained sets are generated based on the octree structure and the LoDs generated based on the Retained sets are used for attribute encoding performed based on prediction lifting transform, points included in the previous LoD (or points present in the same LoD) may be used in the process of predicting points included in a lower LoD as shown in FIG. 25.

In this case, in the process of finding a neighbor point in the prediction process, an algorithm for finding the nearest neighbor based on the distance takes a lot of time. In general, for points sorted in ascending order of Morton code within ascending order of LoD, a method of finding a neighbor among the points in a predetermined neighbor range is used.

However, when the LoD is configured based on the octree structure, a neighbor may be defined based on positional similarity (positional similarity between child nodes) existing in the octree structure. In this case, as shown in FIG. 26, a neighbor search time may be reduced by finding a neighbor based on an upper node in the octree structure as well as a constraint on the LoD.

The above-described octree-based LOD generation process may be equally applied to not only the transmitter but also the receiver. It may also be used for prediction and transformation for attribute decoding according to LoD to be used in an application field, and outputting may be performed for any LoD level for the final output.

In particular, in the present disclosure, by configuring the LOD using octree nodes to which the attribute is assigned, scalable encoding of the attribute may be allowed on the transmitting side and scalable decoding of the attribute may be allowed on the receiving side.

Figure 27:
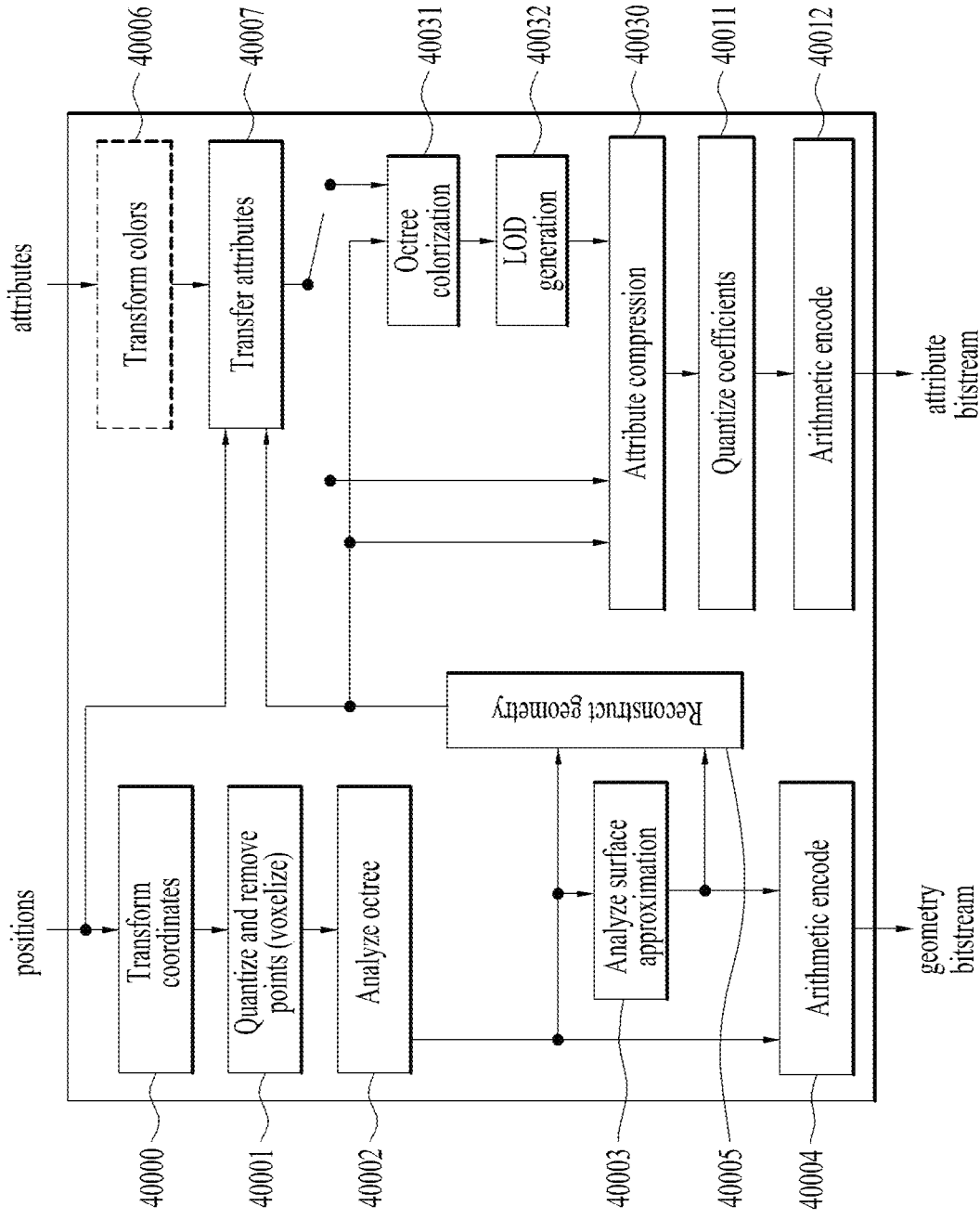
FIG. 27 is a block diagram illustrating another exemplary point cloud video encoder according to embodiments.

FIG. 27 illustrates another embodiment of a point cloud video encoder according to the present disclosure. FIG. 27 illustrates another embodiment of the point cloud video encoder of FIG. 4.

Each component of the point cloud video encoder of FIG. 27 may be implemented by hardware, software, a processor, and/or a combination thereof.

In FIG. 27, the color transformation unit 40006, the attribute transformation unit 40007, the attribute compression unit 40030, the octree colorization unit 40031, the LOD generation unit 40032, the coefficient quantization unit 40011 and/or the arithmetic encoder 40012 are referred to as an attribute encoder to perform attribute encoding.

For parts not described in the description of each block constituting FIG. 27, reference will be made to the descriptions of blocks having the same reference numerals in FIG. 4.

In an embodiment, the point cloud video encoder of FIG. 27 also receives and encodes the point cloud data (or referred to as point cloud video data) acquired by the point cloud video acquisition unit 10001 of FIG. 1. The point cloud data is composed of points, and each point includes geometry (i.e., position) information and attribute information.

According to embodiments, the geometry information may be a coordinate vector of (x, y) of a two-dimensional Cartesian coordinate system, (γ, θ) of a cylindrical coordinate system, or (x,y,z) of a three-dimensional Cartesian coordinate system, (y, θ, z) of a cylindrical coordinate system, or (γ, θ, φ) of a spherical coordinate system. According to embodiments, the attribute information may be a vector (R, G, B) indicating the color of a point, and/or a brightness value, and/or a reflection coefficient of lidar, and/or a vector of values obtained from one or more sensors, such as a temperature value obtained from a thermal imaging camera.

The point cloud video encoder of FIG. 27 may further include a spatial partitioner (not shown) configured to spatially partition the input point cloud data into at least one 3D block. Here, the 3D block may represent a tile group, a tile, a slice, a coding unit (CU), a prediction unit (PU), or a transformation unit (TU). According to an embodiment, the information for spatial partitioning may be entropy-encoded and transmitted to the receiving side. The entropy encoding is a coding scheme of transforming the data to bit-based data for transmission.

Positions of at least one 3D block spatially partitioned by the spatial partitioner according to the embodiments are output to the coordinate transformation unit 40000, and attribute information (or referred to as attributes) is output to the color transformation unit 40006.

The coordinate transformation unit 40000 according to the embodiments may receive positions and transform the coordinates. That is, the coordinate transformation unit 40000 may transform the existing coordinates into another coordinate system. For example, the positions may be transformed into three-dimensional (XYZ) position information. Alternatively, the coordinate transformation unit 40000 may not perform the coordinate transformation. The output of the coordinate transformation unit 40000 will be referred to as geometry information.

Whether coordinate transformation is performed by the coordinate transformation unit 40000 and the coordinate information may be signaled on a per sequence/frame/tile/slice/block basis, and may be transmitted in a geometry bitstream or a separate bitstream. In addition, in an embodiment, they may be derived by the reception device based on whether the coordinates of a neighboring block is transformed, the size of the block, the number of points, the quantization value, the block partitioning depth, the position of the unit, the distance between the unit and the origin, and the like.

The geometry information output from the coordinate transformation unit 40000 according to the embodiments is quantized by the quantization unit 40001. The quantization unit 40001 reconstructs each point of the point cloud data by performing voxelization based on the quantized geometry information. Voxelization refers to a minimum unit for presenting the position information in a 3D space.

In the present disclosure, a three-dimensional cubic space created by dividing a three-dimensional space into units (unit=1.0) based on each axis (x, y, z-axis) in order to store the information on points present in a 3D space is referred to as a voxel. In addition, the process of matching a point present in a 3D space with a specific voxel is referred to as voxelization. The voxel may estimate position information (i.e., spatial coordinates) about at least one point included in the voxel in a positional relationship with a voxel group, and may have attribute information (e.g., color or reflectance information) about the at least one point.

That is, one voxel may include not only one point. For example, when it is assumed that a plurality of points is included in one voxel, a plurality of pieces of point related information may be present in one voxel, or may be integrated into one piece of point information. These adjustments may be performed selectively. In an embodiment, in the case where one piece of point information is present in one voxel (i.e., the latter case in the above example), the position value of the center point of the voxel is set based on the position values of the points present in the voxel.

The octree analysis unit 40002 according to the embodiments constructs (or generates) an octree based on voxels output from the quantization unit 40001.

In one embodiment, when the space of the 3D image is partitioned based on the x-axis, y-axis, and z-axis, 8 spaces are created. When each of the 8 spaces is partitioned again based on the x-axis, y-axis, and z-axis, 8 spaces are created from each of the smaller spaces. As described above, the octree has a layer tree structure, in which a parent node, which corresponds to a higher layer, is connected to eight child nodes, which correspond to a lower layer. That is, eight spaces of the same size obtained by spatially dividing a three-dimensional space managed by a parent node into x, y, and z directions, respectively, and are managed by the child nodes.

In this case, nodes belonging to the same layer have the same level value, and child nodes have a level value incremented by 1 from that of the parent node. Every time the child node level is incremented, 8 child nodes are created for each parent node.

A node belonging to the highest layer of the octree is referred to as a root node (or head node), and a node belonging to the lowest layer is referred to as a leaf node. In the example of FIG. 6, the level value of the highest layer (i.e., the root node) is 1 (i.e., depth 0), and the level value of 8 nodes of the next layer (i.e., the second column) is 2 (i.e., depth 1), and the level value of 16 nodes of the next layer (i.e., the third column) is 3 (i.e., depth 2).

In addition, the partitioning of the octree is performed as much as a destination level value or until the leaf node becomes a voxel. That is, since the voxel reflecting the positions of the points is managed using the octree, the total volume of the octree should be set to (0,0,0) to ($2^d$, $2^d$, $2^d$). $2^d$ is set to a value constituting the smallest bounding box surrounding all points of the point cloud video, wherein d is the depth of the octree.

In this case, each node of the octree may be expressed as an occupancy code. For example, when a point is included in a specific node, it is indicated as 1. Where there is no point included, 0 is indicated. Each node has an 8-bit bitmap indicating occupancy for 8 child nodes.

In one embodiment, a node with an occupancy code value of 0 is no longer split into 8 nodes. In FIG. 6, for example, only two nodes having an occupancy code value equal to 1 among the eight nodes of level 2 (i.e., depth 1) are each re-split to generate eight child nodes for each of the nodes. Thereby, unnecessary data may be removed.

The octree generated by the octree analysis unit 40002 according to the embodiments is output to the surface approximation analysis unit 40003, the arithmetic encoder 40004 and the geometry reconstruction unit 40005.

The surface approximation analysis unit 40003 analyzes and approximates the input octree, and then outputs the result to the arithmetic encoder 40004 and the geometry reconstruction unit 40005.

That is, the geometry information is compressed through the quantization unit 40001, the octree analysis unit 40002, and/or the surface approximation analysis unit 40003.

The arithmetic encoder 40004 entropy-encodes the octree output from the octree analysis unit 40002 or the octree approximated by the surface approximation analysis unit 40003 and outputs a geometry bitstream therefor. According to embodiments, the arithmetic encoder 40004 entropy-encodes the occupancy code of each node of the leaf node of the octree generated by the octree analysis unit 40002 or the occupancy code of each node of the leaf node of the octree approximated by the surface approximation analysis unit 40003. In this operation, the arithmetic encoder 40004 may directly encode the occupancy code, or may perform intra/inter-coding and then entropy-encode the code to increase compression efficiency. The receiver may reconstruct the octree through the occupancy code.

For the entropy encoding according to the embodiments, various encoding methods such as, for example, Exponential Golomb, Context-Adaptive Variable Length Coding (CAVLC), and Context-Adaptive Binary Arithmetic Coding (CABAC) may be used.

The geometry reconstruction unit 40005 receives the octree generated by the octree analysis unit 40002 and/or the octree approximated by the surface approximation analysis unit 40003 and reconstructs geometry information. That is, the geometry reconstruction unit 40005 reconstructs an octree/voxel based on a result of analysis of the distribution of points.

The geometry information reconstructed by the geometry reconstruction unit 40005 is output to the attribute transformation unit 40007, the attribute compression unit 40030, and/or the octree colorization unit 40031 of the attribute encoder.

The color transformation unit 40006 may transform a color in the input attribute information. For example, when the input attribute information includes color information in an RGB format, the unit may transform the color information into a YCbCr format. The color information may or may not be transformed by the color transformation unit 40006. The color transformation by the color transformation unit 40006 according to the embodiments is one of point cloud attribute coding schemes.

The attribute transformation unit 40007 may reconstruct the attribute information by mapping the positions and/or the geometry information reconstructed by the geometry reconstruction unit 40005 to the attribute information output from the color transformation unit 40006. For example, based on the position value of a point included in the voxel, the attribute transformation unit 40007 may transform the value of the attribute of the point at the position. The attribute transformation by the attribute transformation unit 40007 according to the embodiments is one of point cloud attribute coding schemes.

That is, a plurality of points is included in a specific voxel generated by the quantization unit 40001 according to the embodiments, but point information may be integrated and represented by one piece of point information. In addition, a position value of a center point of the voxel may be set based on the position values of the points included in the voxel. In this case, the attribute transformation unit 40007 according to the embodiments performs attribute transformation related thereto. In one embodiment, the attribute transformation unit 40007 may adjust the attribute value of the voxel to the average value of the color or reflectance of points included in the voxel or the average value of the color or reflectance of neighboring points within a specific radius from the position value of the center point of the voxel.

The attribute information reconstructed by the attribute transformation unit 40007 according to the embodiments may be provided to one of the attribute compression unit 40030 and the octree colorization unit 40030. The attribute compression unit 40030 may include one of the RAHT transformation unit, the lifting transformation unit, and the geometry-based attribute compressor.

A point cloud attribute coding scheme according to embodiments may use octree-based attribute compression, use RAHT transformation, use LOD-based lifting transform, or use a combination of the octree-based attribute compression/RAHT/LOD-based Lifting.

For details of the RAHT transformation unit and the LOD-based lifting transformation unit according to the embodiments, reference will be made to the description given above with reference to FIG. 4, and description of the details will be skipped.

In order to perform the LOD-based lifting transformation according to the embodiments, the octree colorization unit 40031 first performs an octree colorization process, and the LOD generation unit 40032 performs a process of generating the LOD based on the colorization process.

The octree colorization unit 40031 receives the octree structure generated by the octree analysis unit 40002 of the geometry encoder and/or the octree structure reconstructed by the geometry reconstruction unit 40005 as input, and the attribute transformation unit 40007 receives attribute information as input and performs octree colorization of matching the attribute information of the point cloud data and the positions thereof with the input octree node. The LOD generation unit 40032 generates multiple retained sets based on the octree structure in which the attribute information of the point cloud data and the positions thereof are matched with an octree node, and generates LODs based on the multiple retained sets.

The octree colorization process of the octree colorization unit 40021, the LOD generation process of the LOD generation unit 40032, and the lifting transformation process of the attribute compression unit 40030 using the generated LODs have been described in detail with reference to FIGS. 18 to 26, a description thereof will be omitted in order to avoid redundant description.

The coefficient quantization unit 40011 according to the embodiments quantizes the attribute information (or attribute data) output from the attribute compression unit 40030 based on a quantization coefficient. The arithmetic encoder 40012 according to the embodiments entropy-encodes the quantized attribute information and outputs an attribute bitstream therefor. For the entropy encoding according to the embodiments, various encoding methods such as, for example, Exponential Golomb, Context-Adaptive Variable Length Coding (CAVLC), and Context-Adaptive Binary Arithmetic Coding (CABAC) may be used.

Figure 28:
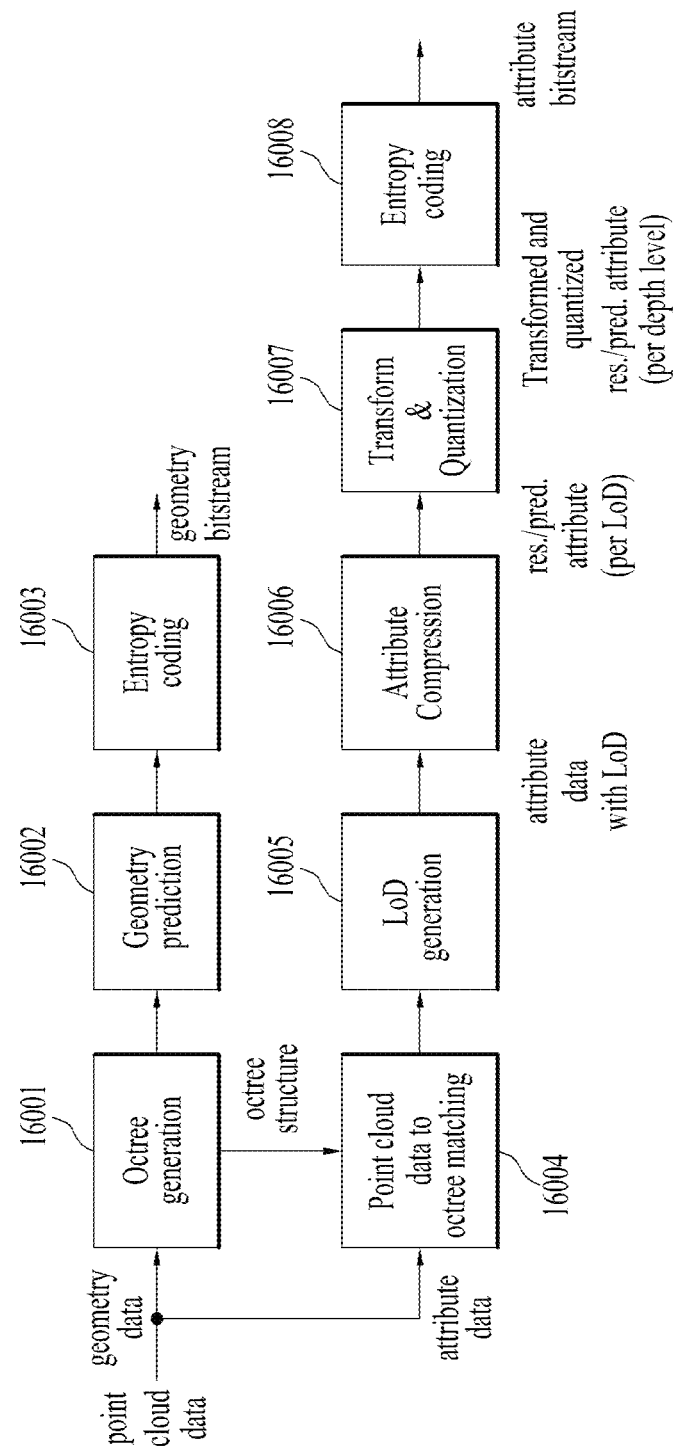
FIG. 28 is a flowchart illustrating a point cloud video encoding method according to embodiments.

FIG. 28 is a flowchart illustrating a point cloud video encoding method according to embodiments. A point cloud video encoding method according to the embodiments may include octree generation 16001, geometry prediction 16002, entropy encoding 16003, octree colorization 16004, LOD generation 16005, attribute compression 16006, transform and quantization 16007, and entropy encoding 16008.

In FIG. 28, according to an embodiment, the octree generation 16001, the geometry prediction 16002, and the entropy encoding 16003 may be performed by the coordinate transformation unit 40000, the quantization unit 40001, the octree analysis unit 40002, the surface approximation analysis unit 40003, the arithmetic encoder 40004, and the geometry reconstruction unit 40005 of FIG. 4 or 27. In another embodiment, in FIG. 28, the octree generation 16001, the geometry prediction 16002, and the entropy encoding 16003 may be performed by the data input unit 12000, the quantization processor 12001, the voxelization processor 12002, the octree occupancy code generator 12003, the surface model processor 12004, the intra/inter-coding processor 12005, and the arithmetic coder 12006 of FIG. 12.

In FIG. 28, in the octree colorization 16004, attribute information separated from the point cloud data may be received as input, or attribute information that has passed through the color transformation unit 40006 and the attribute transformation unit 40007 of FIG. 4 or 27 may be received as input. Also, the octree structure input in the octree colorization 16004 may be the octree structure generated by the octree analysis unit 40002 of FIG. 4 or 27, or the octree structure reconstructed by the geometry reconstruction unit 40005.

Since detailed operations of the octree colorization 16004 and the LOD generation 16005 have been described in detail with reference to FIGS. 18 to 26, a description thereof will be omitted to avoid redundant description.

In the attribute compression 16006, RAHT transformation may be performed, lifting transformation may be performed based on LODs, or attribute compression may be performed for each LOD based on the colorized octree structure.

For example, referring to FIG. 22, attribute prediction and residual attribute estimation may be performed for LOD0, or attribute prediction and residual attribute estimation may be performed for LOD1. Alternatively, attribute prediction and residual attribute estimation may be performed for both LOD0 and LOD1. In the attribute compression 16006 according to the embodiments, a neighbor node must first be determined for attribute prediction and residual attribute estimation.

According to embodiments, in the attribute compression 16006, attribute prediction may be performed based on positional adjacency between sub-nodes separated (or split) from the same node of the octree structure.

That is, child nodes belonging to the same parent node (or nodes belonging to the same branch at a higher level) in the octree structure may be considered as geometrically adjacent nodes. In other words, it may be assumed that 8 child nodes connected to one parent node have the highest attribute similarity.

According to embodiments, the remaining 7 nodes (i.e., sibling nodes) except the target node among the 8 nodes having the same parent node may be determined as neighbor nodes.

The definition of neighbor nodes may be applied to a bundle of adjacent parent nodes (e.g., a grandparent node unit) according to applications and image characteristics, and the prediction and compression performance of the next step may depend on the definition of the neighbor node.

According to embodiments, in the attribute compression 16006, when neighbor nodes of a node to be encoded are detected, attribute information about the node to be encoded is predicted based on the attribute information about the node to be encoded and the detected neighbor nodes.

Here, the predicted attribute information (referred to as predicted attribute value or predicted attribute data) may be obtained for each node, or the same predicted attribute information may be used for nodes belonging to the neighbor to reduce the amount of information. In FIG. 22, since 8 child nodes split from the same parent node are nodes belonging to the neighbor. Thus, in one embodiment, the predicted attribute information about each of the 8 child nodes split from the same parent node has the same value. When the neighbor nodes are defined to have the same predicted attribute value as in the present embodiment, the number of coefficients required for encoding may be reduced and coding efficiency may be increased.

In addition, the attribute information may be predicted using various types of attribute prediction methods.

For example, a representative value of attributes of neighbor nodes may be determined as predicted attribute information, an attribute value representing a local characteristic may be determined as predicted attribute information, or a value that minimizes prediction error may be calculated/selected and determined as predicted attribute information.

As another example, an attribute value of a node at a specific position may be used as predicted attribute information. In the example of FIG. 22, the upper level of the leaf node selects the attribute information (c1) in the attribute information (c1, c2, c3, c4) about the child nodes of the leaf node and the attribute information (c5) in the attribute information (c5, c6, c7, c8, c9) about the child nodes, and the root node selects the attribute information (c2) about the leaf node.

Various methods may be applied to select an attribute value of a node at the specific position. For example, an attribute value of a geometrical centroid may be selected, or an attribute value corresponding to a specific order within a prediction unit may be selected. Alternatively, an attribute value that minimizes an attribute error may be selected. In the present disclosure, a prediction unit may be defined by combining a node to be encoded and neighbor nodes of the node. For example, when the range of neighbor nodes is on a per parent node basis, eight child nodes having the same parent node are defined as a prediction unit. According to embodiments, the prediction unit may vary according to the range of neighbor nodes.

Once attribute information is predicted as described above, residual attribute information is estimated based on the predicted attribute information. For example, in the case where the range of neighbor nodes is on a per parent node basis, when the residual attribute is estimated for LOD0, the difference between the attribute information (c2 or c5) about a corresponding node and the attribute information (c2) about the root node is determined as residual attribute information (or predicted error attribute information) about the node among the nodes matched with the attribute information (c1, c5) of level 1.

As another example, in the case where the range of neighbor nodes is on a per parent node basis, when the residual attribute is estimated for LOD1, the difference between the attribute information (one of c5, c6, c7, c8, and c9) and the higher-level predicted attribute information (c1) is determined as residual attribute information about the node among the nodes matched with the attribute information (c1, c2, c3, c4) about the leaf node. Also, among the nodes matched with the attribute information (c5, c6, c7, c8, c9) about the leaf node, the difference between the attribute information (one of c5, c6, c7, c8, and c9) about a corresponding node and the higher-level predicted attribute information (c5) is determined as residual attribute information about the node. In addition, among the nodes matched with the attribute information (c1, c5) of level 1, the difference between the attribute information (c2 or c5) about a corresponding node and the attribute information (c2) about the root node is determined as residual attribute information about the node. In this case, since the attribute information (c1, c2, c5) about the leaf node is used as attribute information predicted at a higher level than the leaf node, the residual attribute information about the nodes matched with the attribute information (c1, c2, c5) about the leaf node is 0. In this case, a value (e.g., 0) indicating a blank may be delivered as the residual attribute information about the corresponding node, or the corresponding position may be signaled, or only the corresponding position may be signaled without delivering the blank. Thereby, scalable decoding is enabled on the receiving side. That is, decoding may be performed for all levels or partial decoding may be performed up to a specific level depending on the decoding performance, display performance, and the like of the receiving side.

The attribute information predicted in the attribute compression 16006 and the estimated residual attribute information are quantized based on the quantization coefficients in the transform and quantization 16007.

Then, in the transform and quantization 16007, the quantization process may be performed after performing the attribute transformation as in Equation 6 below in order to increase efficiency in transmission of the predicted attribute information and the estimated residual attribute information, (i.e., prediction error attribute information).

$$d(x,y,z)=T\{r(x,y,z)\}$$ [Equation 6]

For example, when RAHT transform or lifting transform is performed as an attribute compression method, an attribute transformation process as in Equation 6 may be additionally performed before quantization. In an embodiment, the predicted attribute information and/or residual attribute information may be transformed based on a transform type such as discrete cosine transform (DCT), discrete sine transform (DST), or a wavelet. That is, in the transform and quantization 16007, the predicted attribute information and the estimated residual attribute information which are or are not transformed are quantized as in Equation 7 below based on the quantization coefficient q, and then output to the entropy encoding operation 16008.

$$d'(x,y,z)=Q\{d(x,y,z)\}=\text{round}[d(x,y,z)/q]$$ [Equation 7]

The degree of quantization by the transformation and quantization step 16007 is determined by the quantization coefficient q, wherein different quantization coefficients may be used according to data types. In an embodiment, different quantization coefficients may be used according to luma/chroma and predicted attribute information/residual attribute information.

In an embodiment, the predicted attribute information and residual attribute information quantized by the transformation and quantization step 16007 are output to the entropy encoding step 16008 step by step in consideration of the decoder processing at the receiving side. That is, the quantized predicted attribute information is first delivered to the entropy encoding step 16008, and then the quantized residual attribute information is delivered to the entropy encoding step 16008. Thereby, a delay of the decoder at the receiving side may be prevented. Also, within each step, the information may be delivered in ascending order (e.g., Morton code order) along the xyz axes, and a reordering process may be added when necessary.

The entropy encoding step 16008 entropy-encodes the quantized predicted attribute information, entropy-quantizes the quantized residual attribute information and outputs the same in an attribute bitstream. For the entropy encoding, various encoding methods such as exponential Golomb, CAVLC, and CABAC may be used.

According to another embodiment of the present disclosure, when there is one occupied node among the 8 child nodes split from the same parent node, that is, when there are no neighbor nodes, attribute information (i.e., color/reflectance value) about the occupied node is output to the entropy encoding step 16008 so as to be entropy-encoded.

Figure 29:
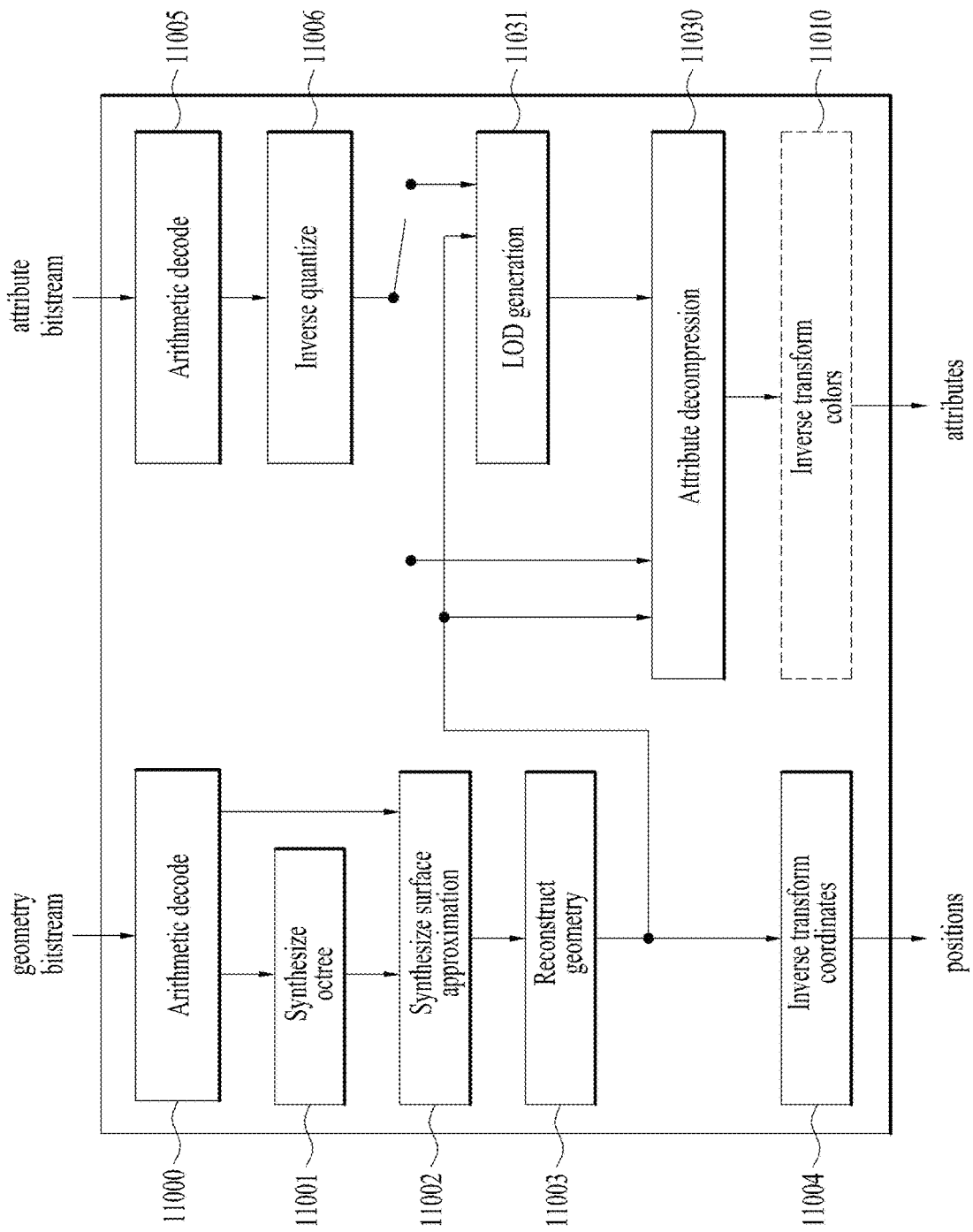
FIG. 29 is a block diagram illustrating another exemplary point cloud video decoder according to embodiments.

FIG. 29 shows another embodiment of a point cloud video decoder according to the present disclosure. That is, FIG. 29 shows another embodiment of the point cloud video decoder of FIG. 11.

Each component of the point cloud video decoder of FIG. 29 may be implemented by hardware, software, a processor, and/or a combination thereof. For parts not described in the description of each block constituting FIG. 29, reference will be made to the descriptions of blocks having the same reference numerals in FIG. 11.

The point cloud video decoder of FIG. 29 may perform a reverse process of the operation of the point cloud video encoder of FIG. 27.

The arithmetic decoder 11000, the octree synthesizer 11001, the surface approximation synthesizer 11002, the geometry reconstruction unit 11003, and the coordinate inverse transformer 11004 of the point cloud video decoder 10006 may be collectively referred to as a geometry decoder. The arithmetic decoder 11005, the inverse quantization unit 11006, the attribute decompressor 11030, the LOD generation unit 11031, and/or the inverse color transformation unit 11010 may be collectively referred to as an attribute decoder.

The arithmetic decoder 11000 of the geometry decoder entropy-decodes the geometry bitstream included in the input bitstream based on the arithmetic method to acquire information about the geometry. The information about the geometry includes the occupancy code of each node of the octree of the transmitting side.

According to an embodiment, the octree synthesizer 11001 reconstructs an octree based on the occupancy code of each node acquired from the information about the geometry. The octree reconstructed by the octree synthesizer 11001 is output to the surface approximation synthesizer 11002. Also, the reconstructed octree may be output to at least one of the attribute decompressor 11030 and the LOD generation unit 11031.

In an embodiment, the surface approximation synthesizer 11002 synthesizes a surface based on the geometry decoded by the arithmetic decoder 11000 and/or the octree reconstructed by the octree synthesizer 11001.

In an embodiment, the geometry reconstruction unit 11003 reconstructs the geometry based on the surface synthesized by the surface approximation synthesizer 11002 and/or the geometry decoded by the arithmetic decoder 11000. In this case, when the direct mode is applied, the geometry reconstruction unit 11003 directly invokes and adds the position information value of the point. When the trisoup mode is applied, the geometry reconstruction unit 11003 reconstructs the geometry through the triangle reconstruction, up-sampling, voxelization processes. The reconstructed geometry may include a reconstructed (decoded) point cloud picture/frame without (any) attributes.

The geometry reconstructed by the geometry reconstruction unit 11003 is output to at least one of the coordinate inverse transformer 11004 and the attribute decompressor 11030 and the LOD generation unit 11031 of the attribute decoder.

In an embodiment, the coordinate inverse transformer 11004 inversely transforms the coordinates based on the reconstructed geometry to acquire positions.

The arithmetic decoder 11005 of the attribute decoder entropy-decodes the attribute bitstream included in the input bitstream based on the arithmetic method to acquire information about attributes.

According to an embodiment, the inverse quantization unit 11006 inversely quantizes the attribute information acquired by the arithmetic decoder 11005. According to an embodiment, the attribute information includes predicted attribute information and residual attribute information. That is, the inverse quantization unit 11006 performs an inverse quantization process in the attribute decoding process, when necessary.

The inverse quantization unit 11006 may use an inverse function of quantization as shown in Equation 8 below.

$$\hat{a}(x,y,z) = Q^{-1}\{d'(x,y,z)\} = d'(x,y,z) \times q \quad \text{[Equation 8]}$$

In an embodiment, when the coefficient quantization unit 40011 of the transmitting side uses different quantization coefficients according to various quantization methods or data characteristics, the inverse quantization coefficient q may be included in the received signaling information. The degree of quantization by the coefficient quantization unit 40011 is determined by the quantization coefficient q. In addition, data having different characteristics such as luma/chroma and predicted attribute information/residual attribute information may use different quantization coefficients.

In addition, in the case where the transmission side has performed attribute transformation on the predicted attribute information and/or residual attribute information, inverse transformation is performed as in Equation 9 below based on the value of the transform type field included in the signaling information. That is, the predicted attribute information and/or residual attribute information are inversely transformed based on a transform type such as DCT, DST, or wavelet according to the value of the transform type field.

$$\hat{r}(x,y,z) = T^{-1}\{\hat{a}(x,y,z)\} \quad \text{[Equation 9]}$$

The attribute information output from the inverse quantization unit 11006 is provided to at least one of the attribute decompressor 11030 and the LOD generation unit 11031.

As a method of reconstructing an attribute by the attribute decompressor 11030 according to the embodiments, an octree-based attribute decompression, RAHT inverse transform, LOD-based lifting inverse transform, or a combination of octree-based attribute decompression/RAHT inverse transform/LOD-based lifting inverse transform may be used. That is, the inverse transformation process for the octree-based attribute compression/RAHT/LOD-based lifting transform is selectively performed according to the method applied for encoding.

In an embodiment, the RAHT inverse transform and the LOD-based lifting inverse transform respectively may perform inverse processes of operations corresponding to the RAHT unit 40008 and the lifting transformation unit 40010 of FIG. 4, or may be performed by the RAHT transformer 11007 and the inverse lifter 11009 of FIG. 11, respectively, or by the prediction/lifting/RAHT inverse transform processor 13009 of FIG. 13.

In order to perform the LOD-based lifting inverse transform according to the embodiments, a process of generating an LOD should be performed first. According to an embodiment of the present disclosure, the LOD is generated based on the LOD generation process of the transmitting side described with reference to FIGS. 18 to 26.

The attribute information reconstructed by the attribute decompressor 11030 is output to the inverse color transformation unit 11010. In an embodiment, the inverse color transformation unit 11010 performs color transformation on the input attribute information, when necessary.

As described above, the point cloud video decoder includes the geometry decoder and the attribute decoder, and positions decoded and output by the geometry decoder and point cloud content including attribute information decoded and output by the attribute decoder are output to the renderer 10007.

The rendering process of the renderer 10007 refers to a process of rendering and displaying data of the point cloud content in a 3D space. According to an embodiment, the renderer 10007 renders the data according to a desired rendering method based on the position and attribute information about points decoded through the decoding process of the point cloud video decoder of FIG. 11 or FIG. 13 or FIG. 29. The points of point cloud content may be rendered into vertices with a certain thickness, a cube having a specific minimum size centered at the vertex position, or a circle centered at the vertex position. The user may view all or part of the rendered result through a VR/AR display or a general display.

In addition, the feedback process may include a process of transmitting various kinds of feedback information that may be acquired in the display process to the transmitting side or to the decoding at the receiving side. Since the feedback process has been described in detail above, reference will be made to the foregoing and a detailed description thereof will be omitted herein to avoid redundant description.

Figure 30:
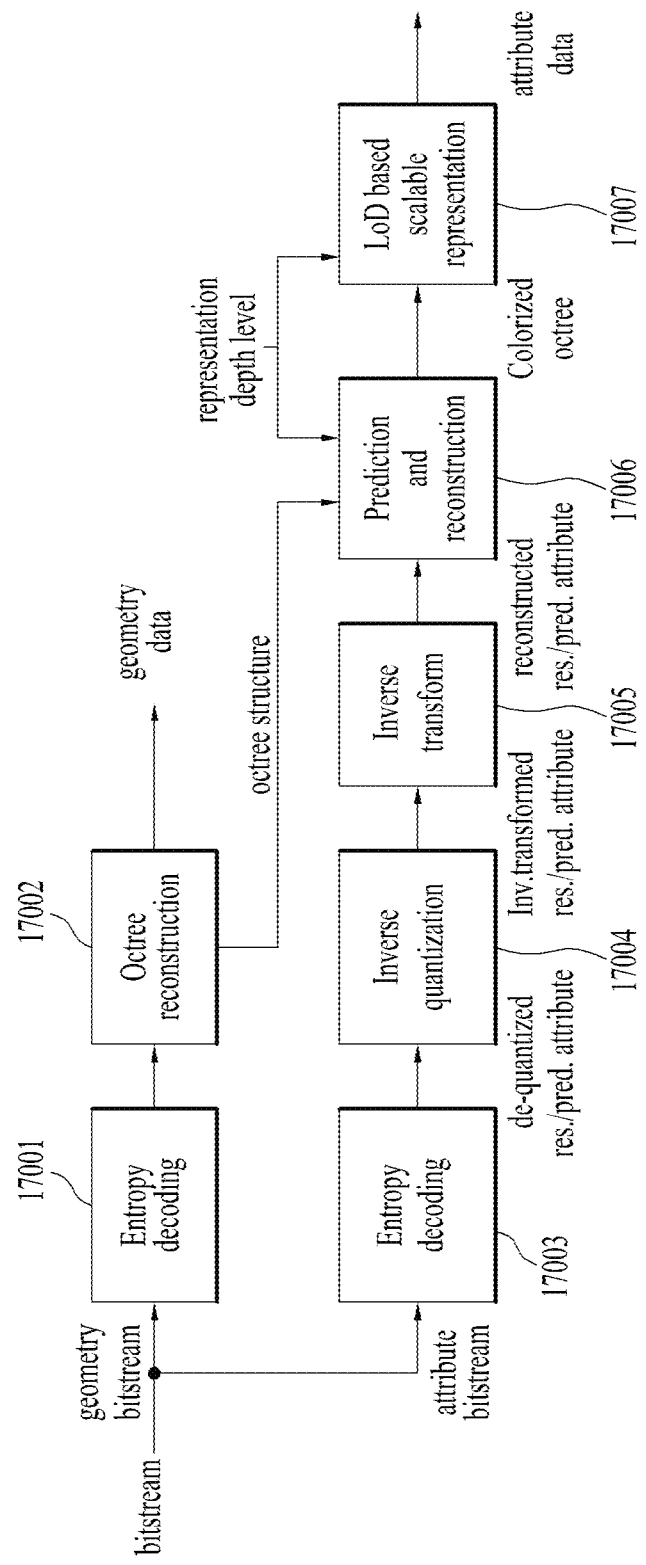
FIG. 30 is a flowchart illustrating a point cloud video decoding method according to embodiments.

FIG. 30 is a flowchart illustrating a point cloud video decoding method according to embodiments. The point cloud video decoding method according to the embodiments may include entropy decoding 17001 of a geometry bitstream, octree reconstruction 17002, entropy decoding 17003 of an attribute bitstream, inverse quantization 17004, inverse transformation 17005, attribute prediction and reconstruction 17006, and LOD-based scalable representation 17007.

The geometry bitstream in the received bitstream is entropy-decoded in the entropy decoding operation 17001. In the octree reconstruction 17002, the geometry information is reconstructed by regenerating the octree structure based on the entropy-decoded geometry.

The attribute bitstream in the received bitstream is entropy-decoded in the entropy decoding operation 17003. The entropy-decoded attribute is inversely quantized based on the quantization coefficients in the inverse quantization operation 17004, and inversely transformed in the inverse transformation 17005. In this regard, various methods may be used for the inverse quantization and inverse transformation processes according to the quantization and transformation processes performed on the transmitting side. If the data is encoded without the transformation process on the transmitting side, the inverse transformation 17005 is skipped. The attribute inverse quantized in the inverse quantization 17004 or inversely transformed in the inverse transformation 17005 and the octree structure regenerated in the octree reconstruction 17002 are provided to the attribute prediction and reconstruction 17006. In an embodiment, the attribute inverse quantized in the inverse quantization 17004 or the attribute inversely transformed in the inverse transformation 17005 includes predicted attribute information and estimated residual attribute information. Predicted attribute information and residual attribute information may be present for each LOD or only for the leaf node. Also, the residual attribute information may be provided at each level, and the predicted attribute information may be provided only at the highest node (e.g., root node).

In the attribute prediction and reconstruction 17006, a process (i.e., colorized octree regeneration) of detecting neighbor nodes for a node to be decoded based on the regenerated octree structure, obtaining predicted attribute information based on the detected neighbor nodes and adding the obtained information to the received residual attribute information to reconstruct the corresponding attribute information corresponding to the octree node is performed.

According to embodiments, in the attribute prediction and reconstruction 17006, the same process as the neighbor node detection on the transmitting side is performed to reconstruct the position information. That is, in the attribute prediction and reconstruction 17006, neighbor nodes of a node to be decoded are detected based on the octree structure provided in the octree reconstruction 17002.

In the present disclosure, a case where the range of neighbor nodes is configured on a per parent node basis will be described as an embodiment. That is, 8 child nodes from the same parent are defined as neighbor nodes. That is, sibling nodes from the same parent are defined as neighbor nodes. If a different definition (e.g., different size) of the range (or unit) of neighbor nodes is used, information for neighbor node detection may be included in the received signaling information. Attribute prediction is performed based on the detected neighbor node information. That is, as the level goes down (i.e., from the root node to the leaf node) in the reverse order of the attribute prediction performed on the transmitting side, the attribute is predicted as in Equation 10 below. The attribute prediction method used may be the same as the method used on the transmitting side, and a reconstructed attribute of the parent node may be used as a predicted value for the child nodes. When multiple methods are available, the method and additional information used in encoding may be transmitted to the receiving side through signaling information or metadata.

$$\hat{p}_l(x,y,z) = \hat{c}_{l-1}(2 \times \lfloor x/2 \rfloor, \lfloor 2 \times y/2 \rfloor, 2 \times \lfloor z/2 \rfloor)$$ [Equation 10]

In the attribute prediction and reconstruction 17006 according to the embodiments, an attribute of each child node is reconstructed based on the predicted attribute information and residual attribute information. According to embodiments, the reverse of the residual attribute estimation method used on the transmitting side is performed to reconstruct the attribute of each child node. For example, when the residual attribute information is estimated based on the difference between the source attribute information and the predicted attribute information on the transmitting side, the attribute information may be reconstructed by adding the predicted attribute information and the decoded residual attribute information as in Equation 11 below. In addition, the residual attribute estimation method may be transmitted to the receiving side through signaling information or metadata.

$$\hat{c}_l(x,y,z) = g^{-1}\{\hat{r}_l(x,y,z), \hat{p}_l(x,y,z)\} = \hat{p}_l(x,y,z) + \hat{r}_l(x,y,z)$$ [Equation 11]

In general, the goal is to output the attribute of the leaf node as a final result. However, attribute information reconstructed at a certain level may be output depending on receiver performance, application field, presence/absence of information, and the like. In this case, the level to be output and related information may be delivered to the receiving side through signaling information or metadata.

Attribute data for the attribute information reconstructed (that is, restored) in the attribute prediction and reconstruction 17006 is output after the process (that is, point cloud data aggregation) of collecting point cloud data of an octree level decoded for outputting point cloud data in the LOD-based scalable representation 17007.

As described above, when LoDs are generated based on the octree structure, attribute prediction and lifting transformation may be performed with a small amount of computation.

As described above, recursive attribute estimation may be performed. Accordingly, the attribute information may be reconstructed almost at the same time as the geometry decoding with a small amount of computation. Therefore, it is expected that the attribute information is usable for a transmission/reception system requiring low-delay. That is, since the octree-based attribute decompressor 11011 may know the predicted attribute information and residual attribute information about the previous level before the geometry is decoded up to the leaf node, the attribute information may start to be reconstructed when a specific level is decoded without waiting until the geometry decoding is completed up to the leaf node.

In addition, depending on the capacity of the decoder, lack of resources, or display performance, the geometry information and attribute information may be partially decoded and rendered only up to a specific level of the octree, or may be fully decoded and rendered up to the leaf node level. Thereby, a spatial scalability function may be provided. Spatial scalability is a function of decoding a received octree-based bitstream only up to a specific depth level rather than decoding the entire bitstream and providing low-resolution point clouds when the point cloud data is dense and the entire octree bitstream is transmitted, but the decoder capacity or resources are insufficient or the thumbnail is preferentially needed according to the scenario.

Figure 31:
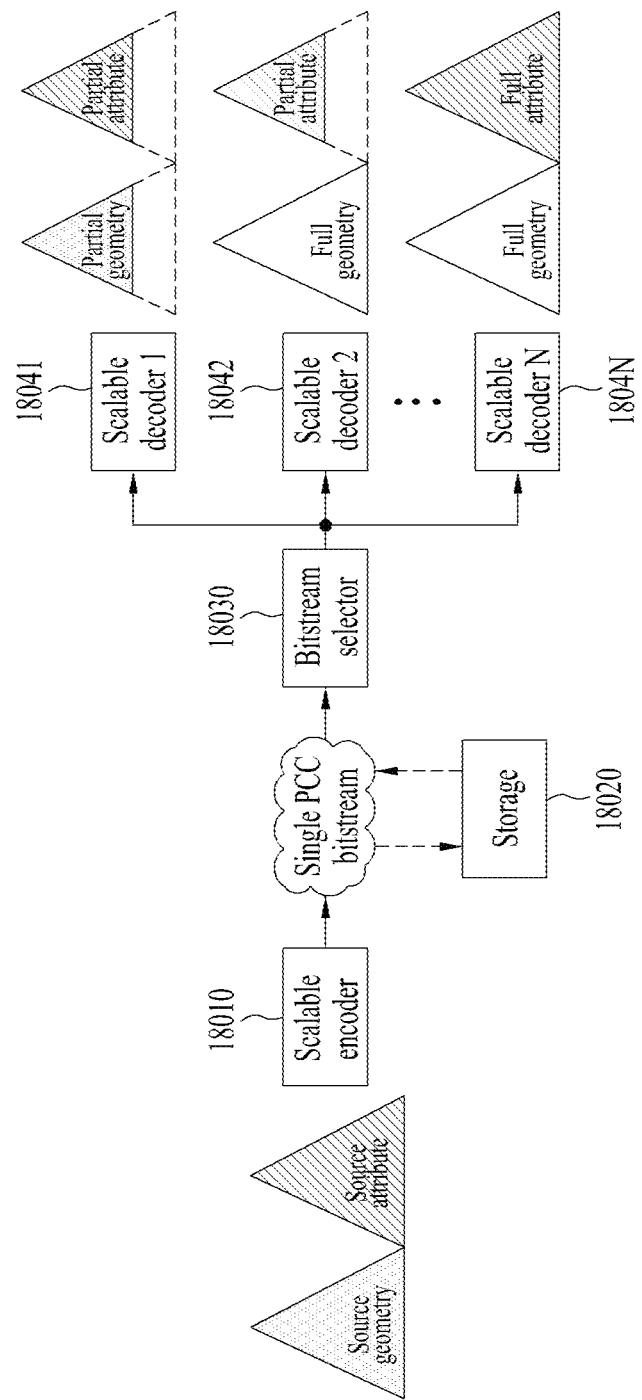
FIG. 31 is a diagram illustrating an example of scalable encoding and/or scalable decoding of point cloud data according to embodiments.

FIG. 31 is a diagram illustrating an example of scalable encoding and/or scalable decoding of point cloud data according to embodiments.

According to the example of FIG. 31, the scalable encoder 18010 of the transmitting side fully encodes the geometry information and the attribute information, and transmits the full depth level geometry information and the full depth level attribute information in the form of a single bitstream to the receiving side. On the receiving side, a bitstream to be decoded in a single bitstream is selected through a bitstream selector 18030 according to the decoder capacity, lack of resources, or display performance, and the selected bitstream is decoded through a corresponding scalable decoder (one of 18041 to 1804N). For example, the scalable decoder 18041 may receive geometry information of a partial depth level and attribute information of a partial depth level through the bitstream selector 18030 and decode the same, and the scalable decoder 18042 may receive and decode the geometry information of the full depth level and the attribute information of the partial depth level. The scalable decoder 1804N may receive and decode the geometry information of the full depth level and the attribute information of the full depth level. According to embodiments, the single bitstream generated at the transmitting side may be stored in a storage unit 18020 and then provided to the bitstream selector 18030 at the receiving side. According to embodiments, the receiving side may include one of the scalable decoders 18041 to 1804N according to the decoder capacity, lack of resources, display performance, or the like.

Figure 32:
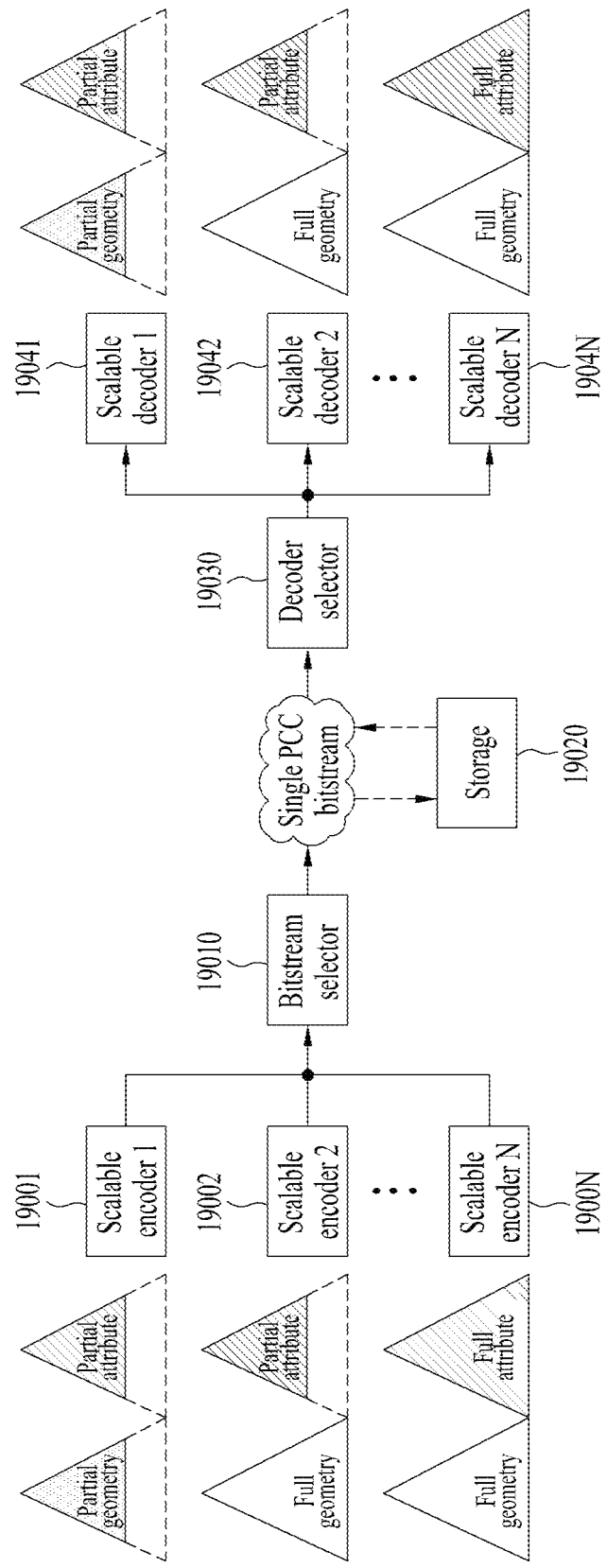
FIG. 32 is a diagram illustrating another example of scalable encoding and/or scalable decoding of point cloud data according to embodiments.

FIG. 32 is a diagram illustrating another example of scalable encoding and/or scalable decoding of point cloud data according to embodiments.

At the transmitting side, one or more scalable encoders 19001 to 1900N may be used to encode both geometry information and attribute information up to a partial depth level to output a single bitstream, to encode the geometry information up to a full depth level and the attribute information up to a partial depth level to output a single bitstream, or to encode both geometry information and attribute information up to the full depth level to output a single bitstream. One of the bitstreams output from the one or more scalable encoders 19001 to 1900N may be selected through a bitstream selector 19010 and transmitted to the receiving side in the form of a single bitstream or may be stored in the storage unit 19020 and then transmitted to the receiving side. At the receiving side, one of the one or more scalable decoders 19041 to 1904N may be selected through the decoder selector 19030 according to the decoder capacity, lack of resources, or display performance, and the selected scalable decoder may decode the input bitstream. For example, the scalable decoder 19041 may receive geometry information of a partial depth level and attribute information of a partial depth level and decode the same, and the scalable decoder 19042 may receive geometry information of a full depth level and attribute information of a partial depth level and decode the same. The scalable decoder 1904N may receive geometry information of a full depth level and attribute information of a full depth level and decode the same.

Figure 33:
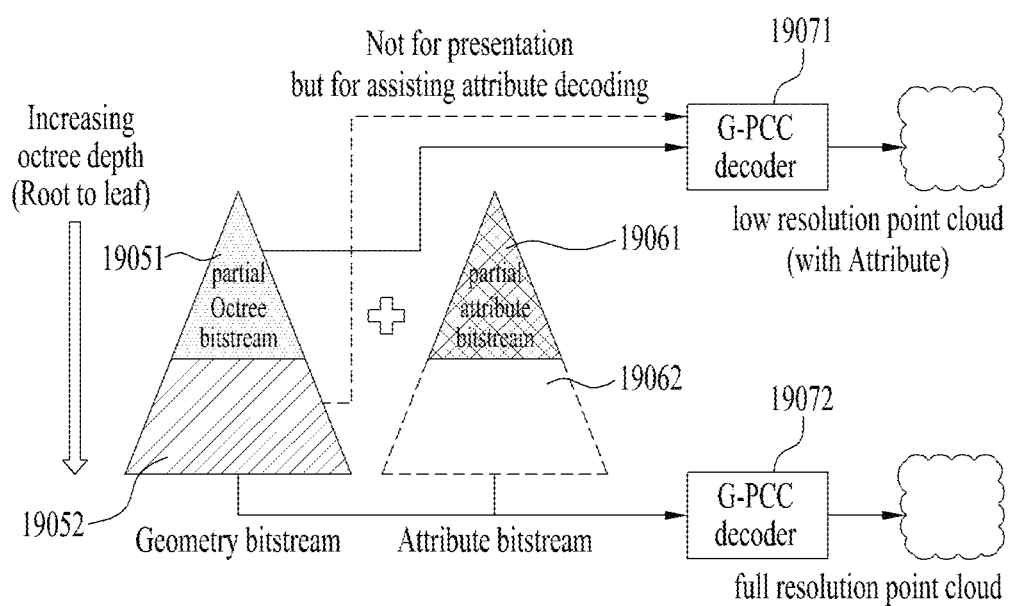
FIG. 33 is a diagram illustrating another example of scalable decoding of point cloud data according to embodiments.

FIG. 33 is a diagram illustrating another example of scalable decoding of point cloud data according to embodiments. In the example, a first G-PCC decoder 19071 may receive geometry information 19051 and 19052 of a full depth level and attribute information 19061 of a partial depth level and perform G-PCC decoding, thereby outputting low resolution point cloud data, and the second G-PCC decoder 19072 may receive the geometry information 19051 and 19052 of the full depth level and attribute information 19061 and 19062 of the full depth level as input and perform G-PCC decoding, thereby outputting full resolution point cloud data.

According to embodiments, the first G-PCC decoder 19071 may receive both the geometry information 19051 of the partial depth level in the direction toward the root node and the geometry information 19052 of the partial depth level in the direction toward the leaf node. However, the geometry information 19052 of the partial depth level in the direction toward the leaf node is intended to assist in attribute decoding, not intended for representation.

By performing point cloud compression on the geometry information and the attribute information as in any one of FIGS. 31 to 33, receivers of various performances may be supported based on one compressed bitstream according to the compression method. For example, by compressing the geometry information and the attribute information for decoders of various performances, receivers of various performances may be supported through a single bitstream without generating or storing independent compression information suitable for each decoder performance. Therefore, the compression is advantageous in terms of storage space and bit efficiency of the transmitting side. In addition, when the transmission bandwidth is limited, low-resolution point cloud data may be generated and transmitted from the transmitting side.

The receiver receiving the geometry information and attribute information compressed as in any one of FIGS. 31 to 33 may reconstruct the attribute information by performing attribute decoding almost at the same time as geometry decoding with a small amount of computation. Accordingly, the reconstructed information may be used by a transmitter and/or a receiver that require low delay. In addition, when the output level of the attribute information is selected, it is expected that even a receiver with low computational power may output attribute information suitable for the performance of the receiver without delay.

For example, different results may be output depending on performance of the receiver or requirements of the receiver for attribute decoding and reconstruction. In this case, the decoded or reconstructed attribute of each level may be used as an attribute value matched with the octree node of the corresponding level. In particular, when a colorized octree is transmitted according to the point cloud coding characteristic, the octree level may be selected according to the output performance or the renderer performance. Alternatively, the receiver may output or render a low-resolution image after performing octree colorization on the point cloud data reconstructed after decoding in consideration of output or rendering performance.

FIG. 34 illustrates embodiments of outputting different levels of geometry according to the performance of a receiver. When the geometry is represented starting from a higher level of the octree, information between points is gradually filled or the points are gradually separated as the operation proceeds from left to right in FIG. 34, and is finally represented as a leaf node. The receiver may select and output one of the steps of FIG. 34 according to the performance of the receiver through the signaling information provided in the present disclosure.

Figure 35:
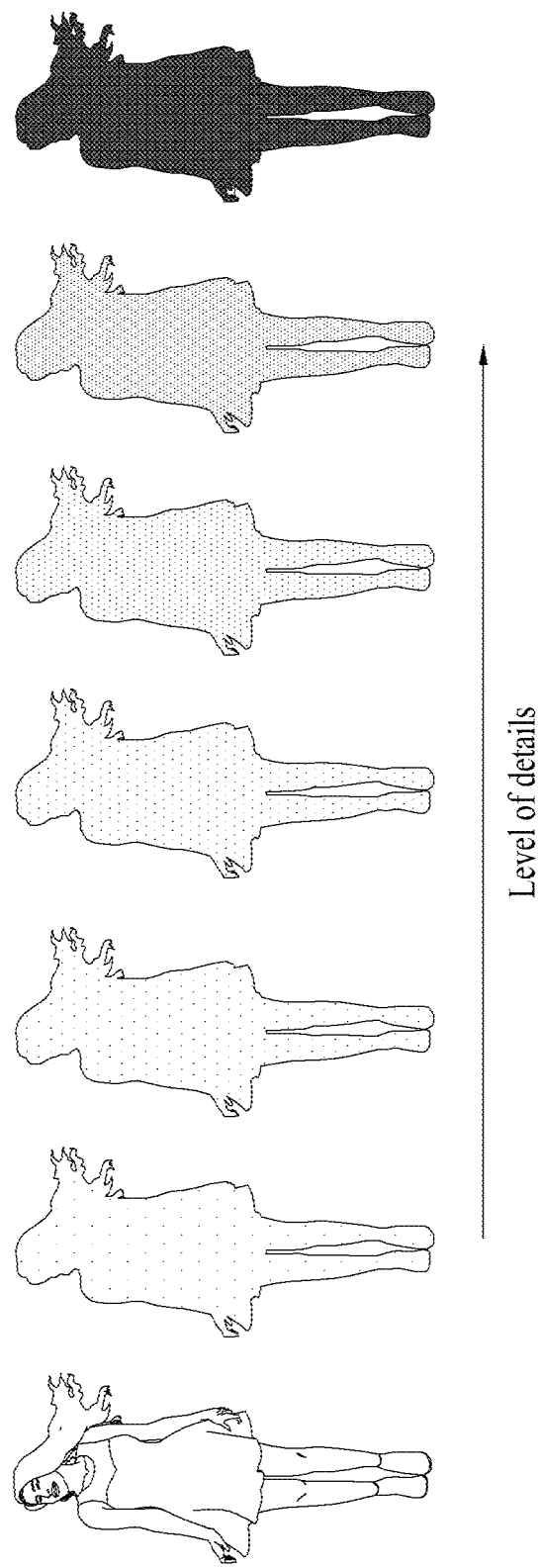
FIG. 35 illustrates an example of outputting attributes of different levels according to embodiments.

FIG. 35 illustrates embodiments of outputting attributes of different levels according to the performance of a receiving system. When the resolution of the geometry is selectively output as shown in FIG. 34, the resolution of the attribute may also be selectively output. When the attribute information is selectively output, the detail of the attribute may be gradually increased from right to left in FIG. 35. The receiver may select and output an attribute having the same level as or detail corresponding to the level selected in the geometry of FIG. 34. In this case, the attribute may be matched with the octree node indicated in the geometry, or may be matched with the attribute at the position of the actually occupied leaf node.

When the octree-based LOD generation and/or attribute prediction method proposed in the present disclosure is used, the following signaling information may be transmitted for decoding.

The signaling information (or signaling) defined below may be signaled and transmitted in a unit of a parameter set (geometry parameter set (GPS), attribute parameter set (APS), video parameter set (VPS), sequence parameter set (SPS), picture parameter set (PPS), tile parameter set (TPS), etc.)), which is information about the video codec level. Also, the information may be signaled and transmitted on the basis of a coding unit of each image, such as slice or tile. Depending on the application, the information may also be defined at the system level such as a file format, dynamic adaptive streaming over HTTP (DASH), and MPEG media transport (MMT), or at the wired interface level such as High Definition Multimedia Interface (HDMI), Display Port, VESA (Video Electronics Standards Association), and CTA.

Point cloud data according to the present disclosure may include SPS, GPS, APS, and TPS including signaling information according to embodiments. The point cloud data may include one or more geometries and/or attributes. The geometry and/or attributes of the point cloud data may be included in units of one or more slices. The geometry may have a structure of a geometry slice header and geometry slice data.

The method/device according to the embodiments may signal related information to add/perform the operations of the embodiments. The signaling information according to the embodiments may be used at the transmitting side or the receiving side.

The method/device according to the embodiments may add signaling information for octree-based LOD generation and/or attribute prediction to the APS and signal the same.

The method/device according to the embodiments provides a tile or a slice such that the point cloud may be divided into regions and processed.

Accordingly, when the point cloud is divided into slices, the method/device according to the embodiments may signal signaling information for octree-based LOD generation and/or attribute prediction for each slice.

FIG. 36 shows an exemplary syntax structure of an attribute parameter set (attribute_parameter_set( )) according to embodiments.

The aps attr_parameter_set_id field indicates an identifier (ID) for identifying attribute parameter set information.

The aps_seq_parameter_set_id field indicates an identifier (ID) for identifying sequence parameter set information.

The octree_based_layering_flag field indicates whether attribute compression is performed based on an octree and the data is a type of layered data. For example, the octree_based_layering_flag field equal to 1 indicates that the point cloud data is a type of octree-based layered data (e.g., matched with a LoD as in the embodiment of the present disclosure). In this case, information on a relationship with an octree depth level for representing a layer used in an application field may be additionally transmitted.

For example, when the octree_based_layering_flag field is equal to 1, a num_layers field and a num_index field may be further included.

The num_layers field may indicate the number of layers used in the application field. For example, it may indicate the number of LoDs. Depending on the application field, it may be explicitly transmitted, or may be inferred from given information as in Equation 12 below.

[Equation 12]

$$N = \sum_i n[i] \text{ where } n[i] = \begin{cases} 1 & \text{multiple layer present flag } [i] = 0 \\ \text{num\_sub\_layers } [i] & \text{multiple layer present flag } [i] = 1 \end{cases}$$

The num_index field indicates the number of layers matching the octree depth level matching the layer used in the application field.

The attribute parameter set according to the embodiments may further include an iteration statement that is iterated as many times as the value of the num_index field. The iteration statement may include an octree level start field and a num_octree_levels field.

The octree level start field indicates a starting octree depth level used to configure an i-th layer (or i-th LoD).

The num_octree_levels field indicates the number of octree depth levels used to configure the i-th layer (or i-th LoD).

According to embodiments, the num_octree_levels field equal to 1 indicates that point cloud data matched with a single octree depth level belongs to the i-th layer. According to embodiments, when the value of the num_octree_levels field is greater than 1, it may indicate that all point cloud data matched with the octree depth level of the value of the num_octree_levels field belongs to the i-th layer. In this case, it may indicate that the octree depth layers corresponding to the value of the octree_level_start field to the octree_level_start field+the num_octree_levels field−1 belongs to the i-th layer.

When the i-th num_index field is equal to 1, the attribute parameter set according to the embodiments may further include a multiple_layers_present_flag field.

The multiple_layers_present_flag field indicates whether one octree depth level is matched with multiple layers. For example, the multiple_layers_present_flag field equal to 1 may indicate that one octree depth level is matched with multiple layers. The field equal to 0 may indicate that one octree depth level is matched with one layer.

When the multiple_layers_present_flag field is equal to 1, the attribute parameter set according to the embodiments may further include a num_sub_layers field.

The num_sub_layers field indicates the number of layers matched with an octree depth level.

The attribute parameter set according to the embodiments may further include an iteration statement that is iterated as many times as the value of the num_sub_layers field. The iteration statement may include a division_type field and a num_point field.

The division_type field indicates a method of dividing an octree depth level into multiple layers. For example, division_type may be used to distinguish methods such as those illustrated in FIGS. 37(a) and 37(b).

FIG. 37(a) illustrates a method of configuring multiple layers by collecting points yielding the same modular result of the octree depth level for the num_division[i] field.

FIG. 37(b) illustrates a method of configuring multiple layers by sequentially dividing an octree depth level into a predetermined number of levels.

The num_point field indicates the number of points constituting a corresponding layer.

When the value of the i-th num_index field is not 1, the attribute parameter set according to the embodiments may further include only the num_point field.

Each part, module, or unit described above may be a software, processor, or hardware part that executes successive procedures stored in a memory (or storage unit). Each of the steps described in the above embodiments may be performed by a processor, software, or hardware parts. Each module/block/unit described in the above embodiments may operate as a processor, software, or hardware. In addition, the methods presented by the embodiments may be executed as code. This code may be written on a processor readable storage medium and thus read by a processor provided by a device.

In the specification, when a part "comprises" or "includes" an element, it means that the part further comprises or includes another element unless otherwise mentioned. Also, the term " . . . module (or unit)" disclosed in the specification means a unit for processing at least one function or operation, and may be implemented by hardware, software or combination of hardware and software.

Although embodiments have been explained with reference to each of the accompanying drawings for simplicity, it is possible to design new embodiments by merging the embodiments illustrated in the accompanying drawings. If a recording medium readable by a computer, in which programs for executing the embodiments mentioned in the foregoing description are recorded, is designed by those skilled in the art, it may fall within the scope of the appended claims and their equivalents.

The apparatuses and methods may not be limited by the configurations and methods of the embodiments described above. The embodiments described above may be configured by being selectively combined with one another entirely or in part to enable various modifications.

Although preferred embodiments have been described with reference to the drawings, those skilled in the art will appreciate that various modifications and variations may be made in the embodiments without departing from the spirit or scope of the disclosure described in the appended claims. Such modifications are not to be understood individually from the technical idea or perspective of the embodiments.

Various elements of the apparatuses of the embodiments may be implemented by hardware, software, firmware, or a combination thereof. Various elements in the embodiments may be implemented by a single chip, for example, a single hardware circuit. According to embodiments, the components according to the embodiments may be implemented as separate chips, respectively. According to embodiments, at least one or more of the components of the apparatus according to the embodiments may include one or more processors capable of executing one or more programs. The one or more programs may perform any one or more of the operations/methods according to the embodiments or include instructions for performing the same. Executable instructions for performing the method/operations of the apparatus according to the embodiments may be stored in a non-transitory CRM or other computer program products configured to be executed by one or more processors, or may be stored in a transitory CRM or other computer program products configured to be executed by one or more processors. In addition, the memory according to the embodiments may be used as a concept covering not only volatile memories (e.g., RAM) but also nonvolatile memories, flash memories, and PROMs. In addition, it may also be implemented in the form of a carrier wave, such as transmission over the Internet. In addition, the processor-readable recording medium may be distributed to computer systems connected over a network such that the processor-readable code may be stored and executed in a distributed fashion.

In this document, the term "/" and "," should be interpreted as indicating "and/or." For instance, the expression "A/B" may mean "A and/or B." Further, "A, B" may mean "A and/or B." Further, "AB/C" may mean "at least one of A, B, and/or C." "A, B, C" may also mean "at least one of A, B, and/or C."

Further, in the document, the term "or" should be interpreted as "and/or." For instance, the expression "A or B" may mean 1) only A, 2) only B, and/or 3) both A and B. In other words, the term "or" in this document should be interpreted as "additionally or alternatively."

Various elements of the embodiments may be implemented by hardware, software, firmware, or a combination thereof. Various elements in the embodiments may be executed by a single chip such as a single hardware circuit. According to embodiments, the element may be selectively executed by separate chips, respectively. According to embodiments, at least one of the elements of the embodiments may be executed in one or more processors including instructions for performing operations according to the embodiments.

Terms such as first and second may be used to describe various elements of the embodiments. However, various components according to the embodiments should not be limited by the above terms. These terms are only used to distinguish one element from another. For example, a first user input signal may be referred to as a second user input signal. Similarly, the second user input signal may be referred to as a first user input signal. Use of these terms should be construed as not departing from the scope of the various embodiments. The first user input signal and the second user input signal are both user input signals, but do not mean the same user input signal unless context clearly dictates otherwise.

The terminology used to describe the embodiments is used for the purpose of describing particular embodiments only and is not intended to be limiting of the embodiments. As used in the description of the embodiments and in the claims, the singular forms "a", "an", and "the" include plural referents unless the context clearly dictates otherwise. The expression "and/or" is used to include all possible combinations of terms. The terms such as "includes" or "has" are intended to indicate existence of figures, numbers, steps, elements, and/or components and should be understood as not precluding possibility of existence of additional existence of figures, numbers, steps, elements, and/or components.

As used herein, conditional expressions such as "if" and "when" are not limited to an optional case and are intended to be interpreted, when a specific condition is satisfied, to perform the related operation or interpret the related definition according to the specific condition.

MODE FOR INVENTION

As described above, related contents have been described in the best mode for carrying out the embodiments.

INDUSTRIAL APPLICABILITY

As described above, the embodiments may be fully or partially applied to the point cloud data transmission/reception device and system. It will be apparent to those skilled in the art that variously changes or modifications may be made to the embodiments within the scope of the embodiments. Thus, it is intended that the embodiments cover the modifications and variations of this disclosure provided they come within the scope of the appended claims and their equivalents.

The invention claimed is:

1. A method of transmitting point cloud data, the method comprising:
   acquiring the point cloud data;
   encoding geometry information included in the point cloud data;
   encoding attribute information included in the point cloud data; and
   transmitting the encoded geometry information, the encoded attribute information, and signaling information,
   wherein encoding the attribute information comprises:
      generating LoDs (Levels of Detail) based on an octree structure, and
      compressing the attribute information based on the LoDs,
   wherein the octree structure is formed of depths,
   wherein each of the depths includes a plurality of nodes,
   wherein each of the plurality of nodes is an occupied node that includes one or more points or an unoccupied node that does not include any point,
   wherein, based on an occupied node belonging to a LoD of the LoDs including two or more occupied child nodes, a first node of the two or more occupied child nodes is selected for an attribute value of the occupied node,
   wherein a higher LoD of the LoDs includes points that belong to a lower LoD of the LoDs and includes points that do not belong to the lower LoD,
   wherein each LoD includes points of at least one depth of the octree structure,
   wherein the signaling information includes an attribute parameter set, and
   wherein the attribute parameter set includes information for identifying the attribute parameter set and information related to a number of the LoDs.

2. The method of claim 1, wherein encoding the geometry information comprises:
   quantizing the geometry information;
   generating the octree structure having an octal tree structure based on the quantized geometry information;
   approximating the octree structure;
   reconstructing the geometry information based on the generated octree structure and the approximated octree structure; and
   entropy-encoding occupancy codes of the generated octree structure or the approximated octree structure and outputting a geometry bitstream.

3. An apparatus configured to transmit point cloud data, the apparatus comprising:
   an acquirer configured to acquire the point cloud data;
   a geometry encoder configured to encode geometry information included in the point cloud data;
   an attribute encoder configured to encode attribute information included in the point cloud data; and
   a transmitter configured to transmit the encoded geometry information, the encoded attribute information, and signaling information,
   wherein the attributer encoder comprises:
      a LoD (Levels of Detail) generator configured to generate LoDs based on an octree structure, and
      a compressor configured to compress the attribute information based on the LoDs,
   wherein the octree structure is formed of depths,
   wherein each of the depths includes a plurality of nodes,
   wherein each of the plurality of nodes is an occupied node that includes one or more points or an unoccupied node that does not include any point,
   wherein, based on an occupied node belonging to a LoD of the LoDs including two or more occupied child nodes, a first node of the two or more occupied child nodes is selected for an attribute value of the occupied node,
   wherein a higher LoD of the LoDs includes points that belong to a lower LoD of the LoDs and includes points that do not belong to the lower LoD,
   wherein each LoD includes points of at least one depth of the octree structure,
   wherein the signaling information includes an attribute parameter set, and
   wherein the attribute parameter set includes information for identifying the attribute parameter set and information related to a number of the LoDs.

4. The apparatus of claim 3, wherein the geometry encoder comprises:
   a quantizer configured to quantize the geometry information;
   an octree analyzer configured to generate the octree structure having an octal tree structure based on the quantized geometry information;
   an approximation analyzer configured to approximate the octree structure;
   a geometry reconstructor configured to reconstruct the geometry information based on the generated octree structure and the approximated octree structure; and
   an arithmetic encoder configured to entropy-encode occupancy codes of the generated octree structure or the approximated octree structure and output a geometry bitstream.

5. A method of receiving point cloud data, the method comprising:
   receiving the point cloud data and signaling information;
   decoding geometry information included in the point cloud data based on the signaling information; and
   decoding attribute information included in the point cloud data based on the signaling information,
   wherein decoding the attribute information comprises:
      generating LoDs (Levels of Detail) based on an octree structure, and
      de-compressing the attribute information based on the LoDs,
   wherein the octree structure is formed of depths,
   wherein each of the depths includes a plurality of nodes,
   wherein each of the plurality of nodes is an occupied node that includes one or more points or an unoccupied node that does not include any point,
   wherein, based on an occupied node belonging to a LoD of the LoDs including two or more occupied child nodes, a first node of the two or more occupied child nodes is selected for an attribute value of the occupied node,
   wherein a higher LoD of the LoDs includes points that belong to a lower LoD of the LoDs and includes points that do not belong to the lower LoD,
   wherein each LoD includes points of at least one depth of the octree structure, wherein the signaling information includes an attribute parameter set, and wherein the attribute parameter set includes information for identifying the attribute parameter set and information related to a number of the LoDs.

6. The method of claim 5, wherein decoding the geometry information comprises:

reconstructing the geometry information by regenerating the octree structure of a partial level or a full level based on occupancy codes included in the geometry information.

7. An apparatus configured to receive point cloud data, the apparatus comprising:

a receiver configured to receive the point cloud data and signaling information;

a geometry decoder configured to decode geometry information included in the point cloud data based on the signaling information; and an attribute decoder configured to decode attribute information included in the point cloud data based on the signaling information, wherein the attribute decoder comprises:

a LoD (Levels of Detail) generator configured to generate LoDs based on an octree structure, and a decompressor configured to de-compress the attribute information based on the LoDs, wherein the octree structure is formed of depths, wherein each of the depths includes a plurality of nodes, wherein each of the plurality of nodes is an occupied node that includes one or more points or an unoccupied node that does not include any point, wherein, based on an occupied node belonging to a LoD of the LoDs including two or more occupied child nodes, a first node of the two or more occupied child nodes is selected for an attribute value of the occupied node, wherein a higher LoD of the LoDs includes points that belong to a lower LoD of the LoDs and includes points that do not belong to the lower LoD, wherein each LoD includes points of at least one depth of the octree structure, wherein the signaling information includes an attribute parameter set, and wherein the attribute parameter set includes information for identifying the attribute parameter set and information related to a number of the LoDs.

8. The apparatus of claim 7, wherein the geometry decoder reconstructs the geometry information by regenerating the octree structure of a partial level or a full level based on occupancy codes included in the geometry information.

* * * * *